United States Patent
Nakabayashi et al.

(10) Patent No.: US 6,628,822 B1
(45) Date of Patent: Sep. 30, 2003

(54) TRANSMISSION APPARATUS, TRANSMITTING METHOD, RECEPTION APPARATUS, RECEPTION METHOD, PICTURE PROCESSING SYSTEM, PICTURE PROCESSING METHOD, PICTURE DATA PROCESSING APPARATUS, PICTURE DATA PROCESSING METHOD AND FURNISHED MEDIUM

(75) Inventors: Kiyotaka Nakabayashi, Tokyo (JP); Naoya Kato, Chiba (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/171,547

(22) PCT Filed: Feb. 23, 1998

(86) PCT No.: PCT/JP98/00727

§ 371 (c)(1),
(2), (4) Date: Jan. 21, 1999

(87) PCT Pub. No.: WO98/37690

PCT Pub. Date: Aug. 27, 1998

(30) Foreign Application Priority Data

Feb. 21, 1997 (JP) .............................................. 9-037790
May 14, 1997 (JP) .............................................. 9-124031

(51) Int. Cl.[7] .................................................. G06K 9/00
(52) U.S. Cl. ........................ 382/162; 358/518; 358/1.15
(58) Field of Search ............................... 382/162, 167; 358/1.9, 1.15, 520, 518, 504; 345/589, 591, 597, 600–604

(56) References Cited

U.S. PATENT DOCUMENTS

| | | | |
|---|---|---|---|
| 4,500,919 A | 2/1985 | Schreiber | 358/518 |
| 5,276,779 A | 1/1994 | Statt | 358/1.9 |
| 5,739,928 A * | 4/1998 | Scott | 358/520 |
| 5,754,184 A | 5/1998 | Ring et al. | 345/604 |
| 5,754,682 A * | 5/1998 | Katoh | 382/162 |
| 6,118,455 A * | 9/2000 | Hidaka et al. | 345/589 |
| 6,453,066 B1 * | 9/2002 | Shiraiwa et al. | 382/162 |

FOREIGN PATENT DOCUMENTS

| | | | |
|---|---|---|---|
| EP | 0 531 891 A2 | 3/1993 | H04N/1/46 |
| EP | 0 599 495 A1 | 6/1994 | H04N/1/46 |
| EP | 0624028 A1 * | 11/1994 | H04N/1/46 |
| JP | 04-188952 | 7/1992 | H04N/1/46 |
| JP | 04-243376 | 8/1992 | H04N/1/40 |
| JP | 04-275769 | 10/1992 | H04N/1/40 |
| JP | 04-275770 | 10/1992 | H04N/1/40 |
| JP | 07-15612 | 1/1993 | H04N/1/40 |
| JP | 05-260302 | 10/1993 | H04N/1/40 |

* cited by examiner

Primary Examiner—Leo Boudreau
Assistant Examiner—Ishrat Sherali
(74) Attorney, Agent, or Firm—Ronald P. Kananen, Esq.; Rader, Fishman & Grauer PLLC

(57) ABSTRACT

In the present invention, RGB data outputted by a transmission side CRT monitor 3 is converted by a profile $P_1$ stored in a converter 11 into XYZ data which is corrected in agreement with the viewing conditions on the transmitting side by having reference to detection signals from sensors $S_1$, $S_2$ so that the data is outputted as $L^+M^+S^+$ data. A viewing condition conversion circuit 15 refers to detection signals from sensors $S_3$, $S_4$ to correct the $L^+M^+S^+$ data in agreement with the viewing conditions on the reception side to supply the resulting XYZ data to the converter 16. The converter 16 refers to a profile $P_4$ to convert the XYZ data into RGB data which is outputted to a CRT monitor 4. This equates color appearance of a picture on an input device on the transmission side to that of a picture on an output device on the reception side.

16 Claims, 47 Drawing Sheets

| | Apple MULTI-SCAN | 17-D50 | |
|---|---|---|---|

Header:

size: 528 bytes
CMMType: 'appl'
version: 0×02000000
profileClass: 'mntr'
dataColorSpace: 'RGB'
interchangeSpace: 'XYZ'
CreationDate: 22.2.1995, 14:43:10
CS2Signature: 'acsp'

Prim. platform: 'APPL'
flags: 0×00000000
deviceManufacturer: 'appl'
deviceModel: 9745
deviceAttributes: 0×00000000, 0×00000001
renderingIntent: 0
whiteXYZ: X=0.9642, Y=1.000, Z=0.8249

TagTable: (g elements. double-click to inspect)

| Ind | Signat. | elementOffset | size |
|---|---|---|---|
| 0 | 'desc' | 240=0×000000F0 | 119 |
| 1 | 'rXYZ' | 360=0×00000168 | 20 |
| 2 | 'gXYZ' | 380=0×0000017C | 20 |
| 3 | 'bXYZ' | 400=0×00000190 | 20 |
| 4 | 'rTRC' | 420=0×000001A4 | 14 |
| 5 | 'gTRC' | 436=0×000001B4 | 14 |
| 6 | 'bTRC' | 452=0×000001C4 | 14 |
| 7 | 'wtpt' | 468=0×000001D4 | 20 |
| 8 | 'cprt' | 488=0×000001E8 | 39 |

MONITOR PROFILE IN ICC PROFILE FORMAT (COLOR SYNC 2.0)

FIG.19

TRANSMISSION APPARATUS, TRANSMITTING METHOD, RECEPTION APPARATUS, RECEPTION METHOD, PICTURE PROCESSING SYSTEM, PICTURE PROCESSING METHOD, PICTURE DATA PROCESSING APPARATUS, PICTURE DATA PROCESSING METHOD AND FURNISHED MEDIUM

DESCRIPTION

Transmission Apparatus, Transmitting Method, Reception Apparatus, Reception Method, Picture Processing System, Picture Processing Method, Picture Data Processing Apparatus, Picture Data Processing Method and Furnished Medium

1. Technical Field

This invention relates to a transmission apparatus, a transmitting method, a reception apparatus, a reception method, a picture processing system, a picture processing method, a picture data processing apparatus, a picture data processing method and a furnished medium. More particularly, it relates to a transmission apparatus, a transmitting method, a reception apparatus, a reception method, a picture processing system, a picture processing method, a picture data processing apparatus, a picture data processing method and a furnished medium whereby coincidence in picture appearance can be achieved.

2. Background Art

Heretofore, when picture data are transmitted between devices capable of retrieving or outputting pictures, including printing a picture on paper and outputting or displaying the printed picture, such as CRT monitors, printers, scanners or video cameras, or when a picture retrieved by or displayed on a device (input device) is outputted by or displayed on another device (output device), such as by printing on a paper sheet, processing is performed on the basis of picture -data, such as RGB data or CMY(K) data, defined separately on the input device or the output device. The result is that, due to the difference in device characteristics, such as difference in characteristics of filters enclosed in the devices or characteristics of the phosphor or ink, picture deviation occurs between the picture of the input device and that of the output device.

There is known such a method in which the color space of picture data defined from device to device is converted into a color space prescribed by an intermediate color space, such as XYZ(CIE/XYZ) or L*a*b*(CIE/L*a*b*) provided by CIE, so that the picture color is the same on the calorimetric level as long as the picture data is the same in this intermediate color space, no matter which device is used to output the picture corresponding to the picture data.

For color space conversion, the relation of correspondence between RGB as device-based picture data and XYZ as corresponding intermediate color space data, for example, is stated in the form of a conversion table or a conversion equation, known as profile, is used.

This profile is formulated from device to device by measuring the colors of a picture outputted by a device when various picture data are entered to the device, detecting the values of picture data obtained from a device when pictures of various colorimetric values are entered to the device and by correlating the picture data with the colorimetric values.

Thus, by a profile formulated for a device A, the RGB data defined for the device A are converted into XYZ data corresponding to the colorimetric values of the associated picture. Therefore, if the XYZ data is converted into RGB data defined for another device B using a profile formulated for the device B, a picture having the same color (colorimetric values) as that in the device A is obtained in the device B.

With the profile of the device B, the RGB data defined for the device B are converted into XYZ data corresponding to the calorimetric values of the associated picture. Therefore, if the XYZ data is converted into RGB data defined for the device A, using the profile for the device A, a picture having the same color (colorimetric value) as that of the picture in the device B is obtained in the device A.

Since the data (picture data) converted by the profile into the intermediate color space is device-independent, it is termed device independent color or device independent data. This data is herein abbreviated occasionally to DIC. On the other hand, the data (picture data) defined from device to device is termed device dependent color or device dependent data. This data is herein abbreviated occasionally to DDC.

FIG. 38 is a block diagram showing the structure of an example of a picture processing system configured for exchanging picture data using the above-described profile, and FIG. 39 shows the stream of data in the picture processing system of FIG. 38.

Referring to FIG. 38, if a scanner 43 is an input device and a CRT monitor 42 and a printer 44 are output devices, the scanner 43 retrieves a picture drawn on paper (retrieved picture) to generate RGB data corresponding to the picture (such as RGB data as DDC defined in the scanner 43 ). These RGB data are routed to a converter 412 and converted to, for example, XYZ data as DIC using the profile for the scanner 43 pre-formulated and stored in the converter 412. The resulting XYZ data is outputted to a mapping unit 414.

The mapping unit 414 is configured as shown for example in FIG. 40. XYZ data from the converter 412 are converted by a converter 414a into data on the L*a*b* space which is the visually equalized space (L*a*b* data). The converted data is outputted to a mapping table 414d in which the L*a*b* data from the converter 414a is processed by, for example, compression of the color reproducing area (color gamut).

It is not all colors corresponding to the picture data generated by the scanner 43 that can be regenerated by the CRT monitor 42 or the printer 44. Thus, the mapping table 414d performs compression processing of the color reproducing area which is the processing of mapping the L*a*b* data from the converter 414a, that is colors that can be handled by the scanner 43, but that cannot be handled by the CRT monitor 42 or the printer 44, to colors that are closest to the colors and that can be handled by the CRT monitor 42 or the printer 44.

In the mapping table 414d, there is stored the relation of correspondence between the color reproducible area (color gamut) of an input device and the color reproducible area (color gamut) of an output device, wherein the input and output devices are the CRT monitor 42, scanner 43 and the printer 44. For example, if the L*a*b* data from the converter 414a, is inputted as an address, the L*a*b* data associated therewith are outputted to converters 414b or 414c.

In the converters 414b or 414c, L*a*b* data outputted by the mapping table 414d are converted into XYZ data which are outputted to the converter 411 or 413.

In the converter 411, XYZ data as DIC data from the mapping unit 414 (converter 414b) is converted into, for example, RGB data, as DDC, using the pre-formulated and stored profile for the CRT monitor 42. The converted RGB data is supplied to the CRT monitor 42. On the CRT monitor 42, a picture corresponding to the RGB data from the converter 411 is displayed, that is, the display picture is outputted.

In the converter 413, XYZ data as DIC data from the mapping unit 414 (converter 414b) is converted into, for example, CMY(K) data, as DDC, using the pre-formulated and stored profile for the printer 44. The converted CMY(K) data is supplied to the printer 44. On the printer 44, a picture corresponding to the CMY(K) data from the converter 413 is printed on printing paper sheet, that is a printed picture is outputted.

Meanwhile, since the CRT monitor 42 can be used not only as an output device but also as an input device, like the scanner 43, the displayed picture, CRT monitor 42, converter 411 and the mapping unit 414 are interconnected by double-headed arrows in FIGS. 38 and 39.

If the picture retrieved by the scanner 43 is outputted by the CRT monitor 42 or the printer 44, the display picture or the printed picture has the same colorimetric value as that of the retrieved picture, thus preventing color deviation from occurring.

If, when using the profile, the calorimetric condition at the time of profile formulation differs from the viewing condition in which the retrieved picture, printed picture or the displayed picture is viewed, such as luminance or chromaticity of the surrounding light or the background, there is produced difference in color appearance as perceived by the viewer due to changes in the visual perception of the viewer.

Therefore, in a picture that can be viewed by self-emission of light, such as a soft copy picture, e.g., a display picture outputted by the CRT monitor 42, as a self-light-emitting device, the color appearance differs due to the difference in the chromaticity point of the white color point (lightest point) of the device (herein the CRT monitor 42). The reason is that the human visual sense endeavours to adapted itself to both the surrounding light and to the white color point of the self-light-emitting device.

FIG. 41 shows an illustrative structure of another conventional picture processing system.

In FIG. 41, a picture of a pre-set original, retrieved by a scanner 502, is retrieved as RGB data as DDC data and is supplied to a converter 513 of a picture processing unit 511 as the CMS. The converter 513 converts the input RGB data into XYZ data as DIC data to output the converted data to a profile connection space (PCS) 514.

Similarly, a picture displayed on the CRT 501, is retrieved to a converter 512 of the picture processing unit 511 and converted into XYZ data which is sent to the PCS 514. The converter 512 also converts the XYZ data from the PCS 514 into RGB data to output the converted data to a CRT for display.

The converter 515 converts the XYZ data supplied from the PCS 514 int, for example, CMY(K) data as DDC data, to output the converted data to a printer 503 for printing on a printing paper sheet.

The operation is now explained with reference to FIG. 42 showing that the picture retrieved by the scanner 502 is printed by the printer 503 and simultaneously displayed on the CRT 501.

That is, the RGB picture data, retrieved by the scanner 502 from the original, is converted by the converter 513 into XYZ data which is sent to the PCS 514. The converter 515 converts the XYZ data entered from the PCS 514 into CMY(K) data to output the converted data to the printer 503. It is noted that K (black) may occasionally be absent. The printer 503 prints a picture corresponding to the input CMY(K) data on the printing paper sheet.

The converter 512 converts the XYZ data supplied by the PCS 514 into RGB data which is outputted to the CRT 1 for display.

Thus, with the present picture processing system, picture data retrieved by a pre-set device and which is dependent on the device, is transiently converted by the converter into picture data not dependent on the device. The converted picture data is again converted by an output side converter into data which is dependent on the device. This device dependent data is outputted. Thus, by adjusting the converter, it becomes possible to realize coincidence of the colorimetric values of the input or output picture.

Meanwhile, the conversion processing gives similar results no matter where the processing is executed. That is, as shown in FIG. 43, picture data $I_{in}$ and device profile data $D_{in}$ are sent to a converter 602 of a picture processing unit 601 to generate device independent picture data I' which is sent to a converter 604 of a picture processing unit 603. In this converter 604, the picture data I' is acted on by device profile data $D_{out}$ to produce picture data $I_{out}$, as shown in FIG. 43.

In the picture processing unit 611, the input picture data $I_{in}$ and device profile data $D_{in}$ are directly transmitted to a picture processing unit 612. The picture data $I_{in}$ and the device profile data $D_{in}$ are sent to a converter 613 of the picture processing unit 612 to generate device independent picture data I'. This picture data I' is acted upon in a converter 614 of the picture processing unit 612 by the device profile data $D_{out}$ to produce picture data $I_{out}$, as shown in FIG. 44.

It is also possible to send the picture data $I_{in}$ and the device profile data $D_{in}$ to a converter 622 of a picture processing unit 612 to generate device independent picture data I' which is then supplied to a converter 623 of the picture processing unit 621, with the device profile data $D_{out}$ being then acted on the input picture data I' in the converter 623 to generate picture data $I_{out}$, as shown in FIG. 45. In this case, the picture processing unit 624 sends the device profile data $D_{out}$ to the picture processing unit 621 and is fed with picture data $I_{out}$ outputted by the picture processing unit 621 to directly output the picture data $I_{out}$.

If, for example, the picture information is transmitted between two devices interconnected over a network, the viewing conditions in which these two devices are installed tend to differ from each other. Thus, there are occasions wherein the pictures outputted and displayed by these two devices differ from each other in color appearance.

For example, it is assumed that a soft copy picture is displayed on a CRT 501A. It is also assumed that if, with the color temperature and the luminance of the surrounding light of 4150 K (F6) and 100 cd/m$^2$, a picture displayed on the CRT 501A is sent via a picture processing unit 531 to another CRT 501B placed under the same visual the for display, the color temperature and luminance of the CRT 501A are 6500 K and 100 cd/m$^2$, while those of the CRT 501B are 9300 K and 120 cd/m$^2$. In this case, the picture displayed on the CRT 501A is not coincident in appearance with that displayed on the CRT 501B, because the respective CRTs differ in color temperature and luminance.

Even if the CRT 501A and the CRT 501B are of the same value of color temperature of 500 K and of the same value of luminance of 80 cd/m², the two pictures are not coincident in appearance if the color temperature and luminance of the surrounding light of the CRT 501A are 4150 K (F6) and 100 cd/m², while the color temperature and luminance of the surrounding light of the CRT 501B are 6500 K (D65) and 150 cd/m², as shown in FIG. 47.

Also, if, when a picture displayed on the CRT 501 is retrieved and sent to the printer 503 where it is printed as a hard copy picture on the printing paper sheet, as shown in FIG. 48, the color temperature and luminance of the surrounding light of CRT 501 are 4150 K (F6) and 100 cd/m², respectively, while the color temperature and luminance of the surrounding light of the printer 503 are 6500 K (F6) and 150 cd/m², respectively, the two pictures are not coincident in appearance.

Disclosure of the Invention

In light of the foregoing, it is an object of the present invention to provide a picture processing system having a network structure, in which the same color appearance may be realized despite difference in the visual conditions, and in which only the same color can be easily realized, despite difference in the visual conditions, with the use of a pre-existing system.

A transmitting apparatus according to the present invention includes input means to which are entered parameters of the viewing condition under which the picture entered from the input device is viewed, transform means for transforming picture data entered by the input device into appearance index data corresponding to color appearance under the viewing conditions responsive to the viewing condition parameters entered from the input means, and transmission means for transmitting the appearance index data outputted by the transform means via the transmission medium.

In this transmission apparatus, viewing condition parameters entered by input means are entered by input means. The transform means are responsive to viewing condition parameters entered by input means to convert the picture data entered by the input device to appearance index data corresponding to the color appearance under the viewing conditions. The appearance index data outputted by the conversion means are transmitted via a transmission medium by the transmission means.

For example, viewing condition parameters of the viewing condition under which a picture entered from the CRT monitor as an input device are entered by input means. The conversion means are responsive to data such as, for example, luminance of the surrounding light, to transform data outputted by a CRT monitor to color appearance index data under the viewing conditions . The appearance index data obtained from the transform means is sent by transmission means to a transmission medium, such as a network.

A transmitting method according to the present invention includes an input step for inputting parameters of the viewing conditions under which the picture entered from the input device is viewed, a transform step for transforming picture data entered by the input step into appearance index data corresponding to color appearance under the viewing conditions responsive to the viewing condition parameters entered from the input means and a transmission step for transmitting the appearance index data outputted by the transform step via the transmission medium.

A furnishing medium according to the present invention furnishes a computer program used for a transmission apparatus which is adapted for transforming a picture entered by an input device in a pre-set manner and which is used for transmitting the picture via a transmission medium. The computer program has an input step for inputting parameters of the viewing condition under which the picture entered from the input device is viewed, a transform step for transforming picture data entered by the input step into appearance index data corresponding to color appearance under the viewing conditions responsive to the viewing condition parameters entered from the input means and a transmission step for transmitting the appearance index data outputted by the transform step via the transmission medium.

In the above transmission method and furnishing medium, the parameters of the viewing conditions, under which the parameters of the viewing conditions, under which is viewed a picture entered from the input device, are entered by the input step. The transform step is responsive to the parameters of the viewing conditions to convert picture data entered by the input device into color index appearance data corresponding to color appearance under the viewing conditions. The transmission step transmits the appearance index data outputted by the transform step via transmission medium.

For example, the parameters of the viewing conditions under which is viewed a picture entered from a CRT monitor as an input device are entered at the input step. The transform is responsive to data such as luminance of the surrounding light to convert the output data of the CRT monitor to appearance index data corresponding to the color appearance under the viewing environment. The transmission step sends the appearance index data obtained by the transform step to a transmission medium, such as network.

A transmitting apparatus according to the present invention includes input means to which are entered parameters of the viewing condition under which the picture entered from the input device is viewed, first transform means for transforming picture data entered by the input device into appearance index data corresponding to color appearance under the viewing conditions responsive to the viewing condition parameters entered from the input means, reception means for receiving viewing condition parameters on the reception side, second transform means for converting the index data responsive to parameters of the viewing condition on the reception side received by the reception means so that the color appearance of a picture outputted by an output device on the reception side will be coincident with that of a picture entered by the input device and transmission means for transmitting data outputted by the second transform means over the transmission medium.

In the present transmission apparatus, parameters of the viewing conditions, under which is viewed a picture entered from an input device, ae entered by input means. The first transform means is responsive to the viewing condition parameters entered by the input device to convert input picture data entered by the input device to appearance index data corresponding to color appearance under the viewing conditions. The reception means receives the viewing condition parameters on the reception side. The second transform means is responsive to the viewing condition parameters on the reception side received by the reception means to convert the index data so that the color appearance of the picture outputted by the output device on the reception side will be coincident with the color appearance of the input picture from the input device. The transmission means transmits data outputted by the second transform means via transmission medium.

For example, parameters of the viewing conditions, under which is viewed a picture entered from a CRT monitor, as an input device, are entered by input means. The first transform means is responsive to data, such as luminance of ambient light, entered by the input device, to convert input picture data entered by the input device to appearance index data corresponding to color appearance under the viewing conditions. The reception means receives the viewing condition parameters on the reception side. The second transform means is responsive to the viewing condition parameters on the reception side received by the reception means to convert the index data so that the color appearance of the picture outputted by the CRT as the output device on the reception side will be coincident with the color appearance of the input picture from the input device. The transmission means transmits data outputted by the second transform means via transmission medium.

A transmitting method according to the present invention includes an input step for inputting parameters of the viewing conditions under which the picture entered from the input device is viewed, a first transform step for transforming picture data entered by the input device into appearance index data corresponding to color appearance under the viewing conditions responsive to the viewing condition parameters entered from the input step, a reception step for receiving viewing condition parameters on the reception side, a second transform step for converting the index data responsive to parameters of the viewing conditions on the reception side received by the reception step so that the color appearance of a picture outputted by an output device on the reception side will be coincident with that of a picture entered by the input device and a transmission step for transmitting data outputted by the second transform step over the transmission medium.

A furnishing medium according to the present invention furnishes a computer program used for a transmission apparatus adapted for transforming a picture entered by an input device in a pre-set manner and for transmitting the picture via a transmission medium. The computer program has an input step for inputting parameters of the viewing conditions under which the picture entered from the input device is viewed, a first transform step for transforming picture data entered by the input device into appearance index data corresponding to color appearance under the viewing conditions responsive to the viewing condition parameters entered from the input step, a reception step for receiving viewing condition parameters on the reception side, a second transform step for converting the index data responsive to parameters of the viewing condition on the reception side received by the reception step so that the color appearance of a picture outputted by an output device on the reception side will be coincident with that of a picture entered by the input device and a transmission step for transmitting data outputted by the second transform step over the transmission medium.

With the transmission method and the furnishing medium, parameters of the viewing conditions, under which is observed an input picture from an input device, are entered at the input step. The first transform step is responsive to the viewing condition parameters entered from the input step to convert t the picture data entered from the input device into appearance index data corresponding to the color appearance under the viewing conditions. The reception step receives the viewing condition parameters on the reception side. The second transform step is responsive to the viewing condition parameters on the reception side received by the reception step to convert the index data so that the color appearance of the picture outputted by the output device on the reception side will be coincident with the color appearance of the picture entered from the input device. The transmission step transmits data outputted by the second transform step via transmission medium.

For example, parameters of the viewing conditions, under which is observed an input picture from an input device, are entered from a CRT monitor as an input device. The first transform step is responsive to data such as luminance of the ambient light to convert the picture data entered from the input device into appearance index data corresponding to the color appearance under the viewing conditions. The reception step receives the viewing condition parameters on the reception side. The second transform step is responsive to the viewing condition parameters on the reception side received by the reception step to convert the index data so that the color appearance of the picture outputted by a CRT monitor as the output device on the reception side will be coincident with the color appearance of the picture entered from a CRT monitor as the input device. The transmission step transmits data outputted by the second transform step via transmission medium.

A transmitting apparatus according to the present invention includes input means to which are entered parameters of the viewing conditions under which the picture entered from the input device is viewed and transmitting means for transmitting the picture entered from the input device and the viewing condition parameters entered from the input means.

In the present transmission apparatus, the parameters of the viewing conditions, under which is viewed a input picture from the input device, are entered from input means. The transmission means transmits a picture entered from the input device and the viewing condition parameters entered from the input means. The viewing condition parameters, under which is viewed a CRT monitor, as an input device, are entered from input means. The transmission means transmits the input picture data, such as luminance of the ambient light, and the input viewing condition parameters from the input means to a transmission medium, such as network.

A transmitting method according to the present invention includes an input step for inputting parameters of the viewing conditions under which the picture entered from the input device is viewed and a transmitting step for transmitting the picture entered from the input device and the viewing condition parameters entered from the input step.

A furnishing medium according to the present invention furnishes a computer program used for a transmission apparatus which is adapted for transforming a picture entered by an input device in a pre-set manner and which is used for transmitting the picture via a transmission medium. The computer program has an input step for inputting parameters of the viewing conditions under which the picture entered from the input device is viewed and a transmitting step for transmitting the picture entered from the input device and the viewing condition parameters entered from the input step.

In the transmission method and the furnishing medium, parameters of the viewing conditions, under which is viewed an input picture from the input device, and the transmission step transmits an input picture from the input device and the input viewing condition parameters from the input step. The input step inputs viewing condition parameters, such as luminance of the ambient light, as the viewing conditions of viewing the CRT monitor as the input device, are entered from the input step. The picture data entered from the CRT monitor as the input device and the viewing condition parameters entered from the input step, are sent by the transmission step to a transmission medium, such as a network.

A reception apparatus according to the present invention includes reception means for receiving the picture data transmitted from the transmitting side, input means for entering parameters of the viewing conditions under which is viewed a picture displayed and outputted on the output device, transform means for converting the picture data received by the reception means, responsive to the viewing condition parameters entered from the input means, so that the color appearance of the picture displayed and outputted on the output device will be coincident with that of the picture entered from the input device on the transmitting side and output means for outputting the picture data converted by the transform means to the output device.

In the present reception apparatus, the reception means receives picture data transmitted from the transmitting side. The transmitting side is responsive to input parameters of the viewing condition from input means under which a picture displayed and outputted on an output device to convert picture data received by the reception means so that the color appearance of the picture displayed and outputted on the output device will be coincident with that of the input picture entered from the transmitting side input device. The output means outputs the picture data converted by the transform means to an output device.

For example, the reception means receives picture data transmitted from the transmitting side. The transmitting side is responsive to input parameters of the viewing condition from input means, such as luminance of the surrounding light, under which a picture displayed and outputted on a CRT monitor as an output device to convert picture data received by the reception means so that the color appearance of the picture displayed and outputted on the output device will be coincident with that of the input picture entered from CRT monitor as the transmitting side input device. The output means outputs the picture data converted by the transform means to the output device.

A reception method according to the present invention includes a reception step for receiving the picture data transmitted from the transmitting side, an input step for entering parameters of the viewing conditions under which is viewed a picture displayed and outputted on the output device, a transform step for converting the picture data received by the reception step, responsive to the viewing condition parameters entered from the input step, so that the color appearance of the picture displayed and outputted on the output device will be coincident with that of the picture entered from the input device and an output step for outputting the picture data converted by the transform step to the output device.

A furnishing medium according to the present invention furnishes a computer program used in a reception apparatus for receiving picture data entered and transmitted from a transmission side input device after conversion in agreement with viewing condition parameters of the transmitting side and those of the reception side, and for displaying and outputting the received picture data on an output device. The computer program includes a reception step for receiving the picture data transmitted from the transmitting side, an input step for inputting parameters of the viewing conditions under which is viewed a picture displayed and outputted on the output device, a transform step for converting the picture data received by the reception step responsive to the viewing condition parameters received by the input step so that the color appearance of the picture displayed and outputted on the output device will be coincident with that of the picture entered from the input device and an output step for outputting the picture data converted by the transform step to the output device.

In the above reception method and furnishing medium, the reception step receives picture data transmitted from the transmitting side, and parameters of the viewing conditions, under which is viewed a picture displayed and outputted on the output device, are entered at the input step. The transform step is responsive to the input viewing condition parameters from the input step to convert picture data received by the reception step so that the color appearance of the picture displayed and outputted on the output device will be coincident with the color appearance of the picture entered from the transmission side input device. The output step outputs picture data transformed by the transform step to the output device.

For example, the reception step receives picture data transmitted from the transmitting side, and luminance of the surrounding light, as the parameters of the viewing conditions, under which is observed a CRT monitor, as an output device on the reception side, is entered at the input step. The transform step is responsive to the input viewing condition parameters from the input step to convert picture data received by the reception step so that the color appearance of the picture displayed and outputted on a CRT monitor will be coincident with the color appearance of the picture entered from a CRT monitor as the transmission side input device. The output step outputs picture data transformed by the transform step to a CRT monitor as the output device.

A reception apparatus according to the present invention input means to which are entered parameters of the viewing conditions under which a picture displayed and outputted on the output device is viewed, transmitting means for transmitting the viewing condition parameters entered from the input means to the transmitting side, reception means for receiving the picture data transmitted from the transmitting side and output means for outputting the picture data received by the reception means to the output device.

In the present reception apparatus, parameters of the viewing conditions, under which is viewed a picture displayed and outputted on an output device, are entered from input means. The transmission means transmits the viewing condition parameters entered fr the input means. The reception means receives the picture data transmitted from the transmission side. The output means outputs the picture data received by the reception means to the output device.

For example, parameters of the viewing conditions, under which is viewed a picture displayed and outputted on an output device, such as luminance of the ambient light, are entered from input means. The transmission means transmits the viewing condition parameters entered from the input means. The reception means receives the picture data transmitted from the transmission side after pre-set correction consistent with the transmitted viewing condition parameters. The output means outputs the picture data received by the reception means to a CRT monitor.

A reception method according to the present invention includes an input step to which are entered parameters of the viewing conditions under which a picture displayed and outputted on the output device is viewed, a transmitting step for transmitting the viewing condition parameters entered from the input step to the transmitting side, a reception step for receiving the picture data transmitted from the transmitting side and an output step for outputting the picture data received by the reception step to the output device.

A furnishing medium according to the present invention furnishes a computer program used in a reception apparatus for receiving picture data entered and transmitted from a transmission side input device after conversion in agreement with viewing condition parameters of the transmitting side and those of the reception side, and for displaying and outputting the received picture data on an output device. The computer program includes an input step to which are entered parameters of a viewing condition under which a picture displayed and outputted on the output device is viewed, a transmitting step for transmitting the viewing condition parameters entered from the input means to the transmitting side, a reception step for receiving the picture data transmitted from the transmitting side and an output step for outputting the picture data received by the reception means to the output device.

In the above reception method and furnishing medium, parameters of the viewing conditions, under which is viewed a picture displayed and outputted on an output device, are entered from the input step. The transmission step transmits to the transmitting side the viewing condition parameters entered from the input step. The reception step receives picture data transmitted from the transmitting side. The output step outputs the picture data received by the reception step to an output device.

For example, luminance of the ambient light is entered at an input step, and the transmission step transmits the input viewing condition parameters to the transmitting side. The reception side receives picture data corrected in a pre-set manner in meeting with the transmitted viewing condition parameters and transmitted from the transmitting side. The output step outputs the received picture data to the CRT monitor.

A reception apparatus according to the present invention includes reception means for receiving the picture data and the viewing condition parameters of the transmitting side, transmitted from the transmitting side, first transform means for transforming the picture data into color appearance index data under the viewing conditions responsive to the viewing condition parameters received by the reception means, input means to which are entered viewing condition parameters for viewing a picture displayed and outputted on the output device, second transform means for converting the index data responsive to parameters of the viewing condition entered by the input means so that the color appearance of a picture outputted by the output device will be coincident with that of a picture entered by the input device on the transmitting side and output means for outputting picture data obtained by the second transform means to the output device.

In the present reception device, the reception means receives the picture data transmitted from the transmitting side and the viewing condition parameters of the transmitting side. The first transform means is responsive to the viewing condition parameters received by the reception means to convert the picture data into appearance index data corresponding to color appearance under the viewing conditions. The parameters of the viewing conditions, under which is observed a picture displayed and outputted on the output device, are entered from the input means. The second transform means is responsive to the viewing condition parameters entered from the input mans to convert the index data so that the color appearance of the picture outputted by the output device will be coincident with that of the picture entered from the transmission side input device. The output device outputs the picture data obtained by the second transform means to an output device.

For example, the reception means receives the picture data transmitted from the transmitting side and the viewing condition parameters of the transmitting side, such as luminance of ambient light. The first transform means is responsive to the received viewing condition parameters to convert the picture data into appearance index data corresponding to color appearance under the viewing conditions of viewing the transmitting side CRT monitor. The parameters of the viewing conditions, such as luminance of the viewing conditions under which is observed a picture displayed and outputted on the output device on the reception side, such as a CRT monitor, are entered from the input means. The second transform means is responsive to the input viewing condition parameters to convert the index data so that the color appearance of the picture outputted by the CRT monitor as the output device will be coincident with that of the picture entered from the CRT monitor, such as the transmission side input device. The output device outputs the picture data obtained by the second transform means to an output device, such as a CRT monitor.

A reception method according to the present invention includes a reception step for receiving the picture data and the viewing condition parameters of the transmitting side, transmitted from the transmitting side, a first transform step for transforming the picture data into appearance index data corresponding to color appearance under the viewing conditions responsive to the viewing condition parameters received by the reception step, an input step to which are entered viewing condition parameters for viewing a picture displayed and outputted on the output device, a second transform step for converting the index data responsive to parameters of the viewing conditions entered by the input step so that the color appearance of a picture outputted by the output device will be coincident with that of a picture entered by the input device on the transmitting side and an output step for outputting picture data obtained by the second transform step to the output device.

A furnishing medium according to the present invention furnishes a computer program used for a reception apparatus for receiving picture data transmitted from a transmitting side and entered from an input device of the transmitting side and parameters of the viewing conditions under which a picture entered from the input device is viewed, and for displaying and outputting the received picture data and parameters on an output device. The computer program includes a reception step for receiving the picture data and the viewing condition parameters of the transmitting side, transmitted from the transmitting side, a first transform step for transforming the picture data into appearance index data corresponding to color appearance under the viewing conditions responsive to the viewing condition parameters received by the reception step, an input step to which are entered viewing condition parameters for viewing a picture displayed and outputted on the output device, a second transform step for converting the index data responsive to parameters of the viewing conditions entered by the input step so that the color appearance of a picture outputted by the output device will be coincident with that of a picture entered by the input device on the transmitting side and an output step for outputting picture data obtained by the second transform step to the output device.

In the above reception method and furnishing medium, the reception step receives picture data and the viewing condition parameters of the transmitting side, transmitted from the transmitting side, and the first transform step is responsive to the viewing condition parameters received by the reception step to convert picture data into appearance index data corresponding to color appearance under the viewing conditions. The parameters of the viewing conditions, under which is observed a picture displayed and outputted by an output device, are entered in the input step. The second transform step is responsive to the viewing condition parameters entered from the input step to convert the index data so that the color appearance of an output picture of the output device will be coincident with the color appearance of the picture entered from the input device of the transmitting side. The output step outputs picture data obtained by the second transform step to an output device.

For example, the reception step receives picture data and the viewing condition parameters of the transmitting side, transmitted from the transmitting side, and the first transform step is responsive to the viewing condition parameters received by the reception step to convert index data into appearance index data corresponding to color appearance under the viewing conditions. The parameters of the viewing conditions, such as luminance of the surrounding light, under which is observed a CRT monitor on the transmitting side, as an output device, are entered in the input step. The second transform step is responsive to the input viewing condition parameters to convert the index data so that the color appearance of an output picture of the CRT monitor as an output device will be coincident with the color appearance of the picture entered from the CRT monitor as an input device of the transmitting side. The output step outputs picture data obtained by the second transform step to a CRT monitor as an output device.

In a picture processing system according to the present invention, the transmitting side includes first input means to which are entered viewing condition parameters for observing the picture entered from the input device, first transform means for converting picture data entered from the input device into appearance index data associated with color appearance under the viewing conditions responsive to the viewing condition parameters entered from the first input means and transmission means for transmitting the appearance index data outputted by the first transform means via the transmission medium. On the other hand, the reception side includes reception means for receiving the index data transmitted via the transmission medium, second input means to which are entered parameters of the viewing conditions under which a picture displayed and outputted on the output device is viewed, second transform means for converting index data received by the reception means responsive to the parameters of the viewing conditions entered from the second input means so that the color appearance of the picture displayed and outputted on the output device will be coincident with that of the picture entered from the input device on the transmitting side and outputting means for outputting the picture data converted by the second transform means to the output device.

In this picture processing system, the transmitting side is fed from the first input means with parameters of the viewing conditions under which is viewed a picture entered from the input device. The first transform means is responsive to the viewing condition parameters entered from the first input means to convert the input picture data from the first input means into appearance index data corresponding to the color appearance under the viewing conditions. The transmitting means transmits the appearance index data outputted by the first transform means via the transmission medium. On the reception side, the reception means receives the index data transmitted via the network. The parameters of the viewing conditions, under which is viewed an output picture displayed on the output device, are entered from the second input means. The second transform means is responsive to the viewing condition parameters entered from the second input means to convert the index data received by the reception means so that the color appearance of the picture displayed and outputted on the output device will be coincident with the color appearance of the picture entered from the input device on the transmitting side. The output means outputs the picture data converted by the second transform means to the output device.

For example, the transmitting side is fed from the first input means with parameters of the viewing conditions under which is viewed a CRT monitor as the input device. The first transform means is responsive to the input viewing condition parameters to convert the input picture data entered to the CRT monitor as the input device into appearance index data corresponding to the color appearance under the viewing conditions. The transmitting means transmits the resulting data via a network. On the reception side, the reception means receives the index data transmitted via the network. The parameters of the viewing conditions, such as luminance of the surrounding light, under which is viewed an output picture displayed on a CRT monitor, as the output device, are entered from the second input means. The second transform means is responsive to the received viewing condition parameters to convert the index data received by the reception means so that the color appearance of the picture displayed and outputted on the output device will be coincident with the color appearance of the picture entered from a CRT monitor as the input device on the transmitting side. The output means outputs the picture data converted by the second transform means to the CRT monitor as the output device.

In a picture processing method according to the present invention, the transmitting side includes a first input step to which are entered viewing condition parameters for observing the picture, a first transform step for converting picture data entered from the input device into appearance index data associated with color appearance under the viewing conditions responsive to the viewing condition parameters entered from the first input step and a transmission step for transmitting the appearance index data outputted by the first transform step via the transmission medium. On the other hand, the reception side includes a reception step for receiving the index data transmitted via the transmission medium, a second input step to which are entered parameters of the viewing conditions under which a picture displayed and outputted on the output device is viewed, a second transform step for converting index data received by the reception step responsive to the parameters of the viewing conditions entered from the second input step so that the color appearance of the picture displayed and outputted on the output device will be coincident with that of the picture entered from the input device on the transmitting side and an output step for outputting picture data converted by the second conversion step to the output device.

A furnishing medium according to the present invention furnishes a computer program used in a picture processing system in which a transmitting side performs pre-set conversion on a picture entered from an input device to transmit the picture via a transmission medium and in which a reception side performs pre-set conversion on the picture transmitted via the transmission medium to display and output the converted picture on an output device. A computer program portion of the transmitting side includes a first input step to which are entered viewing condition parameters for observing the picture entered from the input device, a first transform step for converting picture data entered from the input device into appearance index data associated with color appearance under the viewing conditions responsive to the viewing condition parameters entered from the first input step and a transmission step for transmitting the appearance data outputted by the first transform step via the transmission medium. On the other hand, a computer program portion of the reception side includes a reception step for receiving the index data transmitted via the transmission medium, a second input step to which are entered parameters of the viewing conditions under which a picture displayed and outputted on the output device is viewed, a second transform step for converting index data received by the reception step responsive to the parameters of the viewing conditions entered from the second input step so that the color appearance of the picture displayed and outputted on the output device will be coincident with that of the picture entered from the input device on the transmitting side and an output step for outputting picture data converted by the second conversion step to the output device.

In the above picture processing method and the furnishing medium according to the present invention, the transmitting side is fed from the first step with parameters of the viewing conditions under which is viewed an input picture from the input device. The first transform step is responsive to the viewing condition parameters entered from the input step to convert input picture data from the input device into appearance index data corresponding to the color appearance under the viewing conditions. The transmitting step transmits appearance index data outputted by the first transform step via transmission On the reception side, the reception step receives the index data transmitted via transmission medium, and parameters of the viewing conditions, under which is viewed a picture displayed and outputted on the output device, are entered from the second input step. The second transform step is responsive to the input viewing condition parameters from the second input step to convert the index data received by the reception step so that the color appearance of a picture displayed and outputted on the output device will be coincident with that of a picture entered from the input device on the transmitting side. The output step outputs picture data for example, converted by the second transform step to the output device.

For example, the transmitting side is fed from the first step with parameters of the viewing conditions under which is viewed a CRT monitor as an input device, such as luminance of the surrounding light. The first transform step is responsive to the input viewing condition parameters to convert RGB data from the CRT monitor, such as an input device, into appearance index data corresponding to the color appearance under the viewing conditions. The transmitting step transmits the resulting data via a network. On the reception side, the reception step receives the index data transmitted via network, and parameters of the viewing conditions, under which is viewed a picture displayed and outputted on CRT monitor, as the output device, are entered from the second input step. The second transform step is responsive to the input viewing condition parameters from the second input step to convert the index data received by the reception step so that the color appearance of a picture displayed and outputted on the CRT monitor as output device will be coincident with that of a picture entered from the CRT monitor as the input device on the transmitting side. The output step outputs picture data for example, converted by the second transform step to the CRT monitor as the output device.

In a picture processing system in which a transmitting side performs pre-set conversion on a picture entered from an input device to transmit the picture via a transmission medium and in which a reception side displays and outputs the converted picture on an output device, the transmitting side includes first input means to which are entered viewing condition parameters for observing the picture entered from the input device, first transform means for converting picture data entered from the input device into appearance index data associated with color appearance under the viewing conditions responsive to the viewing condition parameters entered from the first input means, first reception means for receiving parameters of the viewing conditions on the reception side for observing a picture displayed and outputted on the output device, second transform means for converting the index data outputted by the first transform means responsive to the viewing condition parameters received by the first reception means so that the color appearance of the picture displayed and outputted on the output device will be coincident with that of the picture entered from the input device and first transmission means for transmitting data obtained by the second transform means via the transmission medium. On the other hand, the reception side includes second reception means for receiving the data transmitted via the transmission medium, output means for outputting the data received by the second reception means to the output device, second input means to which are entered parameters of viewing conditions under which a picture displayed and outputted on the output device is observed and second transmission means for transmitting the viewing condition parameters entered from the second input means to the transmitting side.

In the present picture processing system, the transmitting side is fed from the first input means with parameters of the viewing conditions under which is viewed an input picture from the input device. The first transform means is responsive to the viewing condition parameters entered from the first input means to convert input picture data from the input device into appearance index data corresponding to the color appearance under the viewing conditions. The first reception means receives parameters of the viewing conditions on the reception side under which is viewed a picture displayed and outputted on the output device. The second transform means is responsive to the viewing condition parameters received by the first reception means to convert output index data of the first transform means so that the color appearance of a picture displayed and outputted on the output device will be coincident with that of the picture entered from the input device. The first transmitting means transmits data obtained by the second transform means via transmission medium. On the reception side, the second reception means receives data transmitted via transmission medium. The output means outputs data received by the second reception means to the output device. The parameters of the viewing conditions under which is viewed a picture displayed and outputted on the output device are entered by the second input means. The second transmitting means transmits the viewing condition parameters entered by the second input means to the transmitting side.

For example, the transmitting side is fed from the first input means with parameters of the viewing conditions under which is viewed an input picture from CRT monitor as the input device. The first transform means is responsive to the viewing condition parameters entered from the first input means to convert input picture data from a CRT monitor as the input device into appearance index data corresponding to the color appearance under the viewing conditions. The first reception means receives parameters of the viewing conditions on the reception side under which is viewed a picture displayed and outputted on a CRT monitor as the output device on the reception side. The second transform means is responsive to the received viewing condition parameters, such as luminance of the surrounding light on the reception side, to convert output index data of the first transform means so that the color appearance of a picture displayed and outputted on the CRT monitor as the output device on the reception side will be coincident with that of the picture entered from the CRT monitor as the input device on the transmitting side. The first transmitting means transmits the resulting data via network. On the reception side, the second reception means receives data transmitted via network. The output means outputs received data to the CRT monitor as the output device on the reception side. The parameters of the viewing conditions under which is viewed a picture displayed and outputted on the output device, such as data like luminance of the surrounding light, are entered by the second input means. The second transmitting means transmits the input viewing condition parameters the transmitting side.

In a picture processing method according to the present invention, the transmitting side includes a first input step to which are entered viewing condition parameters for observing the picture entered from the input device, a first transform step for converting picture data entered from the input device into appearance index data associated with color appearance under the viewing conditions responsive to the viewing condition parameters entered from the first input step, a first reception step for receiving parameters of viewing conditions on the reception side for observing a picture displayed and outputted on the output device, a second transform step for converting the index data outputted by the first transform step responsive to the viewing condition parameters received by the first reception step so that the color appearance of the picture displayed and outputted on the output device will be coincident with that of the picture entered from the input device and a first transmission step for transmitting data obtained by the second transform step via the transmission medium. On the other hand, the reception side includes a second reception step for receiving the data transmitted via the transmission medium, an output step for outputting the data received by the second reception step to the output device, a second input step to which are entered parameters of viewing conditions under which a picture displayed and outputted on the output device is observed and a second transmission step for transmitting the viewing condition parameters entered from the second input step to the transmitting side.

A furnishing medium according to the present invention furnishes a computer program used in a picture processing system in which a transmitting side performs pre-set conversion on a picture entered from an input device to transmit the picture via a transmission medium and in which a reception side displays and outputs the picture transmitted via the transmission medium on an output device. A transmitting side computer program portion includes a first input step to which are entered viewing condition parameters for observing the picture entered from the input device, a first transform step for converting picture data entered from the input device into appearance index data associated with color appearance under the viewing conditions responsive to the viewing condition parameters entered from the first input step, a first reception step for receiving parameters of viewing conditions on the reception side for observing a picture displayed and outputted on the output device, a second transform step for converting the index data outputted by the first transform step responsive to the viewing condition parameters received by the first reception step so that the color appearance of the picture displayed and outputted on the output device will be coincident with that of the picture entered from the input device and a first transmission step for transmitting data obtained by the second transform step via the transmission medium. On the other hand, a reception side computer program portion includes a second reception step for receiving the data transmitted via the transmission medium, an output step for outputting the data received by the second reception step to the output device, a second input step to which are entered parameters of viewing conditions under which a picture displayed and outputted on the output device is observed and a second transmission step for transmitting the viewing condition parameters entered from the second input step to the transmitting side.

In the above picture processing method and furnishing medium, the transmitting side is fed from the first input step with parameters of the viewing conditions under which is viewed an input picture from the input device. The first transform step is responsive to the viewing condition parameters entered from the first input step to convert picture data entered from the first input step to appearance index data corresponding to color appearance under the viewing environment. The first reception step receives the reception side viewing condition parameters under which is viewed the picture displayed and outputted on the output device. The second transform step is responsive to the viewing condition parameters received by the first reception step to converts the output index data of the first transform step so that the color appearance of a picture displayed and outputted on the output device will be coincident with that of the picture entered from the input device. The first transmitting step transmits data obtained from the second transform step via transmission medium. On the reception side, the second reception step receives data transmitted via transmission medium. The output step outputs data received by the second reception step to the output device. From the second input step are entered the parameters of the viewing conditions under which the picture displayed and outputted on the output device. The second transmission step transmits to the transmitting step the viewing condition parameters entered from the second input step.

For example, the transmitting side is fed from the first input step with parameters of the viewing conditions under which is viewed an input picture from the CRT monitor as the input device, such as luminance of the surrounding light. The first transform step is responsive to the input viewing condition parameters to convert picture data entered from the CRT monitor as the input device to appearance index data corresponding to color appearance under the viewing environment. The first reception step receives the reception side viewing condition parameters under which is viewed the picture displayed and outputted on the reception side output device. The second transform step is responsive to the received viewing condition parameters such as luminance of the surrounding light on the reception side to convert the output index data of the first transform step so that the color appearance of a picture displayed and outputted on the CRT monitor on the reception side output device will be coincident with that of the picture entered from the CRT monitor as the transmitting side input device. The first transmitting step transmits the resulting data obtained from the second transform step via network. On the reception side, the second reception step receives data transmitted via network. The output step outputs received data to the CRT monitor as the reception side output device. From the second input step are entered the parameters of the viewing conditions under which the picture displayed and outputted on the output device, such as data like luminance of the surrounding light. The second transmission step transmits the input viewing condition parameters to the transmitting step.

In a picture processing system according to the present invention, a transmitting side transmits includes first input means to which are entered parameters of viewing conditions under which is viewed the picture entered from the input device and transmission means for transmitting the picture entered from the input device and the viewing condition parameters entered from the first input means. On the other hand, the reception side includes reception means for receiving the picture data and the transmitting side viewing condition parameters, transmitted from the transmitting side, first transform means for converting the picture data into appearance index data associated with color appearance under the viewing conditions of the transmitting side responsive to the viewing condition parameters received by the reception means, second input means to which are entered parameters on the reception side viewing conditions for observing the picture displayed and outputted on the output device, second conversion means for converting the index data responsive to the viewing condition parameters entered from the second input means so that the color appearance of a picture outputted by the output device will be coincident with that of a picture entered from the input device on the transmitting side and output means for outputting picture data obtained by the second conversion means to the output device.

In the present picture processing system, the transmitting side is fed from the first input means with parameters of the viewing conditions under which is viewed an input picture entered from the input device. The transmitting means transmits the input picture from the input device and viewing condition parameters entered from the first input means. The reception means on the reception side receives the picture data and the transmitting side viewing condition parameters, transmitted from the transmitting side. The first transform means is responsive to the viewing condition parameters received by the reception means to convert picture data into appearance index data corresponding to color appearance under the viewing conditions. The parameters of the viewing conditions under which is viewed a picture displayed and outputted on the output device are entered from the second input means. The second transform means is responsive to parameters of viewing conditions received entered from the second input means to convert index data so that the color appearance of a picture outputted by the output device will be coincident with the color appearance of the picture entered from the input device on the transmitting side. The output means outputs picture data obtained by the second transform means to the CRT monitor as the output device.

For example, the transmitting side is fed from the first input means with parameters of the viewing conditions under which is viewed an input picture entered from a CRT as the input device, such as luminance data of the surrounding light. The transmitting means transmits the input picture from the CRT monitor as the input device and viewing condition parameters entered from the first input means. The reception means on the reception side receives the picture data and the transmitting side viewing condition parameters, transmitted from the transmitting side. The first transform means is responsive to the viewing condition parameters received by the reception means to convert picture data into appearance index data corresponding to color appearance under the viewing conditions. The parameters of the viewing conditions under which is viewed a picture displayed and outputted on the output device are entered from the second input means. The second transform means is responsive to parameters of viewing conditions entered from the second input means, such as luminance of the surrounding light, to convert index data so that the color appearance of a picture outputted by the CRT device as the output device will be coincident with the color appearance of the picture entered from a CRT monitor as the input device on the transmitting side. The output means outputs picture data obtained by the second transform means to the CRT monitor as the output device.

In a picture processing method according to the present invention, the transmitting side includes a first input step to which are entered parameters of viewing conditions under which is viewed the picture entered from the input device and a transmission step for transmitting the picture entered from the input device and the viewing condition parameters entered from the first input step. On the other hand, the reception side includes a reception step for receiving the picture data and the transmitting side viewing condition parameters, transmitted from the transmitting side, a first transform step for converting the picture data into appearance index data associated with color appearance under the viewing conditions of the transmitting side responsive to the viewing condition parameters received by the reception step, a second input step to which are entered parameters on the reception side viewing conditions for observing the picture displayed and outputted on the output device, a second conversion step for converting the index data responsive to the viewing condition parameters entered from the second input step so that the color appearance of a picture outputted by the output device will be coincident with that of a picture entered from the input device on the transmitting side and an output step for outputting picture data obtained by the second conversion step to the output device.

A furnishing medium according to the present invention furnishes a computer program used in a picture processing system in which a transmitting side transmits a picture entered from an input device via a transmission medium and in which a reception side performs pre-set conversion on the picture transmitted via the transmission medium to display and output the converted picture on an output device. A transmitting side computer program portion includes a first input step to which are entered parameters of viewing conditions under which is viewed the picture entered from the input device and a transmission step for transmitting the picture entered from the input device and the viewing condition parameters entered from the first input step. On the other hand, a reception side computer program portion includes a reception step for receiving the picture data and the transmitting side viewing condition parameters, transmitted from the transmitting side, a first transform step for converting the picture data into appearance index data associated with color appearance under the viewing conditions of the transmitting side responsive to the viewing condition parameters received by the reception step, a second input step to which are entered viewing condition parameters on the reception side for observing the picture displayed and outputted on the output device, a second conversion step for converting the index data responsive to the viewing condition parameters entered from the second input step so that the color appearance of a picture outputted by the output device will be coincident with that of a picture entered from the input device on the transmitting side and an output step for outputting picture data obtained by the second conversion step to the output device and an output step for outputting the picture data obtained by the second conversion step to the output device.

In the above picture processing method and furnishing medium, the transmitting side is fed from the first step with parameters of the viewing conditions under which is viewed a picture entered from the input device. The transmitting step transmits a picture entered from the input device and the viewing condition parameters entered from the first input step. The reception step receives picture data transmitted from the transmitting side and the viewing condition parameters on the transmitting side. The first transform step is responsive to the viewing condition parameters received by the reception step to convert the picture data into color appearance index data under the viewing conditions. The viewing condition parameters of viewing the picture displayed and outputted on the output device are entered from the second input steps The second transform step is responsive to the viewing condition parameters entered from the second input step to convert the index data so that the color appearance of the output picture of the output device will be coincident with the color appearance of the input picture supplied from the transmitting side input device. The output step outputs the picture data obtained from the second transform step to the output device.

For example, the transmitting side is fed from the first step with parameters of the viewing conditions under which is viewed a picture entered from a CRT monitor as the input device, such as luminance data of the surrounding light. The transmitting step transmits picture data entered from the CRT monitor as the input device and the viewing condition parameters entered from the first input step. On the reception side, the reception step receives picture data transmitted from the transmitting side and the viewing condition parameters on the transmitting side. The first transform step is responsive to the viewing condition parameters received by the reception step to convert the picture data into color appearance index data under the viewing conditions on the transmitting side. The viewing condition parameters of viewing the picture displayed and outputted on the CRT monitor as the output device are entered from the second input step. The second transform step is responsive to the viewing condition parameters entered from the second input step, such as luminance data of the surrounding light, to convert the index data so that the color appearance of the output picture of the CRT monitor as the output device will be coincident with the color appearance of the input picture supplied from the CRT monitor as the transmitting side input device. The output step outputs the picture data obtained from the second transform step to the CRT monitor as the output device.

A picture data processing apparatus according to the present invention includes first retrieval means for retrieving a profile for converting DDC picture data into DIC picture data or for converting DIC picture data into DIC picture data, second retrieval means for retrieving viewing condition parameters and rewriting means for rewriting a profile retrieved by the first retrieval means in association with the viewing condition parameters retrieved by the second retrieval means.

A picture data processing method according to the present invention includes a first retrieval step of retrieving a profile for converting DDC picture data int DIC picture data or for converting DIC picture data into DDC picture data, a second retrieval step of retrieving viewing condition parameters and a rewriting step of rewriting a profile retrieved in the first retrieval step in association with the viewing condition parameters retrieved in the second retrieval step.

A furnishing medium according to the present invention furnishes a computer program having a first retrieval step for retrieving a profile for converting DDC picture data into DIC picture data or for converting DIC picture data into DIC picture data, a second retrieval step for retrieving viewing condition parameters and a rewriting step for rewriting the profile retrieved by the first retrieval means in association with the viewing condition parameters retrieved by the second retrieval means.

In the above picture data processing apparatus, picture data processing method and furnishing medium, the profile for converting DDC picture data to DIC picture data or the profile for converting the DIC picture data to the DDC picture file is rewritten in association with the retrieved viewing condition parameters.

BRIEF DESCRIPTION OF THE DRAWINGS

FIG. 19 illustrates an illustrative example showing the contents of the ICC profile format.

BEST MODE FOR CARRYING OUT THE INVENTION

Figure 1:
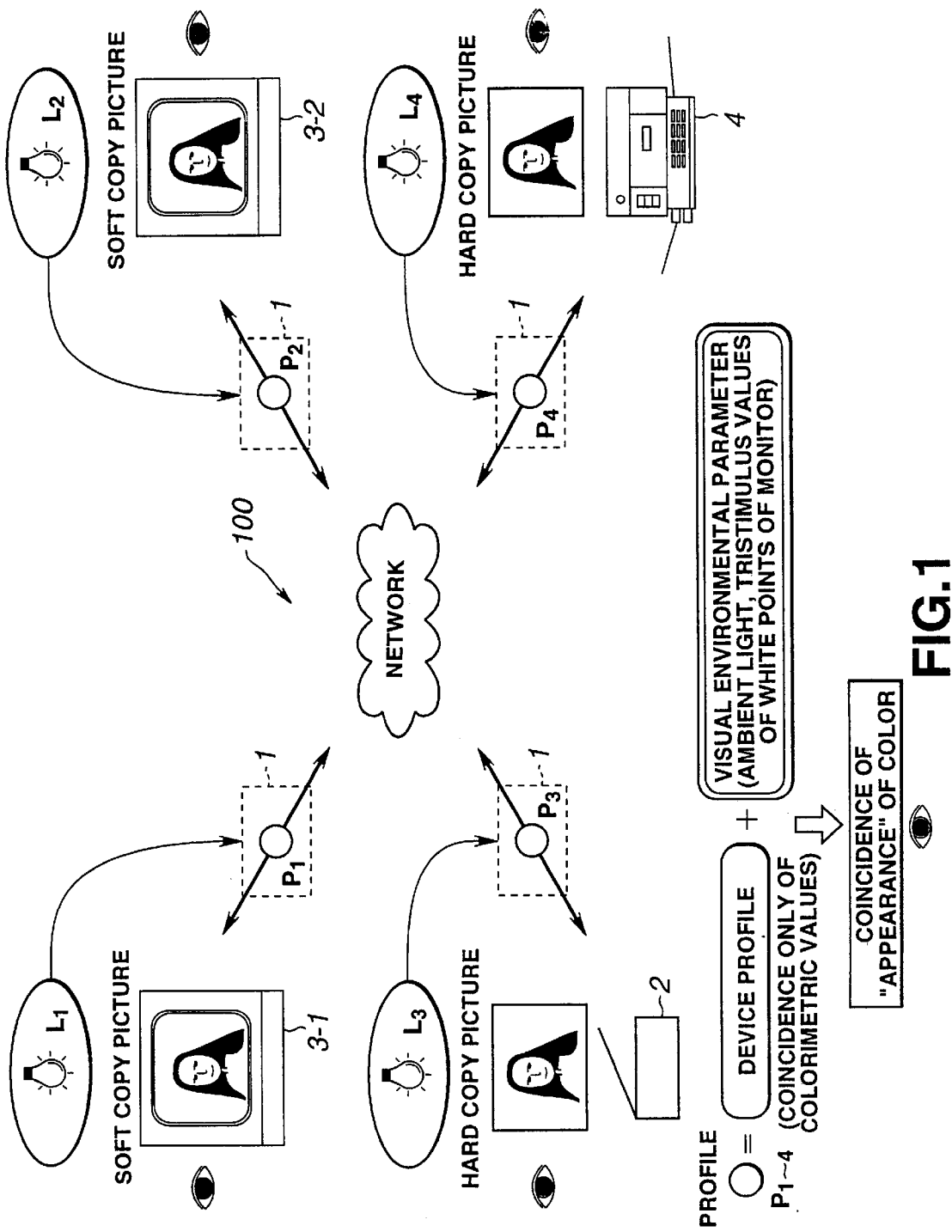
FIG. 1 illustrates schematics of the present invention.

Referring to the drawings, preferred embodiments of the present invention will be explained in detail. The present invention, however, is not limited to the illustrative embodiment hereinafter explained. Before processing to the description of these embodiments, the schematics of the present invention are explained with reference to FIG. 1.

In the present invention, the color appearance of a picture entered or outputted via CRT monitors 3-1, 3-2, scanner 2 or the printer 4, as peripheral devices of plural transmission/reception apparatus 1, interconnected over a network 100 as shown in FIG. 1, is adapted to be coincident without regard to the viewing conditions (viewing environment). That is, each transmission/reception apparatus 1 converts DDC to DIC by the enclosed profiles $P_1$ to $P_4$ in order to correct the difference in appearance ascribable to the difference in characteristics of the peripheral devices. The DICs are converted in a pre-set manner, depending on the viewing the viewing conditions, such as chromaticity of the whiteness of the surrounding light illuminated by lamps $L_1$ to $L_4$, chromaticity of the white points of the paper sheet carrying a printed hard copy picture, chromaticity of the white points of the CRT monitors 3-1, 3-2 or absolute luminance, for achieving coincident color appearance of different pictures entered to or outputted from the peripheral devices of the transmission/reception apparatus 1 interconnected via network 100.

Figure 2:
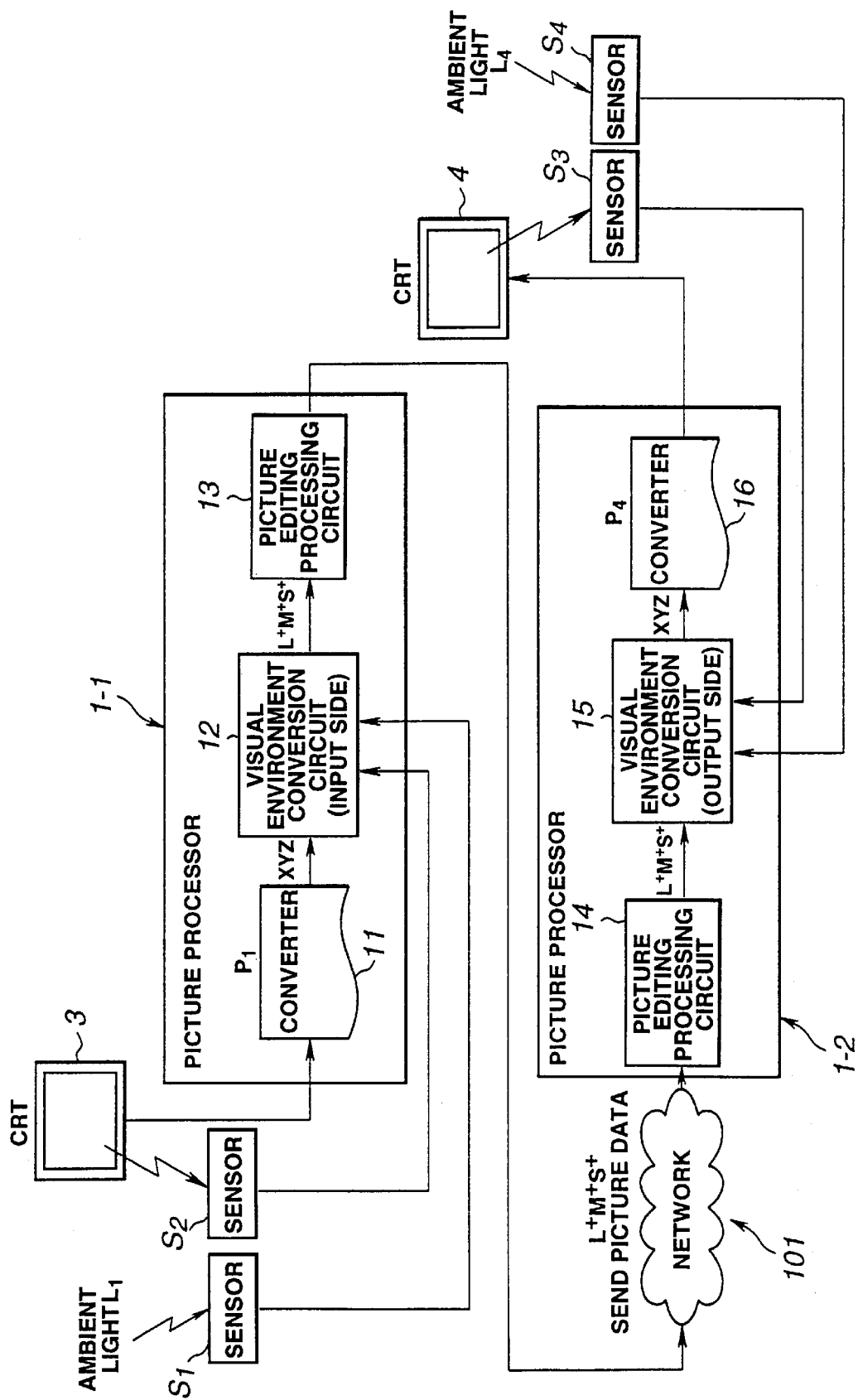
FIG. 2 is a block diagram showing the structure of a first embodiment of a transmission/reception apparatus embodying the present invention.

FIG. 2 shows a block diagram showing an illustrative structure of the first embodiment of the present invention. In this picture processing system, the CRT monitors 3, 4 are used as an input device on the transmitting side and as an output device on the reception side, respectively. Meanwhile, the system herein means an entire apparatus constituted by plural devices or means. From the CRT monitor 3 which self-emits light to display (output) a picture, that is to display a soft copy picture, the RGB data, for example, of picture data corresponding to the picture is sent to a transmission side picture processing unit 1-1. After picture processing the picture data from the CRT monitor 3 in the picture processing unit 1-1 , the picture data is sent over a network 101 to the reception side. The reception side receives picture data transmitted thereto by a picture processing unit 1-2 to process the picture to output the processed picture to the CRT monitor 4. The picture corresponding to data from the picture processing unit 1-2 is displayed and outputted on a screen of the CRT monitor 4.

The picture processing unit 1-1 is made up of a converter 11, a viewing condition conversion circuit 12 and a picture editing processing circuit 13. The converter 11 holds on memory a pe-formulated profile $P_1$ for the CRT monitor 3. Here, reference is had to this profile $P_1$ so that RGB data, for example, from the CRT monitor 3 is converted into XYZ data as DIC which is supplied to the viewing the conversion circuit 12.

The viewing condition conversion circuit 12 is fed with outputs of the sensors $S_1$ and $S_2$ in addition to the XYZ data from the converter 11. The sensors $S_1$ and $S_2$ are adapted to output viewing condition parameters as numerical values specifying the condition or environment in which the user is viewing the soft copy picture displayed on the CRT monitor 3 (viewing condition of the CRT monitor 3). That is, the sensor $S_1$, constituted by, for example, a radiation color luminance meter, measures the chromaticity, for example, of the surrounding light (such as the light of a fluorescent lamp) of the environment in which the CRT monitor 3 is put, and sends the measured value as viewing condition parameter to the viewing environment conversion circuit 12. The sensor $S_1$ is constituted by, for example, a tight contact type sensor, and measures the absolute luminance and chromaticity of white points, for example, of the self-light-emitting CRT monitor 3, to transmit the measured values as viewing condition parameters to the viewing environment conversion circuit 12.

The viewing environment conversion circuit 12 is responsive to the viewing condition parameters from the sensors $S_1$ and $S_2$ to convert the XYZ data from the converter 11 into $L^+M^+S^+$ data, which are index data of appearance corresponding to color appearance under the viewing condition of the CRT monitor 3. The $L^+M^+S^+$ data will be explained in detail subsequently.

These $L^+M^+S^+$ data are sent to the picture editing processing circuit 13 which performs picture editing processing such as gamut compression or image editing on the $L^+M^+S^+$ data sent from the viewing environment conversion circuit 12 transmitted over the network 101 to send the processed data to the network 101.

The picture processing unit 1-2 on the reception side receives picture data transmitted over the network 101 and performs the same processing as that in the picture editing processing circuit 13 by a picture editing processing circuit 14 to send the resulting data to a viewing condition conversion circuit 15 which is also supplied with output signals of the sensors $S_3$ and $S_4$ in addition to the $L^+M^+S^+$ data from the picture editing processing circuit 14. The sensor $S_3$ is adapted to output a viewing condition parameter as a numerical value of associating the soft copy picture outputted by the CRT monitor 4 (picture outputted by the CRT monitor 4) with the viewing condition by the user (viewing condition of the CRT monitor 4). That is, the sensor $S_3$ is constituted by, for example, a radiation color luminance meter, and measures the chromaticity, for example, of the surrounding light of the environment in which the CRT monitor 4 is installed, such as the light of the fluorescent lamp, and sends the measured value of the viewing condition parameter to the viewing condition conversion circuit 15. The sensor $S_4$ is constituted by, for example, a tight contact type sensor and measures the absolute luminance and chromaticity of the white point, for example, of the self-light-emitting CRT monitor 4, in order to send the measured value as the viewing condition parameters to the viewing condition conversion circuit 15.

In the viewing condition conversion circuit 15, the $L^+M^+S^+$ data from the picture editing processing circuit 14 are processed such as to achieve coincidence of color appearance under the viewing conditions of the CRT monitor 4 with that under the viewing conditions of the CRT monitor 3 depending on the viewing condition parameters from the sensor $S_3$. The data obtained by this processing are converted into XYZ data as DIC data which is supplied to the converter 16.

The converter 16 holds on memory a pe-formulated profile P4 for the CRT monitor 4. Here, reference is had to this profile P4 so that XYZ data, for example, from the viewing condition conversion circuit 15 is converted into, for example, RGB data as DDC for the CRT monitor 4. This RGB data is sent to the CRT monitor 4.

This causes the reception side CRT monitor 4 to output (display) a soft copy picture which is scarcely different in color appearance from the soft copy picture displayed on the transmitting side CRT monitor 3.

The method for formulating profiles $P_1$, P4 for the CRT monitor 3 or the CRT monitor 4 stored in the converters 11 or 16 is now explained. First, in formulating the profile for the CRT monitor 3, if each of R, G and B data of the RGB data outputted by the CRT monitor 3 is 8-bit data, rgb data, as normalised RGB data, are calculated in accordance with the equation (1):

$$r = \frac{R}{R_{max}} = \left\{ k_{r,gain}\left(\frac{dr}{255}\right) + k_{r,offset} \right\}^{\gamma_r} \quad (1)$$

$$g = \frac{G}{G_{max}} = \left\{ k_{g,gain}\left(\frac{dg}{255}\right) + k_{g,offset} \right\}^{\gamma_g}$$

$$b = \frac{B}{B_{max}} = \left\{ k_{b,gain}\left(\frac{db}{255}\right) + k_{b,offset} \right\}^{\gamma_b}$$

where $R_{max}$, $G_{max}$ and $B_{max}$ are values of R, G and B at three white points of the CRT monitor 3. On the other hand, $k_{r,gain}$, $k_{g,gain}$ and $k_{b,gain}$ are gains of R, G and B, respectively, whilst $k_{r,offset}$, $k_{g,offset}$ and $k_{b,offset}$ are offsets of R, G and B, respectively and $\gamma_r$, $\gamma_g$ and $\gamma_b$ are coefficients for gamma correction of R, G and B, respectively (gamma correction coefficients). The numerical value 255 in the equation (1) is a value corresponding to the picture data outputted by the CRT monitor 3 in case dr, db and dg are of 8 bits. If the 3; picture data outputted by the CRT monitor 3 is of n bits, the numerical value is 2n−1.

The rgb data is linearly transformed in accordance with the equation (2):

$$\begin{bmatrix} X \\ Y \\ Z \end{bmatrix} = \begin{bmatrix} X_{R,max} & X_{G,max} & X_{B,max} \\ Y_{R,max} & Y_{G,max} & Y_{B,max} \\ Z_{R,max} & Z_{G,max} & Z_{B,max} \end{bmatrix} \begin{bmatrix} r \\ g \\ b \end{bmatrix} \quad (2)$$

in order to calculate XYZ data which is the DIC data.

The matrix on the right side of the equation (2) can be calculated using, for example, the least square method, as the transformation matrix between the calorimetric values of the CRT monitor 3 and the rgb data.

The profile $P_1$ for the CRT monitor 3 is completed by stating the relation of association between XYZ data in the equation (2) and dr, dg and db in the equation (1) in the form of a table. It is possible not only to hold the profile $P_1$ for the CRT monitor 3 formulated as described above in the converter 11, but also to calculate sequentially the XYZ data from 8-bit data dr, dg and db outputted by the CRT monitor 3.

The profile P4 for the CRT monitor 4 can be generated by performing the above-described processing for the CRT monitor 4.

If the profile is to be formulated for an input/output device other than the CRT monitor, such as a printer, CMY(K) data are entered in the printer with different values, and the colors of the resulting hard copy picture are measured. The relation of association between the output RGB data and the calorimetric values are stated in a table form in order to formulate a profile for a scanner.

If the profile for the scanner is to be formulated, the scanner is caused to read a picture having a pre-set calorimetric value. In this case, the relation between the output RGB data and the colorimetric value is measured. The reflation of correspondence.between the output RGB data and the colorimetric value is stated in a table form in order to formulate the profile for the scanner.

Meanwhile, an area of the color reproducing gamut not covered by the printer is associated with the color reproducing gamut that can be expressed by the printer.

The picture processing by the viewing environment conversion circuit 12 is explained in detail. In the viewing environment conversion circuit 12, the XYZ data from the converter 11 are corrected for contrast changes due to the effect of the surrounding light. Specifically, if the luminance of the surrounding light of the environment in which the CRT monitor 3 is installed is high, the soft copy picture displayed on the CRT monitor 3 is lowered in contrast mainly because the black, that is the darkest point, becomes floated due to reflection of the ambient light incident on the tube surface of the CRT monitor 3. In general, an anti-reflection film is formed on the tube surface of the CRT monitor 3. It is noted that, as long as there exists ambient light, the black that can be displayed on the CRT monitor 3 cannot be rendered darker than its reflected light. Thus, the picture is lowered in contrast if the black is floated since the human visual system is sensitive to dark color.

In order to take the above phenomenon into account, the reflection of the surrounding light is added as offset to the light emitted by the phosphor of the CRT monitor 3, as shown in the following equation (3):

$$X'_{(CRT1)} = X_{(CRT1)} + R_{bk} \cdot X_{(Ambient1)}$$
$$Y'_{(CRT1)} = Y_{(CRT1)} + R_{bk} \cdot Y_{(Ambient1)}$$
$$Z'_{(CRT1)} = Z_{(CRT1)} + R_{bk} \cdot Z_{(Ambient1)} \quad (3)$$

in order to effect contrast correction. In the above equation $R_{bk}$ is the reflectance of the tube surface of the CRT monitor 3 and is of the order of 1 to 5%. The suffix of XYZ (CRT1) means that the value is relevant to the CRT monitor 3, while the suffix (Ambient1) denotes that the value is relevant to the surrounding light of the CRT monitor 3.

After addition of the reflection of the surrounding light by this equation (3), the resulting values are normalized so that the maximum value of Y' (CRT1) will be "100".

The viewing environment conversion circuit 12 then converts data $(X'Y'Z')_{(CRT)}$ corrected for contrast by the equation (3), into data associated with signals of the cones of the human visual system, that is LMS spatial data, in accordance with the following equation (4):

$$\begin{bmatrix} L_{(CRT1)} \\ M_{(CRT1)} \\ S_{(CRT1)} \end{bmatrix} = \begin{bmatrix} 0.38971 & 0.68898 & -0.07868 \\ -0.22981 & 1.18340 & 0.04641 \\ 0.0 & 0.0 & 1.0 \end{bmatrix} \cdot \begin{bmatrix} X'_{(CRT1)} \\ Y'_{(CRT1)} \\ Z'_{(CRT1)} \end{bmatrix} \quad (4)$$

where the matrix of the right side is a known matrix as found by experiments by the visual sense.

Meanwhile, the equation (4) uses the Hunt-Pointer-Esteves transform and transforms data having flat spectroscopic distribution $(X'Y'Z')_{(CRT)}$ into data of the cones of the human visual system. This transform equation is not limited to the equation (4).

The L, M and S data obtained by the equation (4) are associated with signals of the long, medium and short wavelengths of the human cone signals.

The L, M and S data, obtained as described above, are corrected for color adaptation in meeting with the ambient viewing condition by processing against incomplete adaptation as now explained.

The human visual system varies the sensitivity of each cone in order to render the light source white in color, in a manner comparable to white balance in a video camera. That is, the human visual system performs the processing of normalizing the output signals of the cones at a value of the white point. In the present embodiment, the normalizing processing is carried out based on the Von Kries principle of adaptation. It is noted that the white point to which the human visual system will adapts itself is corrected for color adaptation by the ambient viewing conditions by executing two processing operations, namely (1) processing against incomplete adaptation and (2) processing against mixed adaptation.

The adaptation against incomplete adaptation is the correction processing against luminance and chromaticity of the whiteness of the CRT monitor 3. Specifically, the further the chromaticity of the white point of the CRT monitor 3 from the light of D65 or E and the lower the luminance of the adaptation point, the more incomplete is the adaptation of the human visual system. Therefore, the correction in meeting with these characteristics of the visual system is performed in accordance with the following equation (5)

$$L'_{n(CRT1)} = L_{n(CRT1)}/P_L$$
$$M'_{n(CRT1)} = M_{n(CRT1)}/P_M$$
$$S'_{n(CRT1)} = S_{n(CRT1)}/P_S \quad (5)$$

This correction corrects the difference in appearance ascribable to difference in characteristics of the CRT monitor 3. In the above equation, $P_L$, $P_M$ and $P_S$ are color adaptation coefficients used in the Hunt's model, and may be found by, for example, the following equation (6):

$$P_L = (1 + Y'_{mon1}{}^{1/3} + l_E)/(1 + Y'_{mon1}{}^{1/3} + 1/l_E)$$
$$P_M = (1 + Y'_{mon1}{}^{1/3} + m_E)/(1 + Y'_{mon1}{}^{1/3} + 1/m_E)$$
$$P_S = (1 + Y'_{mon1}{}^{1/3} + S_E)/(1 + Y'_{mon1}{}^{1/3} + 1/S_E) \quad (6)$$

where $Y'_{mon1}$ (unit: cd/m$^2$) is the sum of the absolute luminance of the actual white point of the CRT monitor 3 and reflect on of the surrounding light, and $l_E$, $m_E$ and $s_E$ are defined by the following equation (7):

$$l_E = 3 \cdot L_{n(CRT1)}/(L_{n(CRT1)} + M_{n(CRT1)} + S_{n(CRT1)})$$
$$m_E = 3 \cdot M_{n(CRT1)}/(L_{n(CRT1)} + M_{n(CRT1)} + S_{n(CRT1)})$$
$$s_E = 3 \cdot S_{n(CRT1)}/(L_{n(CRT1)} + M_{n(CRT1)} + S_{n(CRT1)}) \quad (7)$$

The following table 1 shows examples of the color adaptation coefficients $P_L$, $P_M$ and $P_S$ of the actual CRT monitor 3. In the Table 1, CCT (corrected color temperature) denotes the color temperature of the white point of the CRT monitor 3. The above values are measured by the sensor $S_2$ and sent to the viewing environment conversion circuit 12 in order to calculate $L_{n'(CRT)}$, $M_{n'(CRT)}$ and $S_{n'(CRT)}$ in accordance with the equation (5).

TABLE 1

| monitor | CCT | ($P_L$, $P_M$, $P_S$) |
| --- | --- | --- |
| monitor A | = 9000K | (0.9493, 0.9740, 1.0678) |
| monitor B | = 6500K | (0.9849, 0.9920 1.0222) |

Then, correction is made for mixed adaptation (2). The mixed adaptation means partial adaptation in which, if the white point of the CRT monitor 3 differs from that of the surrounding light, the human visual system adapts itself partially to the respective white points. Specifically, in offices, fluorescent lamps having the color temperature (CCT) of approximately 4150K are used. while the color temperature of the white point of the usual CRT monitor is approximately 9300K, which is significantly different from the color temperature of the fluorescent lamps. In such case, the human visual system adapts itself partially to the two, as described above. Thus, assuming that the white point to which the human visual system adapts itself is intermediate between the two, and setting the proportion of adaptation to the white point of the CRT monitor 3 to $R_{adp}$ (adaptation ratio) and that to the white point of the surrounding light to $(1-R_{adp})$, the white point to which the human visual system adapts itself is newly defined as follows:

$$L''_{n(CRTI)} = \tag{8}$$

$$R_{adp} \cdot \left(\frac{Y'_{mon1}}{Y_{adp1}}\right)^{1/3} \cdot L'_{n(CRTI)} + (1 - R_{adp}) \cdot \left(\frac{Y_{sur1}}{Y_{adp1}}\right)^{1/3} \cdot L_{n(Ambient1)}$$

$$M''_{n(CRTI)} = R_{adp} \cdot \left(\frac{Y'_{mon1}}{Y_{adp1}}\right)^{1/3} \cdot M'_{n(CRTI)} +$$

$$(1 - R_{adp}) \cdot \left(\frac{Y_{sur1}}{Y_{adp1}}\right)^{1/3} \cdot M_{n(Ambient1)}$$

$$S''_{n(CRTI)} = R_{adp} \cdot \left(\frac{Y'_{mon1}}{Y_{adp1}}\right)^{1/3} \cdot S'_{n(CRTI)} +$$

$$(1 - R_{adp}) \cdot \left(\frac{Y_{sur1}}{Y_{adp1}}\right)^{1/3} \cdot S_{n(Ambient1)}$$

where $Y'_{mon1}$ is the sum of the absolute luminance of the white point of the CRT monitor 3 and reflection from the surrounding light and $Y_{sur1}$ is the absolute luminance of a complete diffusion reflection surface arranged substantially parallel to the display surface of the monitor. Alternatively, it may be found from the illuminance M by the room light in the normal line direction of the monitor display surface at a place proximate to the monitor display surface in accordance with the following equation (9):

$$Y_{sur} = M/\pi \tag{9}$$

Also, in the above equation (8), ($L_{n,(Ambient)}$, $M_{n(Ambient)}$ and $S_{n(Ambient)}$ represent chromaticity at the white point of the surrounding light, and can be found by transform to sensitivity of the human cones (LMS) from the tristimulus values (XYZ) using the matrix of the equation (4).

Meanwhile, $Y_{adp1}$ can be found from the following equation (10):

$$Y_{adp1} = \{R_{adp} \cdot Y'_{mon1}{}^{1/3} + (1-R_{adp}) \cdot Y_{sur1}{}^{1/3}\}^3 \tag{10}$$

where the adaptation ratio $R_{adp}$ is a coefficient assuming a pre-set real-number value between 0 and 1. If this value is 1, the human visual system adapts itself 100% to the white point of the CRT monitor 3 while it is not affected by the surrounding light. The state is conceptually equivalent to summing CIE/XYZ.

Since the luminance of the CRT 3 differs from the luminance of the surrounding light, $(Y'_{mon1}/Y_{adp1})^{1/3}$, $(Y_{sur1}/Y_{adp1})^{1/3}$, which are weighting coefficients are introduced here, as shown in the equation (8). If the luminance of the CRT monitor 3 is approximately of the same level as the luminance of the ambient light, these weighting coefficients are equal to "1".

The viewing environment conversion circuit 12 is fed whit the actual chromaticity $L_{n(CRT)}$, $M_{n(CRT)}$, $S_{n(CRT)}$ of the white point of the CRT monitor 3 in the equations (5) to (7) and the absolute luminance $Y_{mon1}$ as viewing condition parameters from the sensor $S_2$, while being fed with the absolute luminance $Y_{sur1}$ and chromaticity $L_{n(Ambient)}$, $M_{n(Ambient)}$ and $S_{n(Ambient)}$ of the white point of the surrounding light in the equation (8) as viewing condition parameters from the sensor $S_1$. The viewing environment conversion circuit 12 sequentially executes the calculations of the equations (5) to (8), using the ie viewing condition parameters sent from the sensors $S_1$ and $S_2$, in order to fin d the chromaticity $L''_{n(CRT)}$, $M''_{n(CRT)}$ and $S''_{n(CRT)}$ to which the human visual system adapts itself when observing the picture displayed on the CRT monitor 3 in the presence of the surrounding light. These chromaticity values a re hereinafter termed adaptive white points.

By substituting the chromaticity values $L''_{n(CRT)}$, $M''_{n(CRT)}$ and $S''_{n(CRT)}$ of the adaptive white point, thus found, into the Von Kries equation of adaptation, shown below, $L^+M^+S^+$ data ($L^+$, $M^+$, $S^+$), which are, as it were, index data for appearance, which reflects the color appearance when observing the soft copy picture displayed on the CRT monitor 3 in the presence of the surrounding light, can be found:

$$\begin{bmatrix} L^+ \\ M^+ \\ S^+ \end{bmatrix} = \begin{bmatrix} 1/L''_{n(CRTI)} & 0 & 0 \\ 0 & 1/M''_{n(CRTI)} & 0 \\ 0 & 0 & 1/S''_{n(CRTI)} \end{bmatrix} \begin{bmatrix} L_{(CRTI)} \\ M_{(CRTI)} \\ S_{(CRTI)} \end{bmatrix} \tag{11}$$

The viewing environment conversion circuit 12 executes the processing for incomplete adaptation and mixed adaptation in accordance with this equation (11) to correct color adaptation by the ambient viewing conditions and subsequently outputs the resulting $L^+M^+S^+$ as index data for appearance to the picture editing processing circuit 13.

The resulting $L^+M^+S^+$ data or $L^{+'}M^{+'}S^{+'}$ data are sent to the picture editing processing circuit 13 where the following processing is performed.

That is, the picture editing processing circuit 13 converts the data $L^+M^+S^+$ as appearance index data from the viewing environment conversion circuit 12 into data of the original $L^+M^+S^+$ space ($L^+$, $M^+$, $S^+$) into data of the L*a*b* space which is the visually equated space:

$$\begin{bmatrix} X^* \\ Y^* \\ Z^* \end{bmatrix}_E = 100 \cdot \begin{bmatrix} 1.91020 & -1.11212 & 0.21990 \\ 0.37095 & 0.62905 & 0.0 \\ 0.0 & 0.0 & 1.0 \end{bmatrix} \begin{bmatrix} L^+ \\ M^+ \\ S^+ \end{bmatrix} \tag{12}$$

$$L^* = 116 \cdot (Y^*/Y_0^*)^{1/3} - 16$$

$$Y^*/Y_0^* \geq 0.00856$$

$$a^* = 500\{(X^*/X_0^*)^{1/3} - (Y^*/Y_0^*)^{1/3}\}$$

$$X^*/X_0^* \geq 0.00856$$

$$Y^*/Y_0^* \geq 0.00856$$

$$b^* = 200\{(Y^*/Y_0^*)^{1/3} - (Z^*/Z_0^*)^{1/3}\}$$

$$Y^*/Y_0^* \geq 0.00856$$

$$Z^*/Z_0^* \geq 0.00856$$

where $X_0^*$, $Y_0^*$ and $Z_0^*$ are values of $X^*$, $Y^*$ and $Z^*$ at the white point and are equal to "100" in the above case.

The picture editing processing circuit 13 processes the data of the L*a*b* space, which is the visually equated space, obtained by the equation (12), with picture processing, such as gamut compression or color editing, as described above.

After picture editing processing, the picture editing processing circuit 13 converts the L*a*b*space data into the data ($L^+$, $M^+$, $S^+$) of the original ($L^+$, $M^+$, $S^+$) space, in accordance with the above equation (12), and subsequently converts the converted data into analog signals which are sent out to the network 101.

The data transmitted over the network 101 is received by the picture editing processing circuit 14 of the reception side picture processing unit 1-2 so as to be processed in the same manner as by the picture editing processing circuit 13 before being sent to the viewing condition conversion circuit 15.

The viewing condition conversion circuit 15 converts the ($L^+$, $M^+$, $S^+$) data as appearance index data ($L^+$, $M^+$, $S^+$) into data $L_{(CRT2)}$, $M_{(CRT2)}$ and $S_{(CRT2)}$, corresponding to R, G and B signals of the CRT monitor 4 into signals of human cones, in accordance with the following equation (13):

$$\begin{bmatrix} L_{(CRT2)} \\ M_{(CRT2)} \\ S_{(CRT2)} \end{bmatrix} = \begin{bmatrix} L''_{n(CRT2)} & 0 & 0 \\ 0 & M''_{n(CRT2)} & 0 \\ 0 & 0 & S''_{n(CRT2)} \end{bmatrix} \begin{bmatrix} L^+ \\ M^+ \\ S^+ \end{bmatrix} \quad (13)$$

This equation is an inverse matrix of the equation (11), while (CRT2) denotes that the data is pertinent to the reception side CRT monitor 4.

In the matrix of the right side of the equation (13), ($L''_{n(CRT2)}$, $M''_{n(CRT2)}$ and $S''_{n(CRT2)}$ can be found in accordance with the following equation (14):

$$L''_{n(CRT2)} = R_{adp} \cdot \left(\frac{Y'_{mon2}}{Y_{adp2}}\right)^{1/3} \cdot L'_{n(CRT2)} +$$
$$(1 - R_{adp}) \cdot \left(\frac{Y_{sur2}}{Y_{adp2}}\right)^{1/3} \cdot L_{n(Ambient2)}$$

$$M''_{n(CRT2)} = R_{adp} \cdot \left(\frac{Y'_{mon2}}{Y_{adp2}}\right)^{1/3} \cdot M'_{n(CRT2)} +$$
$$(1 - R_{adp}) \cdot \left(\frac{Y_{sur2}}{Y_{adp2}}\right)^{1/3} \cdot M_{n(Ambient2)}$$

$$S''_{n(CRT2)} = R_{adp} \cdot \left(\frac{Y'_{mon2}}{Y_{adp2}}\right)^{1/3} \cdot S'_{n(CRT2)} +$$
$$(1 - R_{adp}) \cdot \left(\frac{Y_{sur2}}{Y_{adp2}}\right)^{1/3} \cdot S_{n(Ambient2)}$$

(14)

where $Y'_{mon2}$ is the sum of the absolute luminance of the CRT monitor 4 and reflection of the surrounding light and $Y_{sur2}$ is the absolute luminance of the surrounding light reflected by the screen of the CRT monitor 4. $R_{adp}$ denotes the adaptation ratio which is the ratio of adaptation of the human visual system to the white point of the CRT monitor 4, and $L_{n(Ambient2)}$, $M_{n(Ambient2)}$ and $S_{n(Ambient\ 2)}$ denote the chromaticity at the white point of the surrounding light. Meanwhile, $Y_{adp2}$ can be found by the following equation (15):

$$Y_{adp2} = \{R_{adp} \cdot Y'_{mon2}{}^{1/3} + (1 - R_{adp}) \cdot Y_{sur2}{}^{1/3}\}^3 \quad (15)$$

On the other hand, ($L'_{n(CRT2)}$, $M'_{n(CRT2)}$ and $S'_{n(CRT2)}$ can be found from the following equation (16):

$$L'_{n(CRT2)} = L_{n(CRT2)}/P_L$$
$$M'_{n(CRT2)} = M_{n(CRT2)}/P_M$$
$$S'_{n(CRT2)} = S_{n(CRT2)}/P_S \quad (16)$$

wherein $p_L$, $p_M$ and $p_S$ can be found by substituting $Y_{mon2}$, obtained on adding the absolute luminance of the white point of the CRT monitor 4 detected by the sensor $S_3$ to the reflection of the surrounding light, into the following equation (17):

$$P_L = (1 + Y'_{mon2}{}^{1/3} + l_E)/(1 + Y'_{mon2}{}^{1/3} + 1/l_E)$$
$$P_M = (1 + Y'_{mon2}{}^{1/3} + m_E)/(1 + Y'_{mon2}{}^{1/3} + 1/m_E)$$
$$P_S = (1 + Y'_{mon2}{}^{1/3} + s_E)/(1 + Y'_{mon2}{}^{1/3} + 1/s_E) \quad (17)$$

where the domains $l_E$, $m_E$ and $s_E$ can be found from the following equation (18):

$$l_E = 3 \cdot L_{n(CRT2)}/(L_{n(CRT2)} + M_{n(CRT2)} + S_{n(CRT2)})$$

$$m_E = 3 \cdot M_{n(CRT2)}/(L_{n(CRT2)} + M_{n(CRT2)} + S_{n(CRT2)})$$

$$s_E = 3 \cdot S_{n(CRT2)}/(L_{n(CRT2)} + M_{n(CRT2)} + S_{n(CRT2)}) \quad (18)$$

The viewing condition conversion circuit 15 converts LMS data corresponding to the cones of the human viewing system, obtained as described above, that is the LMS spatial data, in accordance with the following equation (19):

$$\begin{bmatrix} X'_{(CRT2)} \\ Y'_{(CRT2)} \\ Z'_{(CRT2)} \end{bmatrix} = \begin{bmatrix} 1.91019 & -1.11214 & 0.20195 \\ 0.37095 & 0.62905 & 0 \\ 0 & 0 & 1.00000 \end{bmatrix} \cdot \begin{bmatrix} L_{(CRT2)} \\ M_{(CRT2)} \\ S_{(CRT2)} \end{bmatrix} \quad (19)$$

in order to calculate $X'_{(CRT2)}$, $Y'_{(CRT2)}$ and $Z'_{(CRT2)}$ which are DIC data. Meanwhile, this transform is the inverse transform equation of the equation (4).

The viewing condition conversion circuit 15 then performs the processing of correction of contrast by surrounding light in accordance with the following equation (20):

$$X_{(CRT2)} = X'_{(CRT2)} - R_{bk} \cdot X_{(Ambient2)}$$
$$Y_{(CRT2)} = Y'_{(CRT2)} - R_{bk} \cdot Y_{(Ambient2)}$$
$$Z_{(CRT2)} = Z'_{(CRT2)} - R_{bk} \cdot Z_{(Ambient2)} \quad (20)$$

That is, the data $X'_{(CRT2)}$, $Y'_{(CRT2)}$ and $Z'_{(CRT2)}$ less the surrounding light reflected by the tube surface represents data $X_{(CRT2)}$, $Y_{(CRT2)}$ and $Z_{(CRT2)}$ actually outputted to the converter 16.

The data of the XYZ space obtained by the equation (20) is outputted to the converter 16 where it is linearly transformed for conversion to RGB data in accordance with the following equation (21):

$$\begin{bmatrix} r \\ g \\ b \end{bmatrix} = \begin{bmatrix} X_{R,\max} & X_{G,\max} & X_{B,\max} \\ Y_{R,\max} & Y_{G,\max} & Y_{B,\max} \\ Z_{R,\max} & Z_{G,\max} & Z_{B,\max} \end{bmatrix}^{-1} \begin{bmatrix} X \\ Y \\ Z \end{bmatrix} \quad (21)$$

The RGB data, calculated in accordance with the above equation, is further gamma-corrected in accordance with the following equation (22):

$$dr = \frac{255}{k_{r,gain}} \cdot (r^{1/\gamma} k_{r,offset})$$

$$dg = \frac{255}{k_{g,gain}} \cdot (g^{1/\gamma} - k_{g,offset})$$

$$db = \frac{255}{k_{b,gain}} \cdot (b^{1/\gamma} - k_{b,offset}) \quad (22)$$

while being converted into data dr, dg and db that can be accommodated by the CRT monitor 4.

Meanwhile, the conversion shown in the equations (21), (22) may be executed on reading the device profile as in the case of the equations (1) and (2). The dr, dg and db data, thus obtained, are outputted to the CRT monitor 4.

Figure 3:
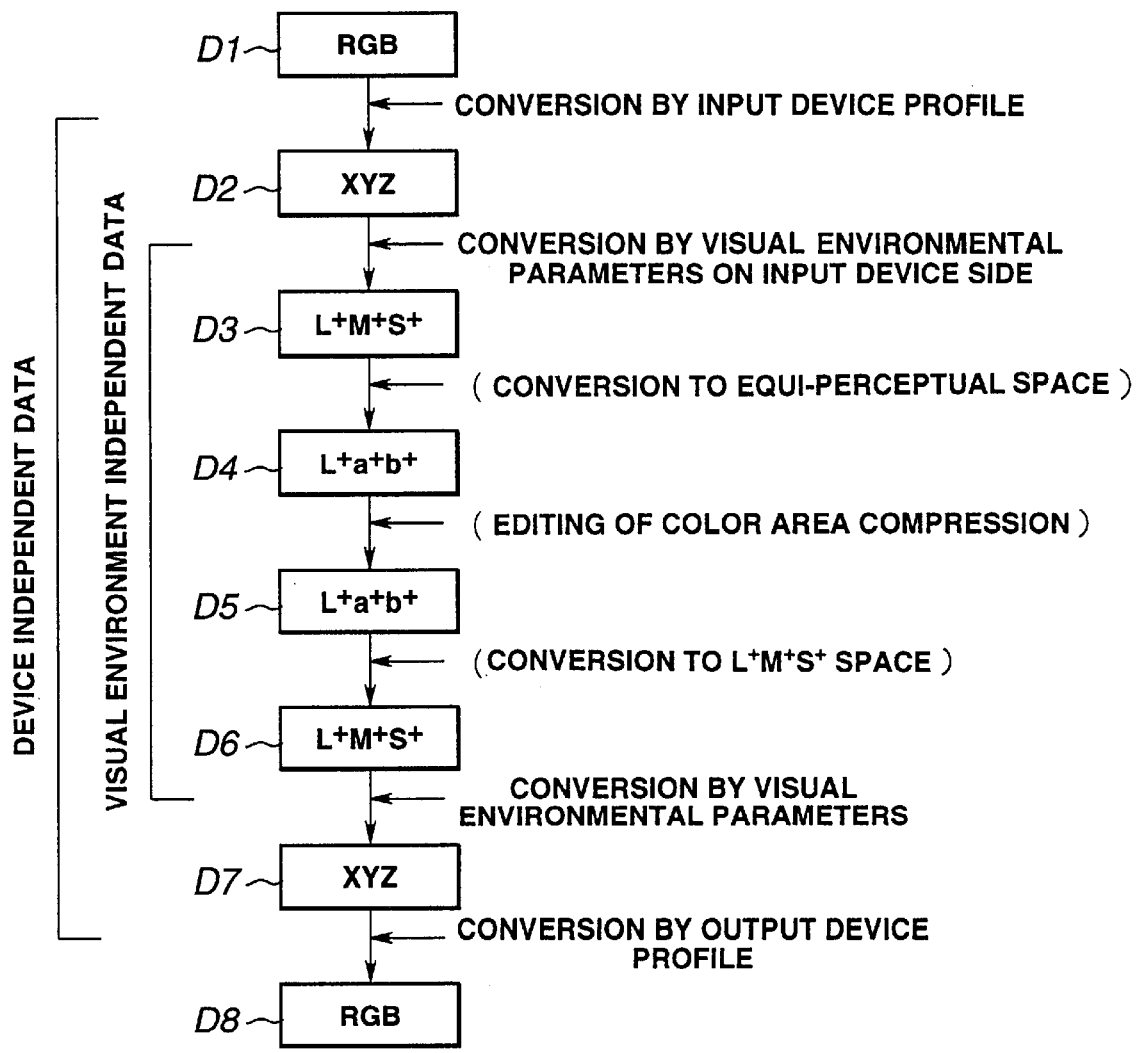
FIG. 3 illustrates the processing flow of the embodiment shown in FIG. 1.

Referring to FIG. 3, the flow of picture data in the picture processing unit having the converters 11, 16, viewing environment conversion circuits 12, 15 and the picture editing processing circuits 13, 16 is explained.

In the present embodiment, RGB data (D1) corresponding to the soft copy picture displayed on the CRT monitor 3 is converted by the profile $P_1$ of the CRT monitor 3 stored in the converter 11 into XYZ data (D2) of CIE/XYZ which is the device independent color space.

The device independent XYZ data (D2) is converted into $L^+M^+S^+$ data (D3), as appearance index data, based on parameters of the viewing condition in which the soft copy picture of the CRT monitor 3 is actually observed, that is on outputs of the sensors $S_1$ and $S_2$.

The $L^+M^+S^+$ data (D3) are converted by the picture editing processing circuit 13 into CIE/$L^*a^*b$ data (D4), which is the perceptually equated space, so as to be processed by gamut compression or color editing, if need be. The $L^*a^*b^*$ data, thus obtained, are again converted into $L^+M^+S^+$ data which is transmitted over e.g., a network to the picture processing unit 1-2 on the reception side.

The picture processing unit 1-2 on the reception side converts the received $L^+M^+S^+$ data into $L^*a^*b^*$ data (D4) and processed in the same manner as in the above-mentioned picture editing processing circuit 13. The resulting data is converted into $L^+M^+S^+$ data (D6) which is outputted to the viewing condition conversion circuit 15.

The viewing condition conversion circuit 15 refers to parameters of the viewing condition on the reception side, that is to outputs of the sensors $S_3$ and $S_4$, to convert the $L^+M^+S^+$ (D6) to device independent XYZ data (D7) CIE/XYZ which is supplied to the converter 16.

The converter 16 refers to the profile P4 for the CRT monitor 4 to convert the XYZ data (D7) to RGB data suited to the CRT monitor 4 to output the converted data to the CRT monitor 4.

The degree of actual color appearance coincidence of the soft copy picture displayed on each of the CRT monitor 3 and the CRT monitor 4 in case of changing the adaptation ratio $R_{adp}$ in the above-mentioned equations (8), (10), (14) and (15) is explained.

FIGS. 4A, 4B, 4C and 4D show an illustrative structure of a visual evaluation experiments for determining optimum adaptation ratio $R_{adp}$ in the present embodiment.

Figure 4B:
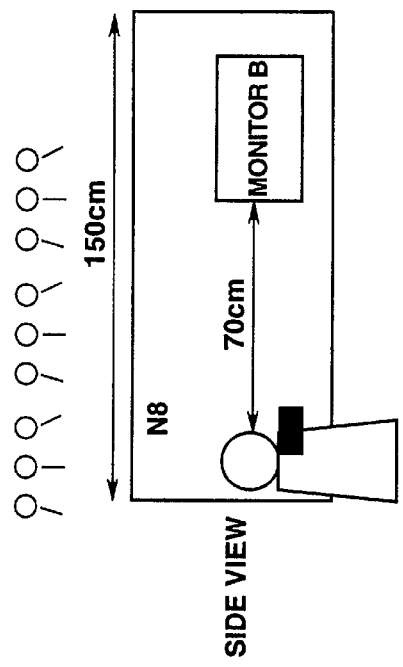
FIGS. 4A, 4B, 4C and 4D show the results of investigations and experiments on the relation between the degree of coincidence of color appearance of a soft copy picture on the transmitting side and that of a soft copy picture on the reception side in case the proportional adaptive coefficient $R_{adp}$ is hanged.
Figure 4D:
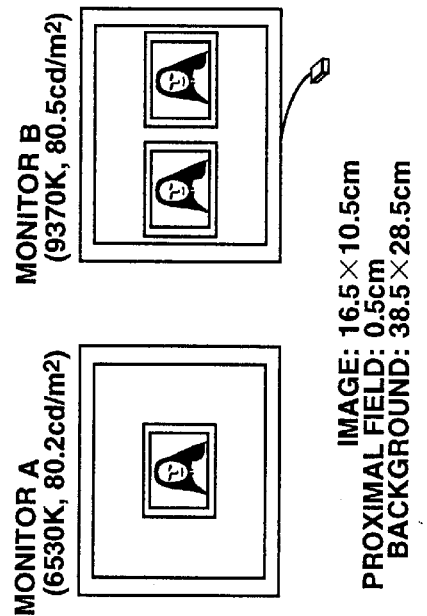
Figure 4A:
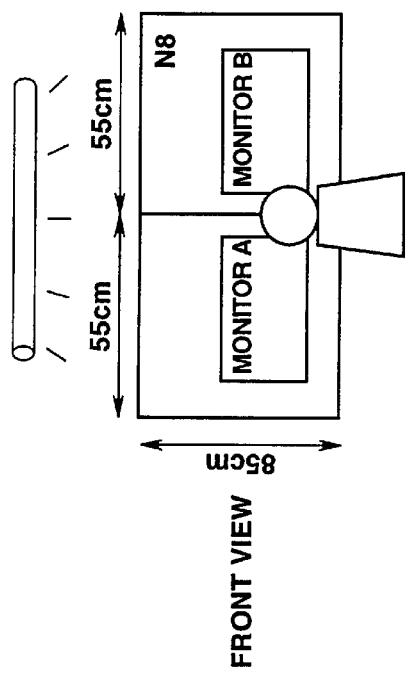
Figure 4C:
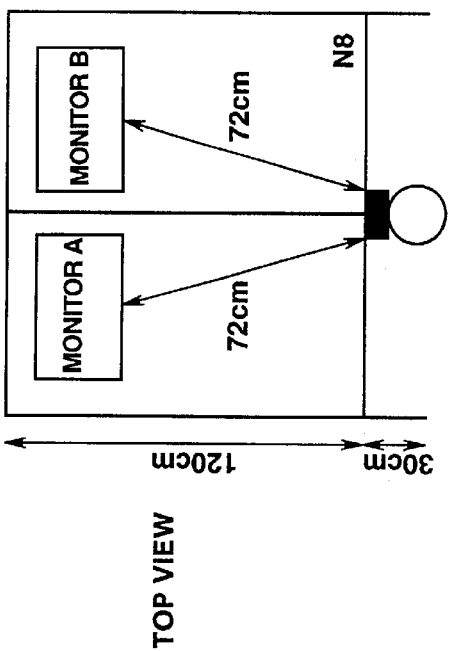

In the present embodiment, two CRT monitors A, B are placed in front of a paneller. The lateral sides excluding the upper sides, of the CRT monitors A, B, are surrounded by panel plates covered with non-colored imitation paper sheets with reflectance of 53.3% (equivalent to N8) in order to prevent colors other than those of the displayed pictures on the CRT monitors from entering the sight of view of the paneller. For enabling observation by a simultaneous haploscopic method, there is placed a panel plate between the CRT monitors A and B for separating the monitors from each other. There is also placed a base block (see FIG. 4B) for enabling both left and right eyes to view separate CRT monitors, as shown in FIG. 4C. For directing the surrounding light uniformly on the entire screens of the CRT monitors A, B, no panel plate is placed on top of the lateral sides. In the present embodiment, experiments are carried out in the present embodiment by the simultaneous haploscopic method on the basis of an assumption that both left and right eyes can cope with separate white points.

In the present visual evaluation experiments, a natural picture is displayed on the CRT monitor A of the color temperature of 6530K under a fluorescent lamp (4183K, 124 cd/m$^2$) of the daylight color (F6) as the surrounding light. Two randomly selected natural pictures with six patterns of different adaptation ratios $R_{adp}$ ($R_{adp}$=0.0, 0.2, 0.4, 0.6, 0.8 and 1.0) on the monitor B of the color temperature of 9370 K (see FIG. 4D). The paneller is called upon to judge which of the two pictures has color appearance closer to that of the picture displayed on the CRT monitor A. this judgment method is generally termed a paired comparison method.

The number of panellers in case of using the fluorescent lamp of 4183K, 124 cd/m$^2$, with two natural pictures being in use, is 31 (20 male panellers and one female paneller), while the number of panellers in case of using the fluorescent lamp of 3486K, 150 cd/m$^2$, with two natural pictures being in use, is 24 (23 male panellers and one female paneller), with two natural pictures being in use.

Figure 5:
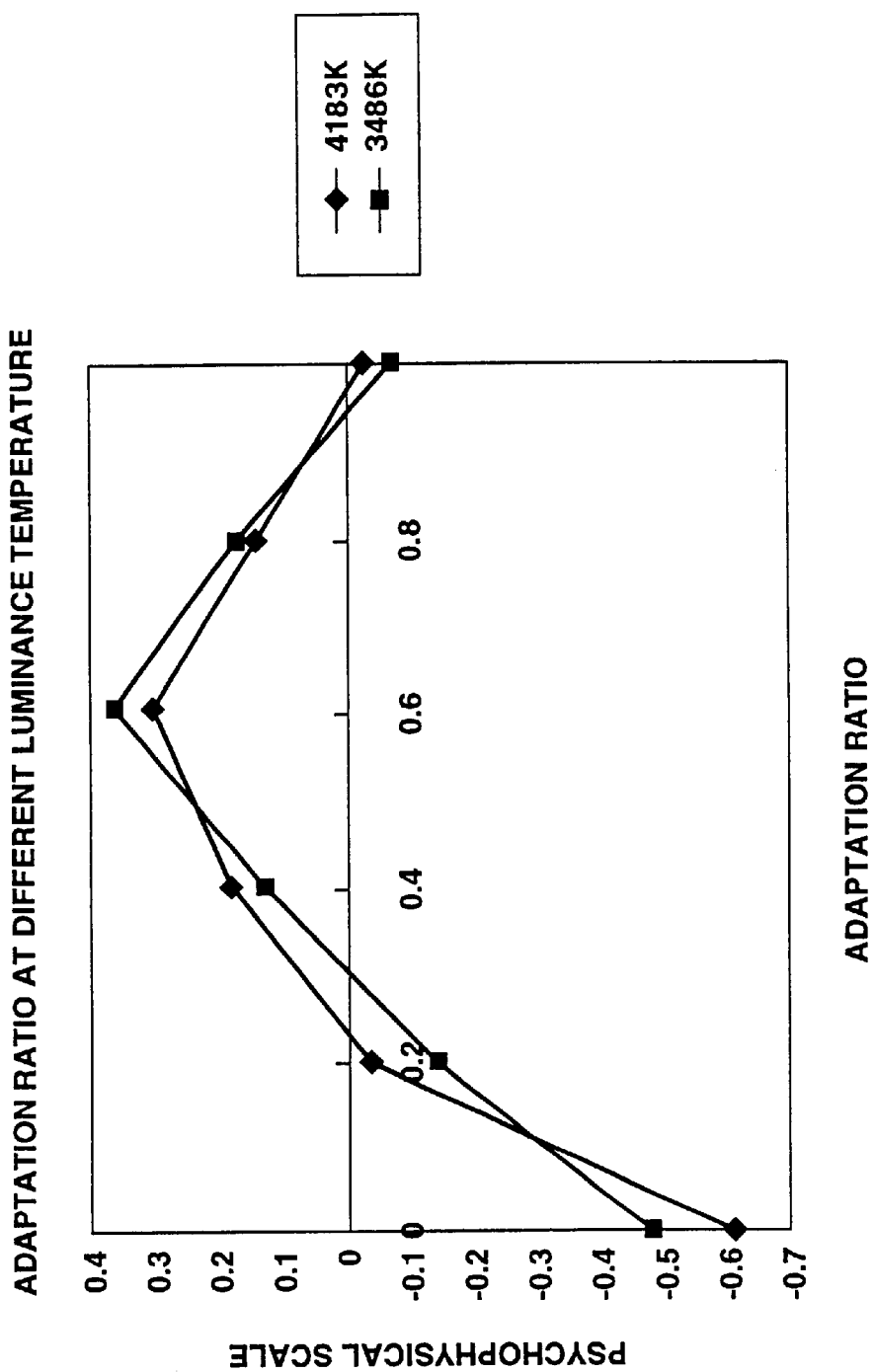
FIG. 5 shows the results of the investigations and experiments shown in FIGS. 4A and 4B.

FIG. 5 shows a graph obtained on statistically processing data obtained by the above-described visual evaluation experiment. In FIG. 5, the abscissa and the ordinate represent values of adaptation ratio $R_{adp}$ and psycho-physical values, respectively. The larger the psycho-physical values, the more the natural pictures displayed on the CRT monitor B are similar to those displayed on the CRT monitor A.

As may be seen from this graph, sufficient matching is achieved between the picture displayed on the CRT monitor A and the picture displayed on the CRT monitor B in a range of the values of the adaptation ratio $R_{adp}$ of from 0.4 to 0.7, irrespective of the surrounding light. In particular, more sufficient matching can be realized for the adaptation ratio $R_{adp}$ of 0.6. If the color temperature of the illuminating light is lowered, the gradient of curves becomes steeper, with an optimum value being 0.6.

It is seen from the above experiments that, if the adaptation ratio $R_{adp}$ of 0.6 is used, it becomes possible to minimize the difference in color appearance of the picture displayed on an output device on the reception side.

By the above embodiments, in which contrast correction or color adaptation correction is carried out depending on the viewing conditions on the transmission and reception sides when transmitting the picture information over the network 101, it becomes possible to obtain the soft copy picture of the same color appearance in each of the transmission and reception sides even if the color temperatures of the CRT monitors 3, 4 and the color temperatures of the surrounding light are not the same.

Figure 6:
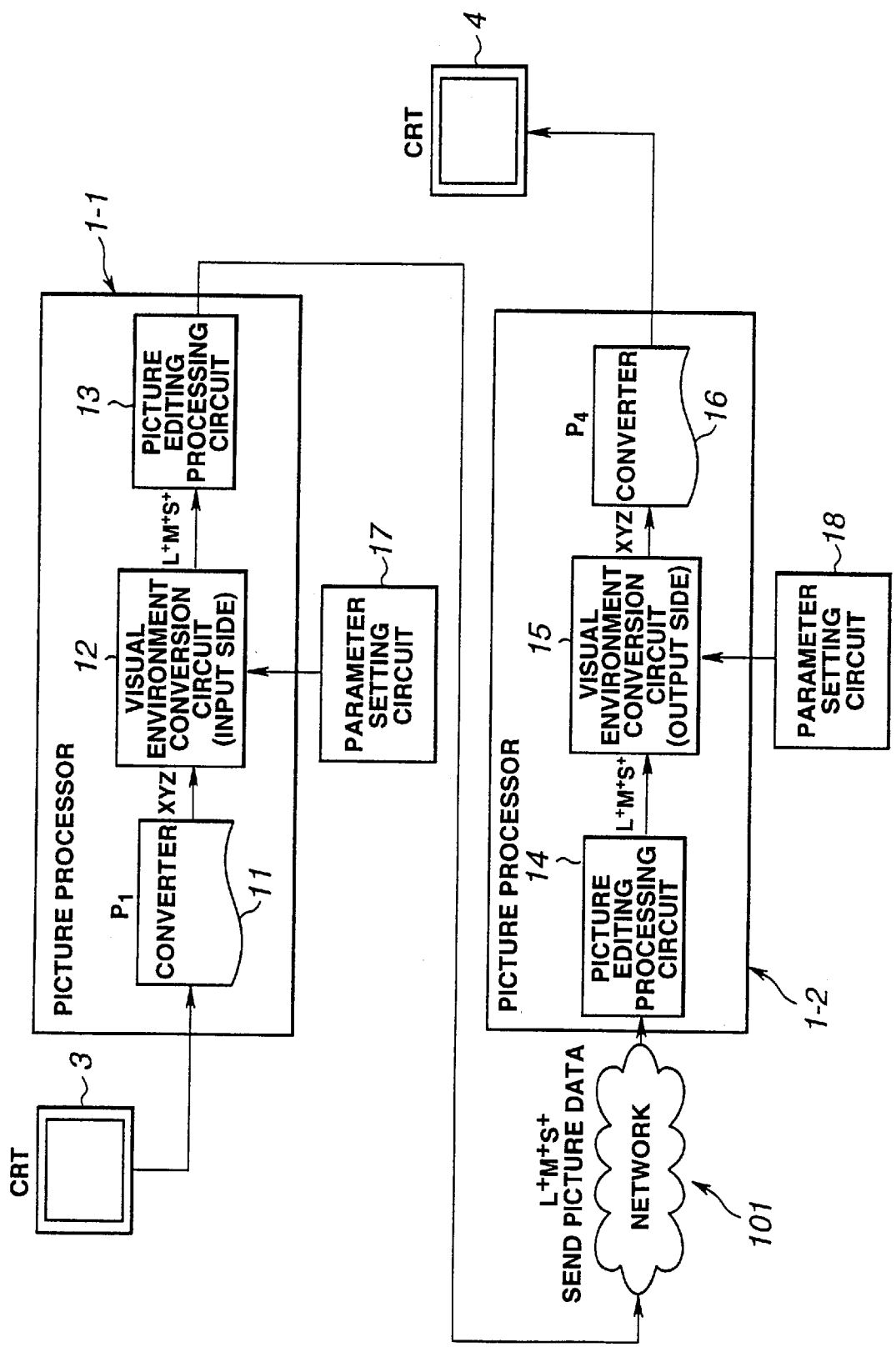
FIG. 6 is a block diagram showing an illustrative structure in case a parameter setting circuit is used in place of the sensor shown in FIG. 1.

In the above embodiments, the viewing condition parameters are acquired by the sensors $S_1$ to $S_4$. It is however possible to provide parameter setting circuits 17, 18 in each of the picture processing units 1-1, 1-2 on the transmission and reception sides, as shown in FIG. 6 in order to enable the user to operate the circuits in setting the viewing condition parameters.

Specifically, it is possible to omit the sensors $S_1$ to $S_4$ provided in the first embodiment shown in FIG. 2 to connect the parameter setting circuits 17, 18 to the picture processing units 1-1, 1-2, respectively in order for the user on the transmitting and receiving side users to set the circuits 17, 18 depending on the viewing conditions.

Figure 7:
FIG. 7 illustrates a display example of a parameter setting picture.

In addition, it is possible to display a setting picture shown for example in FIG. 7 on the CRT monitor 3 or 4 in order to enter the viewing condition parameters on these setting pictures.

Specifically, chromaticity and luminance of the room light and luminance of the CRT monitor 3 or 4 may be entered as setting items on the setting picture. As setting contents of the setting items, chromaticity and luminance of the room light or the luminance of the CRT monitor 3 or 4, for example, can be entered. As setting contents of the setting items, 'fluorescent lamps', 'incandescent lamp', 'D65', 'D50' or 'customize' (the user being able to enter the value optionally) can be selectively set. As for the luminance of the room light, 'light', 'normal', 'dark' or 'customize' (the user being able to enter the value optionally) can be selected. As for the luminance of the CRT monitors 3 or 4, 'light', 'normal', 'dark' or 'customize' (the user being able to enter the value optionally) can be selected.

If, in the setting item of 'chromaticity of room light', 'customize' is selected as the setting contents, the values of the xy chromaticity point or the correlative color temperature (CCT) can be optionally entered by the user in such items as 'chromaticity x', 'chromaticity y' or 'correlative color temperature' in FIG. 7. Similarly, if, in the setting item of 'chromaticity of room light', 'customize' is selected as the setting items 'luminance of room light' or 'monitor luminance', the values of the luminance of room light or luminance of the monitor can be entered in the associated items.

In the viewing environment conversion circuits 12, 15, parameters associated with the setting contents are stored in order to enable readout of parameters, such as xy chromaticity point, correlative chromaticity point (CCT), luminance of room light or monitor luminance associated with the contents as set on the setting picture.

In the above-described embodiment, the user can easily set the parameters, while there is no necessity of providing the sensors $S_1$ to $S_4$, the device cost can be correspondingly reduced.

Figure 8:
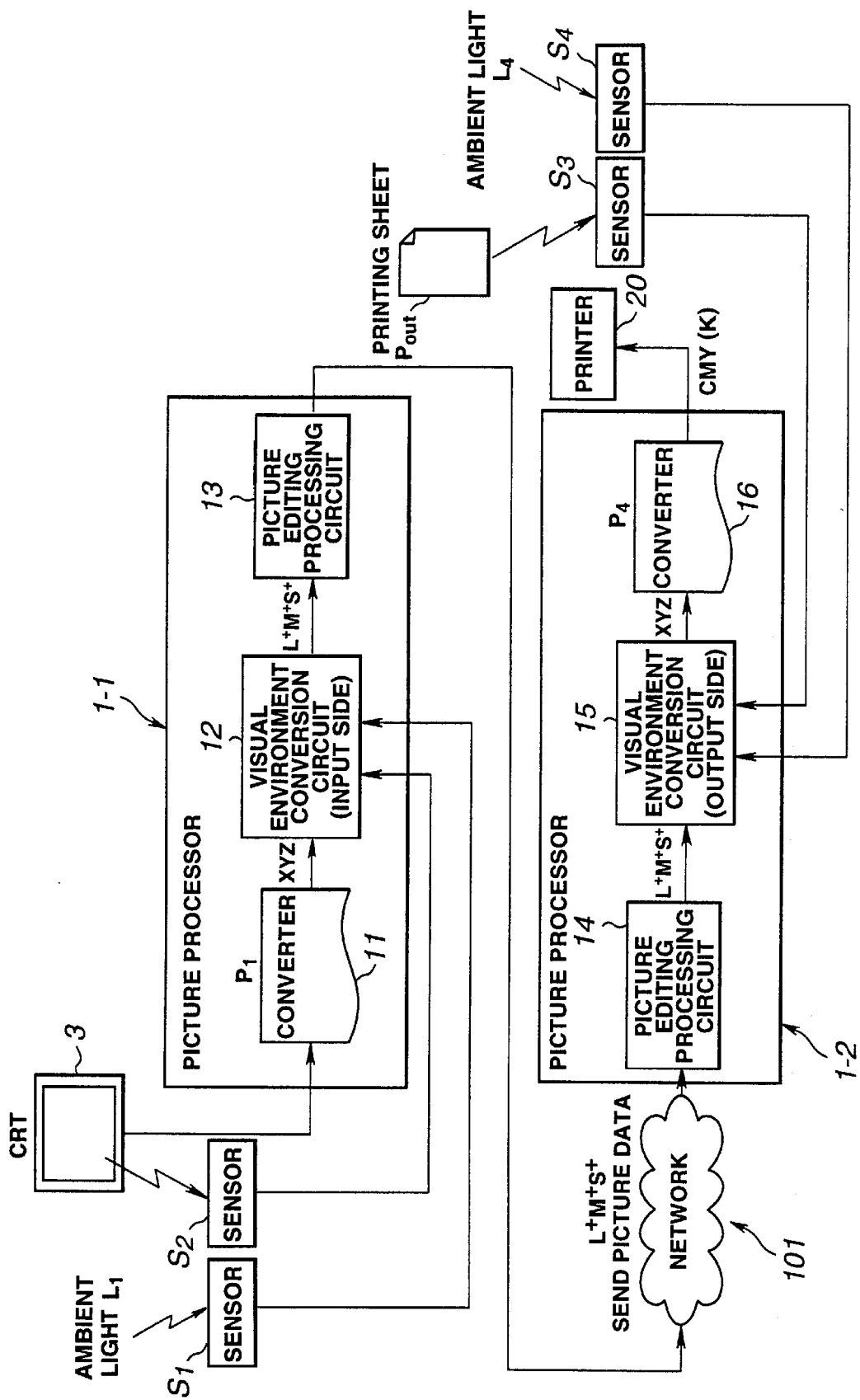
FIG. 8 is a block diagram showing a second embodiment of a transmission/reception apparatus embodying the present invention.

An illustrative structure of the present invention, shown in the block diagram of FIG. 8, is explained. In this figure, parts or components similar to those shown in FIG. 2 are denoted by the same reference numerals and are not explained specifically.

In the present embodiment, as compared to the embodiment of FIG. 2, a printer 20 is substituted for the CRT monitor 4, while the sensor S3 is adapted for measuring the chromaticity of the white point of the printing paper sheet. The present embodiment is otherwise the same in structure as the embodiment of FIG. 2.

The operation of the present embodiment is explained. Since the operation of the picture processing unit 101 in the transmission side is the same as that of FIG. 2, it is not explained specifically.

The output $L^+M^+S^+$ data, corresponding to the soft copy picture, is sent via network 101 to the picture processing unit 1-2 on the reception side.

In the picture processing unit 1-2 on the reception side receives $L^+M^+S^+$ data, sent via the network 101, is received by the picture editing processing circuit 14, which then processes the received data with gamut compression or color editing as in the first embodiment to output the resulting data to the viewing condition conversion circuit 15.

The viewing condition conversion circuit 15 is fed from the sensor $S_3$ with chromaticity values $L_{n(PRN)}$, $M_{n(PRN)}$ and $S_{n(PRN)}$ of white points of the printing paper sheet $P_{out}$, on which the printer 20 prints a picture, as viewing condition parameter. The chromaticity values $L_{n(PRN)}$, $M_{n(PRN)}$ and $S_{n(PRN)}$ of white points of the printing paper sheet $P_{out}$ are set as chromaticity values $L_{n(HardCopy)}$, $M_{n(HardCopy)}$ and $S_{n(HardCopy)}$ of the white point to which the human viewing system adapts itself when observing the hard copy picture printed on the printing paper sheet.

If the XYZ data obtained on converting CMY(K) data, which is picture data corresponding to a hard copy picture, by the profile P4 for the printer 20 stored in the converter 16, is further converted in accordance with the above equation 94), data which reflects color appearance on observing the hard copy picture outputted by the printer 20 is $L/L_{n(HardCopy)}$, $M/M_{n(HardCopy)}$, $S/S_{n(HardCopy)}$.

The viewing environment conversion circuit 12 on the transmission side effectuates picture processing, such as contrast correction taking into account reflection from the tube surface of the CRT monitor 3 or correction for color adaptation of the human visual system in case of changes in luminance of the surrounding light, as explained in connection with the first embodiment. Thus, for achieving color appearance coincidence between the soft copy picture displayed on the CRT monitor and the hard copy picture outputted by the printer 20, it suffices if the following equation (23):

$$\begin{bmatrix} L^+ \\ M^+ \\ S^+ \end{bmatrix} = \begin{bmatrix} L_{(CRTI)}/L''_{n(CRTI)} \\ M_{(CRTI)}/M''_{n(CRTI)} \\ S_{(CRTI)}/S''_{n(CRTI)} \end{bmatrix} = \begin{bmatrix} L_{(HardCopy)}/L_{n(HardCopy)} \\ M_{(HardCopy)}/M_{n(HardCopy)} \\ S_{(HardCopy)}/S_{n(HardCopy)} \end{bmatrix} \quad (23)$$

holds, since the right side of the equation (11) represents data which reflects color appearance when observing the soft copy picture.

Therefore, the received $L^+M^+S^+$ data ($L^+$, $M^+$ and $S^+$) are converted in accordance with the following equation (24):

$$\begin{bmatrix} L_{(HardCopy)} \\ M_{(HardCopy)} \\ S_{(HardCopy)} \end{bmatrix} = \begin{bmatrix} L_{n(HardCopy)} & 0 & 0 \\ 0 & M_{n(HardCopy)} & 0 \\ 0 & 0 & S_{n(HardCopy)} \end{bmatrix} \cdot \begin{bmatrix} L^+ \\ M^+ \\ S^+ \end{bmatrix} \quad (24)$$

in order to calculate LMS data.

The XYZ data as DIC can be obtained on linearly transforming the LMS data, calculated as described above, by an inverse matrix of the matrix of the right side of the equation (4). The calculated XYZ data are sent to the converter 16 where reference is had to the profile X4 and the XYZ data are converted into CMY(K) data associated with the printer 20 and the converted data is outputted to the printer 20. The printer prints a picture associated with the supplied CMY(K) data on the printing paper sheet $P_{out}$.

In the above-mentioned second embodiment, color appearance coincidence between the soft copy picture displayed on the CRT 3 and the hard copy outputted by the printer 20 can be achieved to high accuracy even in case the viewing environment (condition) of the reception side differs from that on the transmission side.

In the above-described embodiment, the chromaticity of the white point of the printing paper shee6 $P_{out}$ is detected by a sensor and correction is carried out based on the detected value. It is, however, also possible to measure the chromaticity of the surrounding light in the environment in which the hard copy picture printed on the printing paper sheet $P_{out}$ by the sensor $S_4$ as the radiation color luminance meter in place of by the sensor $S_3$ and to use the measured results as the chromaticity ($L_{n(HardCopy)}$, $M_{n(HardCopy)}$ and $S_{n(HardCopy)}$, to which the human visual system viewing the hard copy picture adapts itself.

Outputs of both the sensor $S_3$ and the sensor $S_4$ may be used instead of using an output of one of the sensors $S_3$ and S4. In this case, the chromaticity ($L_{n(HardCopy)}$, $M_{n(HardCopy)}$, and $S_{n(HardCopy)}$) of the white point, to which the human visual system viewing a hard copy picture adapts itself, is determined taking into account the viewing condition parameters in the equation (24), associated with the chromaticity of the white point of the printing paper sheet $P_{out}$ used for printing the picture by the printer 20, outputted by the sensor $S_3$, and the parameter associated with the chromaticity of the ambient light in the environment in which the hard copy picture printed on the printing paper sheet $P_{out}$, outputted by the sensor $S_4$. Since this renders it possible to produce data of higher precision, it becomes possible to realize color appearance coincidence between the soft copy picture of the CRT monitor 3 and the hard copy picture of the printer 20.

A third embodiment of the present invention is now explained.

Figure 9:
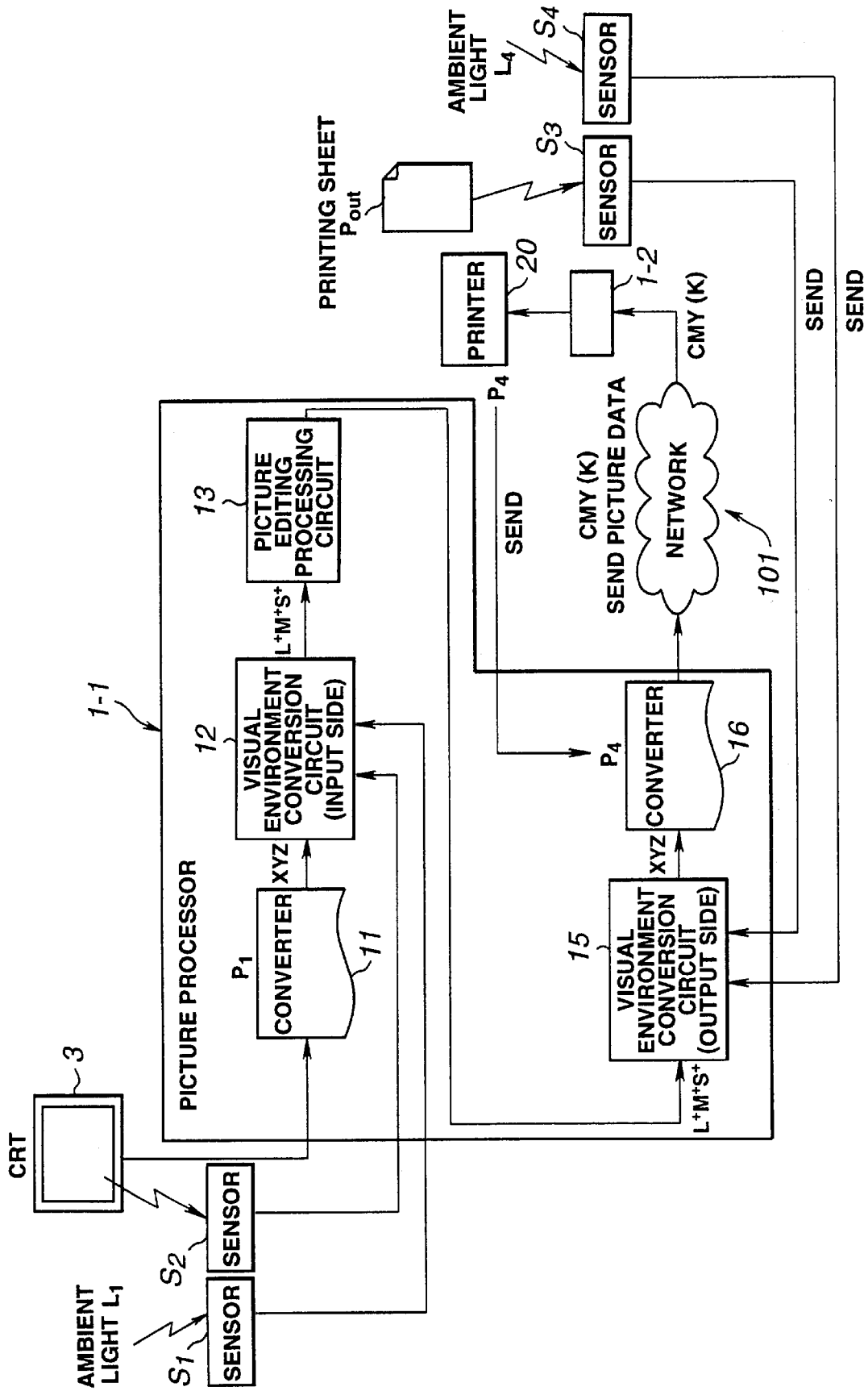
FIG. 9 is a block diagram showing a third embodiment of a transmission/reception apparatus embodying the present invention.

FIG. 9 is a block diagram showing an illustrative structure of the viewing condition conversion circuit 15 on the reception side. In this figure, parts or components similar to those of FIG. 8 (second embodiment) are depicted by the same reference numerals and are not explained specifically.

In the present embodiment, the viewing condition conversion circuit 15 and the converter 16 on the reception side are moved to the picture processing unit 1-1 of the transmission side while the picture editing processing circuit 14 on the reception side is unified in the picture editing processing circuit 13 on the transmission side. The structure of the present embodiment is otherwise the same as that shown in FIG. 8.

The operation of the present embodiment is hereinafter explained. The RGB data outputted by the transmission side CRT monitor are sent to the converter 11 where the data is converted into XYZ data as DIC before being outputted to the viewing environment conversion circuit 12.

The viewing environment conversion circuit 12 refers to outputs from the sensors $S_1$ and $S_2$ to convert the input XYZ data into $L^+M^+S^+$ data as color appearance index data under the viewing conditions of the CRT monitor 3 to output the converted data to the picture editing processing circuit 13.

Th picture editing processing circuit 13 processes the $L^+M^+S^+$ data from the viewing environment conversion circuit 12 by gamut compression or color editing to output the resulting data to the viewing condition conversion circuit 15.

The viewing condition conversion circuit 15 refers to the viewing condition parameters of the reception side sent from the reception side sensors $S_3$ and $S_4$ to convert the $L^+M^+S^+$ data outputted by the picture editing processing circuit 13 into XYZ data associated with the color appearance in the viewing conditions of the printer 20 in order to output the converted data to the converter 16.

The converter 16 receives the profile P4 for the printer 20, sent from the reception side printer 20, and has reference to this profile P4 in order to convert the XYZ data outputted by the viewing condition conversion circuit 15 into the CMY(K) data as DDC which is sent to the network 101.

The CMY(K) data, transmitted via the network 101, is supplied via picture processing unit 1-2 to the printer 20 so as to be printed on the printing paper sheet $P_{out}$.

In the above-described embodiment, in which the embodiment of FIG. 8.

The operation of the present embodiment is explained. The RGB data, outputted from the transmitting side RT monitor 3, are transmitted from the picture processing unit 1-1 to the reception side picture processing unit 1-2 over the network.

The converter 11 of the picture processing unit 1-2 on the reception side receives the RGB data transmitted via the network 101 while receiving the profile $P_1$ of the CRT monitor 3 of the transmitting side. The converter 11 refers to the profile $P_1$ to convert the RGB data into XYZ data as DIC to output the converted data to the viewing environment conversion circuit 12.

The viewing environment conversion circuit 12 refers to the detection signal transmitted from the sensors $S_1$ and $S_2$ to convert the input XYZ data into $L^+M^+S^+$ data as color appearance index data under the viewing conditions of the CRT monitor 3 on the transmitting side to output the converted data to the picture editing processing circuit 13.

The picture editing processing circuit 13 processes the $L^+M^+S^+$ data from the viewing environment conversion circuit 12 with gamut compression or color editing to output the resulting data to the viewing condition conversion circuit 15.

The viewing condition conversion circuit 15 refers to the viewing condition parameters of the reception side measured transmitting side applies transform processing in meeting with the viewing condition parameters on the transmitting side and on the reception side to picture data to send the transformed picture data over the network 101, the reception side device can be simplified in structure.

In the above-described embodiment, since outputs of the sensors $S_3$, $S_4$ and the profile P4 of the printer 20 are transmitted via a transmission medium other than the network 101, it is also possible to use the network 101 as a transmission medium.

A fourth embodiment of the present invention is now explained.

Figure 10:
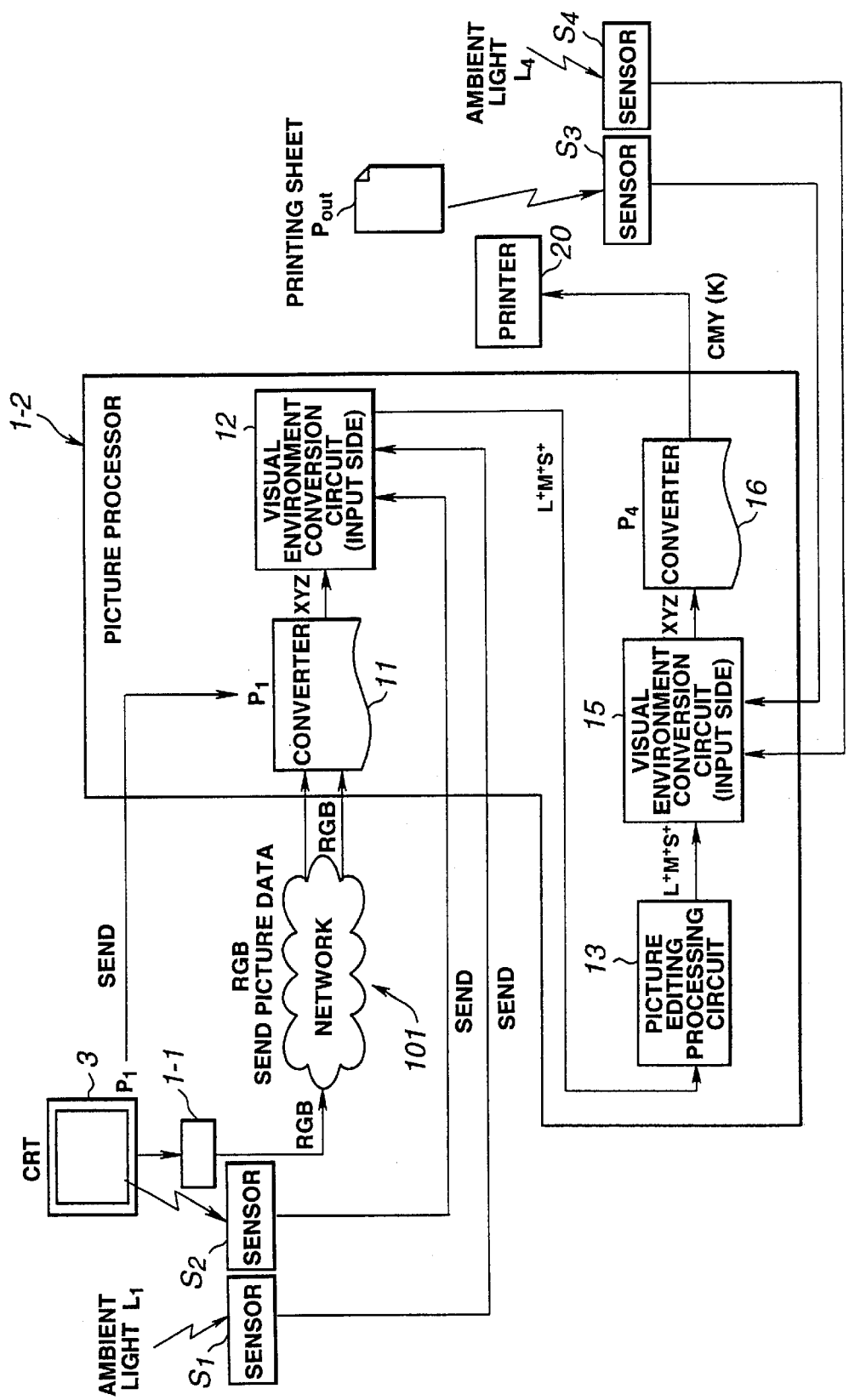
FIG. 10 is a block diagram showing a fourth embodiment of a transmission/reception apparatus embodying the present invention.

FIG. 10 shows a block diagram showing an illustrative structure of the fourth embodiment of the present invention. In FIG. 10, parts or components similar to those shown in FIG. 8 (second embodiment) are denoted by the same reference numerals and hence are not explained specifically.

In the present embodiment, conversely to the embodiment of FIG. 9, the converter 11 and the viewing environment conversion circuit 12 on the transmitting side are shifted towards the picture processing unit 1-2 on the reception side, while the picture editing processing circuit 14 on the reception side is unified in the picture editing processing circuit 13 on the transmitting side. The structure of the present embodiment is otherwise the same as that of the by the sensors $S_3$ and $S_4$ to convert the $L^+M^+S^+$ data outputted by the picture editing processing circuit 13 into data corresponding to color appearance in the viewing conditions of the printer to output the converted data to the converter 16.

The converter 16 refers to the profile P4 for the printer 20 on the reception side to convert the output XYZ data of the viewing condition conversion circuit 15 into CMY(K) data as DDC for the printer 20 to output the converted data to the printer 20.

The printer 20 prints the hard copy picture corresponding to the supplied CMY(K) data on the printing paper sheet $P_{out}$.

In the above-described embodiment, output RGB data of the CRT monitor 3 of the transmitting side is transmitted over the network 101 and converted on the reception side in meeting with the viewing condition parameters on the transmitting side so as to be outputted to the printer 20 to simplify the structure of the transmitting side.

A fifth embodiment o the present invention is explained.

Figure 11:
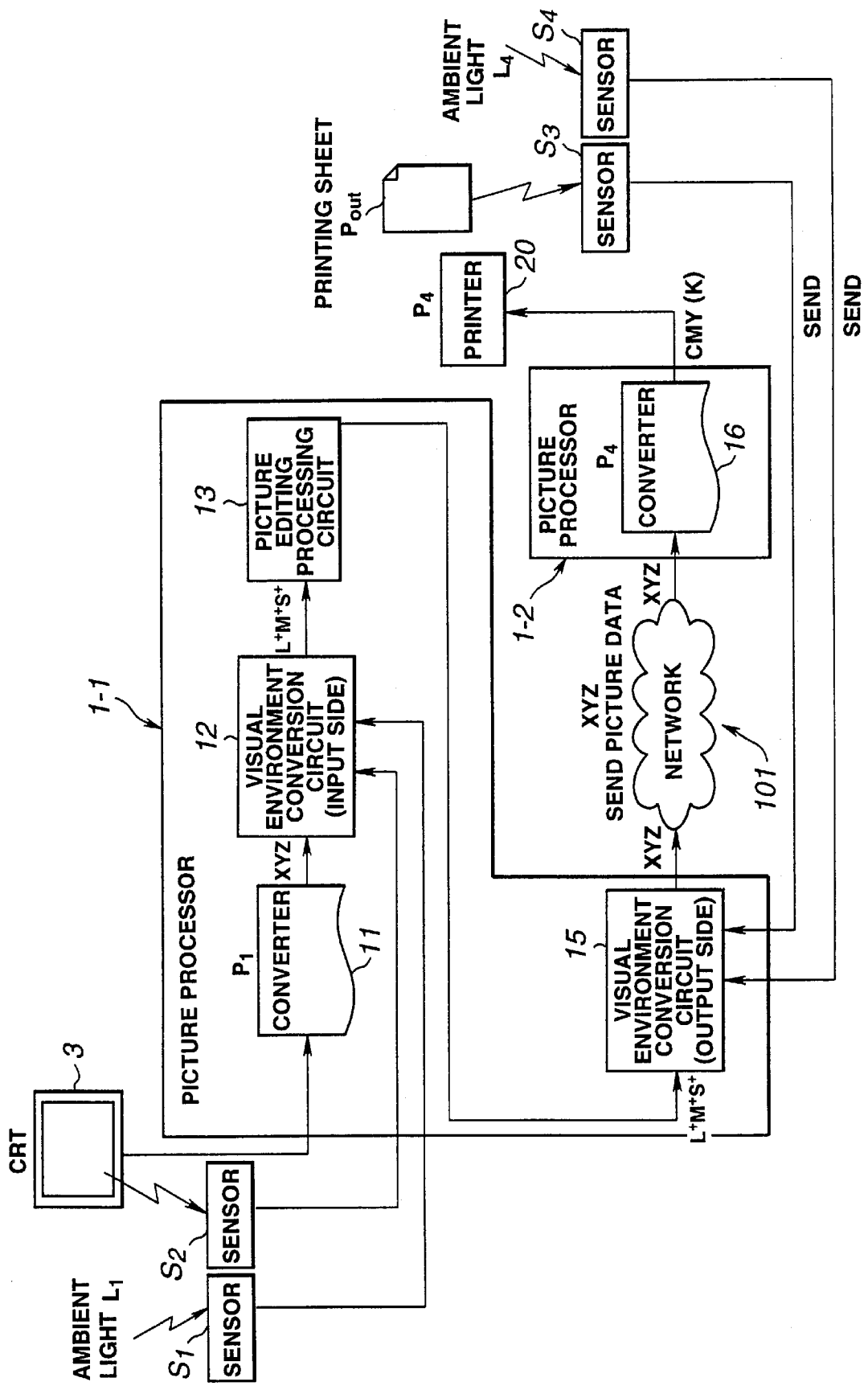
FIG. 11 is a block diagram showing a fifth embodiment of a transmission/reception apparatus embodying the present invention.

FIG. 11 shows a block diagram showing an illustrative structure of the fifth embodiment of the present invention. In FIG. 11, parts or components similar to those shown in FIG. 9 (third embodiment) are denoted by the same reference numerals and hence are not explained specifically.

In the present embodiment, as compared to the embodiment of FIG. 9, the converter 16 has been moved towards the reception side. The structure of the present embodiment is otherwise the same as that of FIG. 9.

The operation of the present embodiment is now explained. The RGB data outputted by the CRT monitor 3 on the transmitting side is sent to the converter 11 where it is converted into XYZ data as DIC which is sent to the viewing environment conversion circuit 12.

The viewing environment conversion circuit 12 refers to outputs of the sensors $S_1$ and $S_2$ to convert the input XYZ data into $L^+M^+S^+$ data as color appearance index data in the viewing condition of the CRT monitor 3 to output the converted data to the picture editing processing circuit 13.

The picture editing processing circuit 13 processes the $L^+M^+S^+$ data from the viewing environment conversion circuit 12 with gamut compression or color editing to output the resulting data to the viewing condition conversion circuit 15.

The viewing condition conversion circuit 15 refers to the viewing condition parameters on the reception side transmitted from the sensors $S_3$ and $S_4$ to convert the output $L^+M^+S^+$ data of the picture editing processing circuit 13 into XYZ data associated with the color appearance in the viewing conditions of the printer 20 to send the converted data to the reception side over the network 101.

The converter 16 of the picture processing unit 1-2 on the reception side receives the output XYZ data of the viewing condition conversion circuit 15 transmitted via the network 101 and refers to the profile P4 for the printer 20 to convert the XYZ data into CMY(K) data as DDC of the printer 20 to supply the converted data to the printer 20.

The printer 20 prints a hard copy picture corresponding to the CMY(K) data from the converter 16 on the printing paper sheet $P_{out}$ to output the printed data.

In the above-described embodiment, the XYZ data, transformed on the transmission side in meeting with the viewing condition parameters on the transmitting and receiving sides and sent out via the network 101. The transmitted data is converted on the reception side into CMY(K) data on the reception side by having reference to the printer profile P4 to render it possible to simplify the structure of the reception side device.

In the above-described embodiment, the outputs of the sensors $S_3$ and $S_4$ and the profile P4 of the printer 20 are transmitted n a transmission medium different from the network 101. However, it is of course possible to transmit the data over the network 101.

A sixth embodiment o the present invention is explained.

Figure 12:
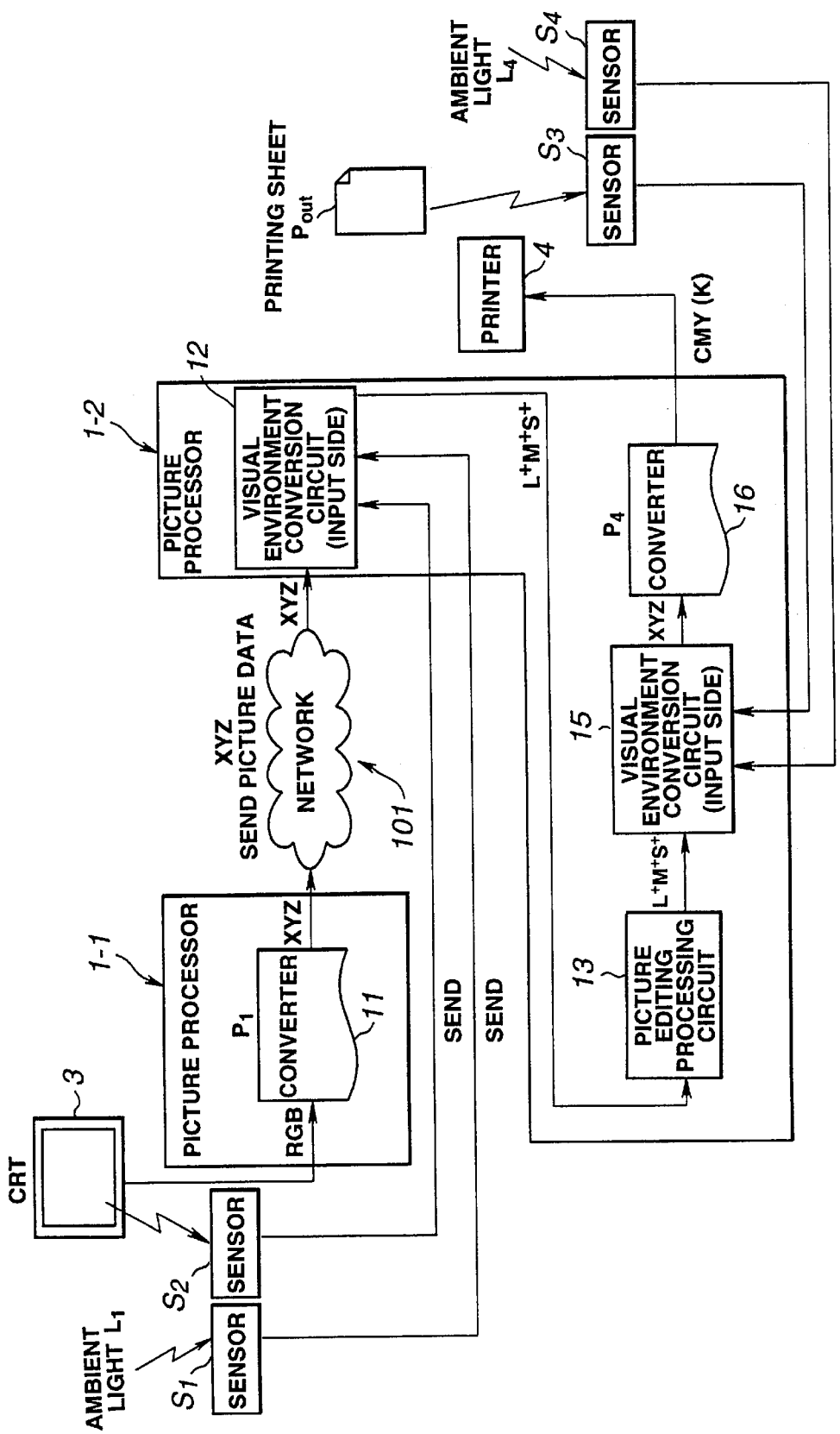
FIG. 12 is a block diagram showing a sixth embodiment of a transmission/reception apparatus embodying the present invention.

FIG. 12 shows a block diagram showing an illustrative structure of the sixth embodiment of the present invention. In FIG. 12, parts or components similar to those shown in FIG. 10 (fourth embodiment) are denoted by the same reference numerals and hence are not explained specifically.

In the present embodiment, as compared to the embodiment of FIG. 10, the converter 11 on the reception side has been moved to the transmission side. The structure of the present embodiment is otherwise the same as that of FIG. 10.

The operation of the present embodiment is now explained. The RGB data, outputted by the transmitting side CRT monitor 3, is routed to the picture processing unit 1-1 of the transmission side. The converter 11 of the picture processing unit 1-1 refers to the profile $P_1$ of the CRT monitor 3 to convert the RGB data into XYZ data as DIC to send out the converted data to the network 101.

The viewing environment conversion circuit 12 of the picture processing unit 1-2 receives the XYZ data transmitted over the network 101.

The viewing environment conversion circuit 12 on the reception 1 side refers to the detection signals of the transmission side, detected by the sensors $S_1$ and $S_2$ and transmitted thereto, to convert the input XYZ data into $L^+M^+S^+$ data as color appearance index data under the viewing conditions of the CRT monitor 3 on the transmitting side to output the converted data to the picture editing processing circuit 13.

The picture editing processing circuit 13 processes the $L^+M^+S^+$ data from the viewing environment conversion circuit 12 with gamut compression and color editing to output the resulting data to the viewing condition conversion circuit 15.

The viewing condition conversion circuit 15 refers to the reception side viewing condition parameters measured by the sensors $S_3$ and $S_4$ to convert the $L^+M^+S^+$ data outputted by the picture editing processing circuit 13 to XYZ data associated with the color appearance under the viewing conditions of the printer 20 to output the converted data to the converter 16.

The converter 16 refers to the profile P4 for the printer 20 on the reception side to convert the output XYZ data of the viewing condition conversion circuit 15 to output the converted data to the printer 20.

The printer 20 prints a hard copy picture corresponding to the supplied CMY(K) data on the printing paper sheet $P_{out}$.

In the above-described embodiment, the output RGB data from the transmitting side CRT monitor 3 is converted by the converter 11 into XYZ data which is transmitted via network 101. The transmitted data is converted on the reception side in meeting with parameters of the viewing environments of the transmitting and receiving sides and outputted to the printer 20 thus simplifying the structure of the transmitting side.

Figure 13:
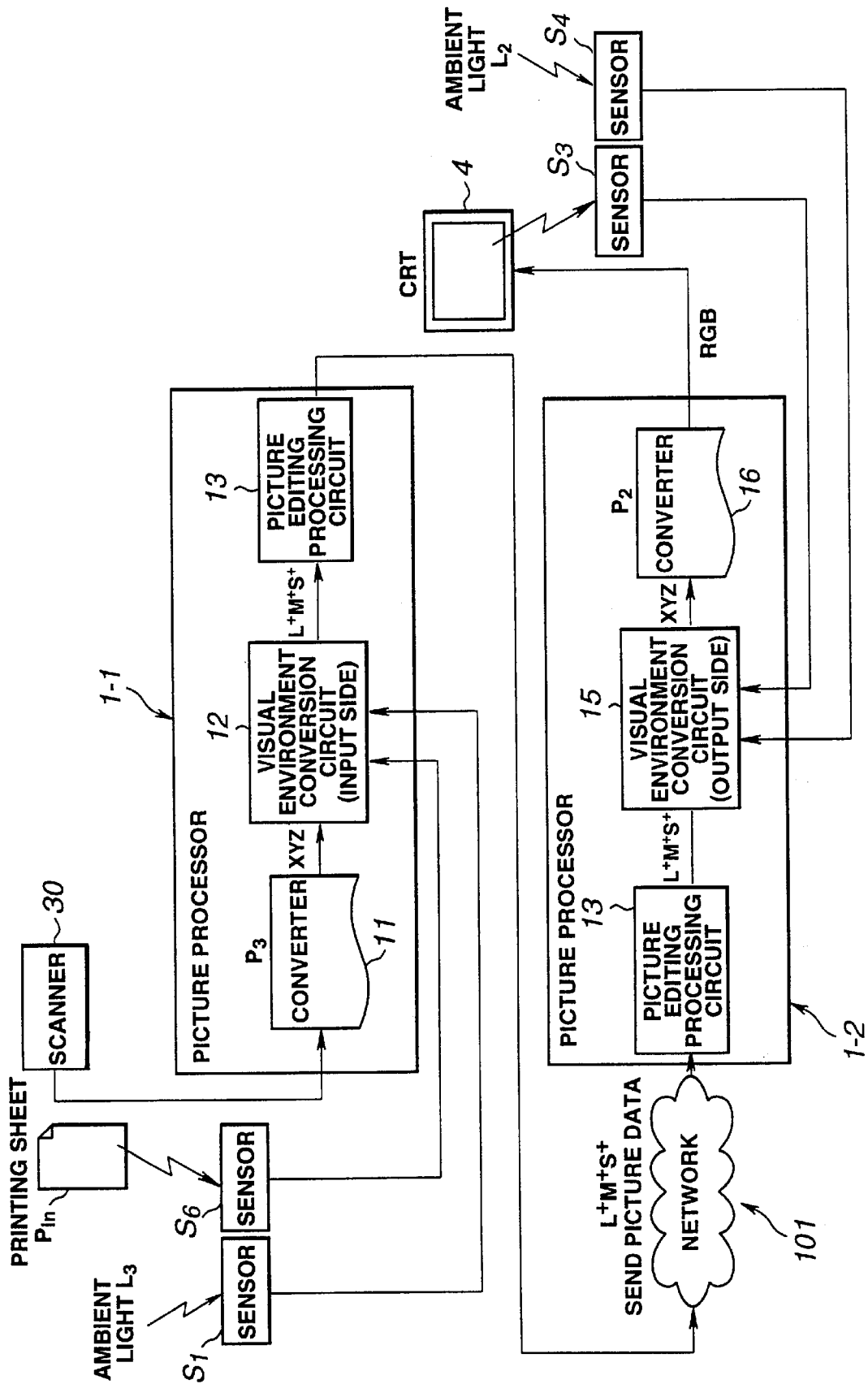
FIG. 13 is a block diagram showing a seventh embodiment of a transmission/reception apparatus embodying the present invention.

In the above-described embodiment, the CRT monitor 3 is used as an input device on the transmitting side. It is however possible to use devices other than the CR monitor 3. FIG. 13 shows an illustrative structure in which a scanner 30 is used as a transmitting side input device. In the present embodiment, parts or components similar to those of FIG. 2 are denoted by the same reference numerals and are not explained specifically.

In the present embodiment, the scanner 30 is substituted for the CRT monitor 3. This sensor S6 is comprised of, for example, an intimate contact type sensor, which is adapted for measuring the chromaticity of the white point of the printing paper sheet $P_{in}$ to input the measured value of chromaticity to the viewing environment conversion circuit 12. In the converter 11 is stored the profile $P_3$ for the scanner 30. The present embodiment is otherwise similar in structure to the embodiment of FIG. 2.

The operation of the present embodiment is hereinafter explained only briefly.

The picture data entered from the transmitting side scanner 30 is sent to the picture processing unit 1-1 on the transmitting side. The converter 11 of the picture processing unit 1-1 refers to the profile $P_3$ of the scanner 30 to convert the output RGB data of the scanner 30 into XYZ data as DIC which is outputted to the viewing environment conversion circuit 12. The viewing environment conversion circuit 12 refers to data of the viewing conditions detected by the sensors $S_1$ and $S_2$ to convert the input XYZ data to $L^+M^+S^+$ data which is the color appearance index data under the viewing conditions of the transmitting side to output the converted data to the picture editing processing circuit 13.

The picture editing processing circuit 13 processes the $L^+M^+S^+$ data from the viewing environment conversion circuit 12 with gamut compression or color editing to sed out the resulting data to the network 101.

The picture editing processing circuit 14 of the reception side picture processing unit 1-2 receives data transmitted via network 101 to execute gamut compression or color editing, if need be, as in the transmitting side, and outputs the resulting data to the viewing condition conversion circuit 15.

The viewing condition conversion circuit 15 refers to the viewing condition parameters of the viewing environment on the reception side, as measured by the sensors $S_3$ and $S_4$, and outputs the resulting data to the viewing condition conversion circuit 15.

The viewing condition conversion circuit 15 refers to the viewing condition parameters on the reception side as measured by the sensors $S_3$ and $S_4$, in order to convert the output $L^+M^+S^+$ data from the viewing condition conversion circuit 15 into RGB data as DDC of the CRT monitor 4 to output the resulting data to the CRT monitor 4.

The converter 16 refers to the profile $P_4$ for the CRT monitor 4 on the reception side to convert the XYZ data of the viewing condition conversion circuit 15 into RGB data as DDC of the CRT monitor 4 to supply the converted data to the CRT monitor 4.

The CRT monitor 4 displays and outputs the soft copy picture corresponding to the supplied RGB data.

In the above-described embodiment, it is possible to achieve color appearance of a picture printed on the printing paper sheet $P_{in}$ on the transmitting side and that of a picture displayed on the CRT monitor 4 on the reception side when the picture is read by the scanner 30 and transmitted to the reception side.

In the above-described embodiment the input picture data is converted in the viewing environment conversion circuit 12 into viewing environment independent $L^+M^+S^+$ data. This $L^+M^+S^+$ data may further be converted into the CIE/Lab form data. An illustrative processing operation in this case is now explained.

First, the $L^{++}S^+$ data is converted into CIE/XYZ form data in accordance with the following equation (25):

$$\begin{bmatrix} X^+ \\ Y^+ \\ Z^+ \end{bmatrix} = \begin{bmatrix} 1.91019 & -1.11214 & 0.20195 \\ 0.37095 & 0.62905 & 0 \\ 0 & 0 & 1.00000 \end{bmatrix} \cdot \begin{bmatrix} L^+ \\ M^+ \\ S^+ \end{bmatrix} \quad (25)$$

This CIE/XYZ form data is termed (X', Y', Z').

The (X', Y', Z') data is converted into the CIE/Lab form in accordance with the following equation (26):

$$L^+ = 116 f(Y^+/100) - 16$$

$$a^+ = 500 \{f(Y^+/100) - f(Z^+/100)\}$$

$$b^+ = 200 \{f(Y^+/100) - f(Z^+/100)\} \quad (26)$$

to produce $(L^+, a^+, b^+)$. In the above equation, f( ) is a function defined by the following equation (27):

$$f(r) = r^{1/3} (r > 0.008856)$$

$$f(r) = 7.787 r + 16/116 (r \le 0.008856) \quad (27)$$

such that it is given a value which is varied with a magnitude in parentheses.

By the above processing, $(L^+, M^+, S^+)$ data can be converted to data $(L^+, a^+, b^+)$.

Conversely, the $(L^+, a^+, b^+)$ data can be converted into $(L^+, M^+, S^+)$ data by the following processing:

That is, the $(L^+, M^+, S^+)$ data is first converted to $(X^+, Y^+, Z^+)$ data in accordance with the following equation (28):

$$X^+ = 100 f x^3 \quad fx > 0.2069 \quad (28)$$
$$X^+ = 100(fx - 16/116)/7.787 \quad fx \le 0.2069$$
$$Y^+ = 100 f y^3 \quad fy > 0.2069$$
$$Y^+ = 100(fy - 16/116)/7.787 f \quad fy \le 0.2069$$
$$Z^+ = 100 f z^3 \quad fz > 0.2069$$
$$Z^+ = 100(fz - 16/116)/7.787 \quad fz \le 0.2069$$

where fy, fx and fz are defined in accordance with the following equation (29):

$$fy = (L^+ + 16)/116$$

$$fx = fy + a^+/500$$

$$fz = fy - b^+/200 \quad (29)$$

Next, the (X', Y', Z') data, obtained by the above processing, can be converted into $(L^+, M^+, S^+)$ data in accordance with the following equation (30):

$$\begin{bmatrix} L^+ \\ M^+ \\ S^+ \end{bmatrix} = \begin{bmatrix} 0.38971 & 0.68898 & -0.07868 \\ -0.22981 & 1.18340 & 0.04641 \\ 0.0 & 0.0 & 1.0 \end{bmatrix} \cdot \begin{bmatrix} X^+ \\ Y^+ \\ Z^+ \end{bmatrix} \quad (30)$$

By the above processing, the $(L^+, M^+, S^+)$ data can be converted into generally employed $(L^+, a^+, b^+)$ data, while conversely the $(L^+, a^+, b^+)$ data can be converted to the $(L^+, M^+, S^+)$ data, so that, by simply making slight changes in the usual picture processing device, such a system can be constructed in which the color appearance is not changed with the viewing conditions.

Finally, an embodiment of the present invention is explained in which the hardware for implementing the transmission/reception apparatus 1 interconnected over the network 100. Meanwhile, the transmission/reception apparatus 1 is not limited to that shown in the present embodiment. That is, the apparatus 1 can be designed as an analog circuit or a digital circuit, such as TTL, PLD or a gate array, without employing a software, such as a computer, provided that the apparatus used can transform pictures in a pre-set manner and can transmit picture data.

Figure 14:
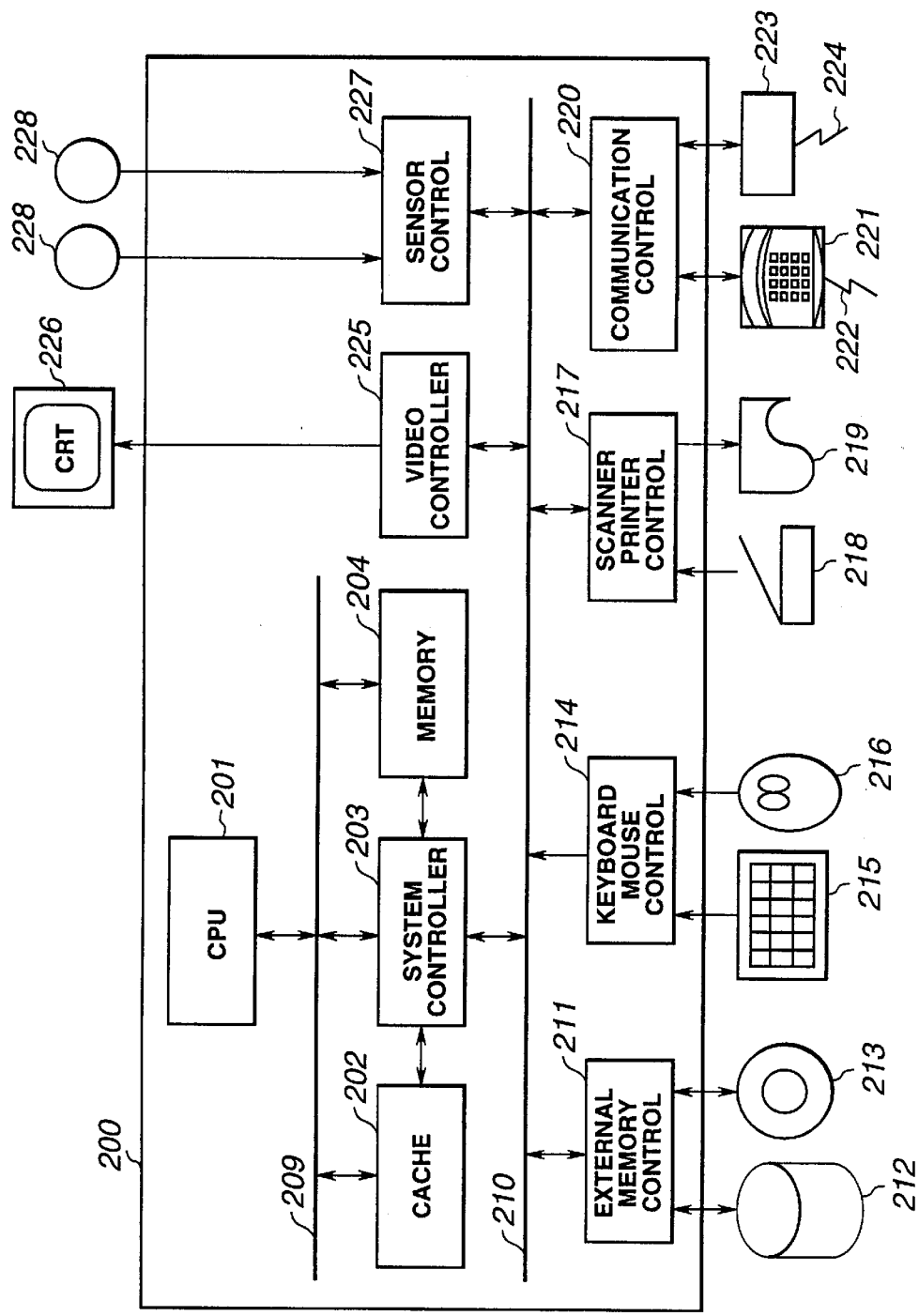
FIG. 14 is a block diagram showing an illustrative structure of a computer implementing a transmission/reception apparatus of the present invention.

FIG. 14 shows a block diagram of an illustrative structure by a computer 200 as an embodiment for implementing the transmission/reception apparatus 1 of the present invention. This computer 200 is comprised of a commercial computer having sensors or communication means annexed thereto for carrying out the present invention.

A CPU 201 has the function of controlling the entire apparatus and performing processing operations, and may, for example, Pentium by Intel. A cache 202 is a high-speed memory for storing the information in the memory for a CPU to have access frequently. The information can be directly exchanged between the cache 202 and the CPU 201 for expediting the system operation.

A system controller 203 is a circuit for timing adjustment, for example, between the CPU 201, cache 202, a memory 204, a computer bus 209 and a PCI bus 210, and may, for example, be TRITON (430FX) by Intel.

The memory 204 is a storage portion for writing or reading out the information under commands by the CPU 201 or the system controller 203 and may, for example, be comprised of a dynamic random access memory (DRAM). The memory 204 is connected to the CPU 201 or to various resources on the computer bus 209 to enable information storage. Of course, the memory can store the above-mentioned picture data.

The computer bus 209 represents information transmitting means directly connected to the CPU 201, and can exchange the information promptly with the cache 202 or the system controller 203. The PCI bus 210 is information transmission means isolated from the computer bus 209 and is connected to the system controller 203. The CPU 201 can access various resources connected to the PCI bus 210 via system controller 203.

An external storage controller 211 controls information writing and readout for an area in a hard disc 212 or a disc loaded on CD-ROM drive 213 based on an information accessing request over PCI bus 213. For this connection, SCSI or IEEE1394 is used. the external memory may be such a recording medium that can be written and dismounted, such as a floppy disc or a magneto-optical disc, without being limited to the hard disc 212 or the CD-ROM drive 213. In this case, data for carrying out the present invention, such as picture data for carrying out the above conversion, viewing condition parameters or the appearance index data, may be stored in the recording medium and transported in place of performing the above-mentioned transmission and reception.

A keyboard mouse controller 214 includes a keyboard 215 and a mouse 216, as a pointing device, connected to the PCI bus 210, and operates so that the mouse movement or operation by the user will be transmitted to the CPU201 in accordance with a pre-set sequence. Thus, the CPU 201 can accept the input information from the user as a pointer displayed simultaneously with the picture displayed on a CRT (cathode ray tube) monitor 226 via a video controller 225 is relatively moved. Of course, the input information may be entered on the above-mentioned setting picture.

A scanner printer controller 217 is connected to the PCI bus 210, scanner 218 and the printer 219, and effectuates writing/readout control based on an information access request over the PCI bus 210. This connection is usually that by SCSI or IEEE1394. The information that can be exchanged includes the information on device characteristics stored by the scanner 218 or the printer 219 used for the above-mentioned DIC or DDC in addition to the information that is read out and entered optically or the information that is printed and outputted.

An communication controller 220 is connected to a telephone network 222 via a modem 221 or to a network 224, such as IEEE802.3 (Ethernet), FDDI, ATM or IEEE1394, via a network communication equipment 223, and controls information access request over PCI bus 210 or information access request from a destination of communication. It is of course possible to transmit or receive data necessary for carrying out the present invention, such as picture data for the above conversion viewing condition parameter-s or appearance index data.

A video controller 225 is connected to the PCI bus 210 and operates under commands by the CPU 201 in order to draw the information, such as a picture, figure or letters on a video memory, not shown, in the video controller 225 to display the contents on a CRT monitor 226. Of course, the above-mentioned picture data can be stored in a video memory in the video controller 225. The information on device characteristics stored in the CRT monitor 226, such as VESA DDC (display data channel) can also be exchanged between the video controller 225 and the CRT monitor 226.

The CRT monitor 226 is connected to the video controller 225 and operates under commands of the CPU 201 to display the picture drawn by the video controller 225. Of course, display devices other than the CRT monitors, such as plasma display panel (PDP) or liquid display panels, may be used. In the present invention, the CRT monitor 226 has the role of displaying a soft copy picture in cooperation with the video controller 225, and performs the function as an input device on the transmitting side for a picture observed by the user and as an output device for a picture observed by the user on the reception side.

A sensor controller 227 is connected to the PCI bus 210 and to a variety of sensors 228 and operates for detecting physical quantities, such as voltage, temperature or lightness under commands by the CPU 201. In particular, in the present embodiment, the sensor controller 227 performs the role as a sensor for measuring the viewing condition parameters and can detect chromaticity of the surrounding light and chromaticity and absolute luminance of the CRT monitor 226.

In the above-described embodiment of the transmission/reeption apparatus 1 according to the present invention, the hardware is constituted by the computer 200. If the transmission/reeption apparatus 1 of the present invention is implemented by a computer, the various parts of the computer 200 and peripheral devices act in concert in accordance with the program software so that the various portions of the computer 200 and the peripheral devices take charge of the above means and circuits.

For example, the role of the CRT monitor 3 as an input device on the transmitting side and the CRT monitor 4 as an output device on the reception side in the first embodiment shown for example in FIG. 2 is performed mainly by the video controller 225 and by the CRT monitor 226. The role of the converters 11, 16, which refer to the profiles of the CRT monitors 3, 4 to effect conversion of the RGB picture data to XYZ picture data or vice versa, is performed mainly by the memory 204 for storing the profile of the CRT monitor 226 or picture data and by the CPU 201 which effectuates the conversion processing.

Since the viewing environment conversion circuit 12 and the viewing condition conversion circuit 15, which convert the XYZ picture data to $L^+M^+S^+$ picture data or vice versa responsive to the viewing condition parameters from the sensors $S_1$, $S_2$, $S_3$ and $S_4$, the sensor controller 227 and the CPU 201 mainly perform the role of retrieving the viewing condition parameters from the sensors, while the memory 204 and the CPU 201 mainly perform the role of carrying out calculations for transform processing. Since the picture editing processing circuits 12, 14 perform picture editing such as gamut compression or color editing, the memory 204 and the CPU 201 mainly perform the role of carrying out calculations for transform processing, while transmission and reception for the network 101 in the picture processing unit 1-1 and the picture processing unit 1-2 are controlled by the memory 204 storing the data and the communication controller 220.

Of course, program execution on the CPU 201 participates in the control of role sharing described above.

By implementing various illustrative structures of the above-described embodiments of the present invention on the above-described hardware, it becomes possible to construct a system in which color appearance is not varied with the viewing conditions as contemplated by the present invention. Of course, any suitable structure capable of executing calculations for pre-set picture conversion and of transmitting or receiving picture data, such as a structure including an analog circuit, including a transistor or an operational amplifier, or a digital circuit including a TTL, PLD or a gate array, may be used in place of the above-described embodiment.

Meanwhile, the majority of the currently marketed CMS is that prescribed by International Color Consortium (ICC). By this CMS, conversion processing is executed on the basis of the device profile. Although the CMS which enables color appearance coincidence can be implemented by newly constructing a unique system, it becomes impossible to realize compatibility with the CMS of the pre-existing ICC. That is, the pre-existing resources cannot be exploited effectively. In the following, a system in which coincidence of color appearance is realized by exploiting the CMS of the pre-existing ICC is explained.

Figure 15:
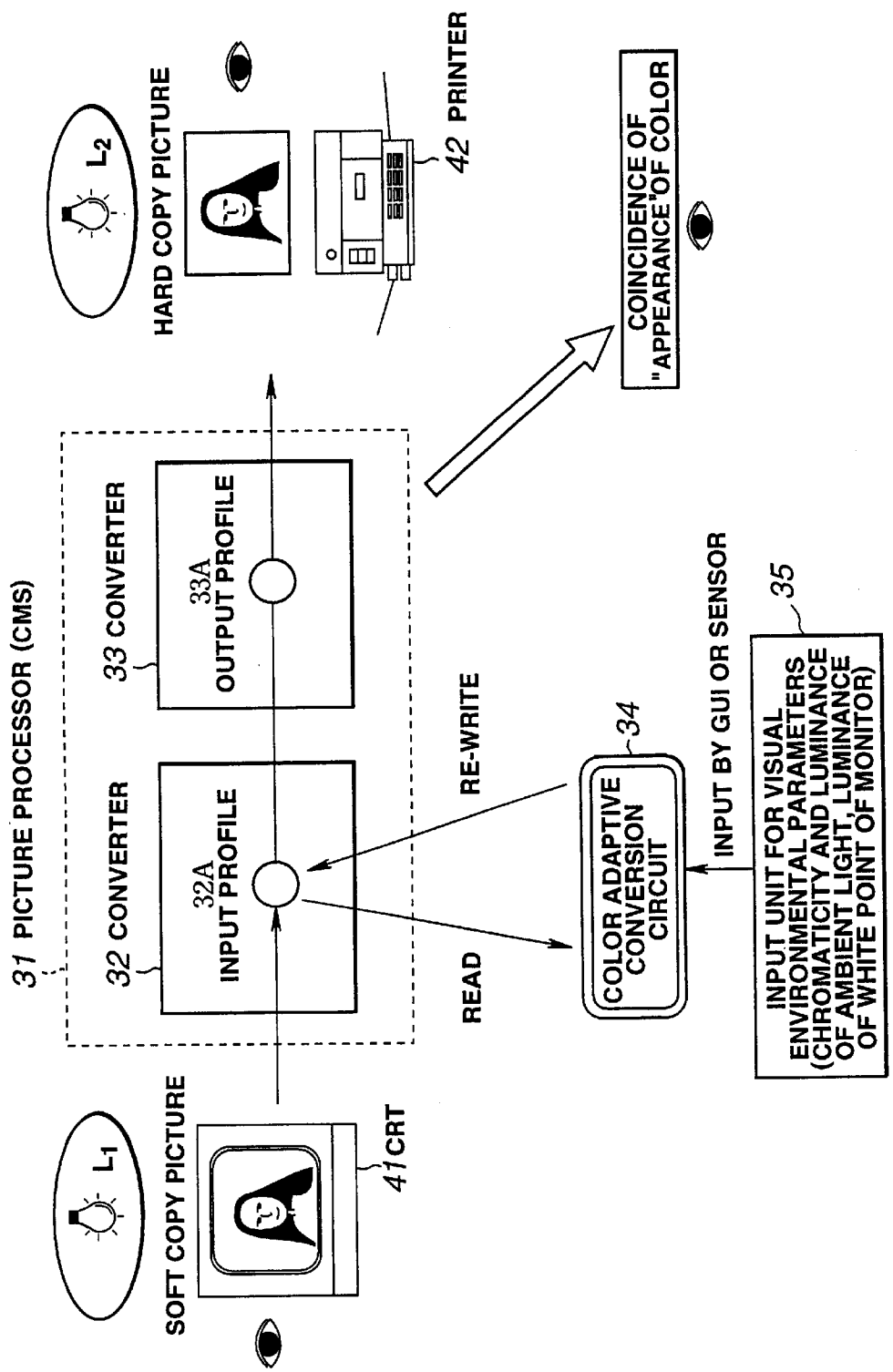
FIG. 15 is a block diagram showing an illustrative structure of a picture processing system embodying the present invention.

FIG. 15 shows an illustrative structure of such picture processing system, in which a CRT 41 and a printer 42 are connected to a picture processing unit 31 constituting a CMS. A soft copy picture displayed on the CRT 41 is retrieved and supplied to a converter 32 of the picture processing unit 31. The converter 32 processes the input picture data in accordance with an enclosed output profile 33A to output the processed data to the printer 42.

The input profile 32A of the converter 32 is suitably read out by a color adaptation model conversion circuit 34 so as to be suitably rewritten in meeting with an input from a viewing condition parameter input unit 35, which is constructed by a GUI or sensors and is configured for retrieving data such as chromaticity or luminance of surrounding light $L_1$ of the CRT 41 or luminance of the white point of the CRT 41.

Figure 16:
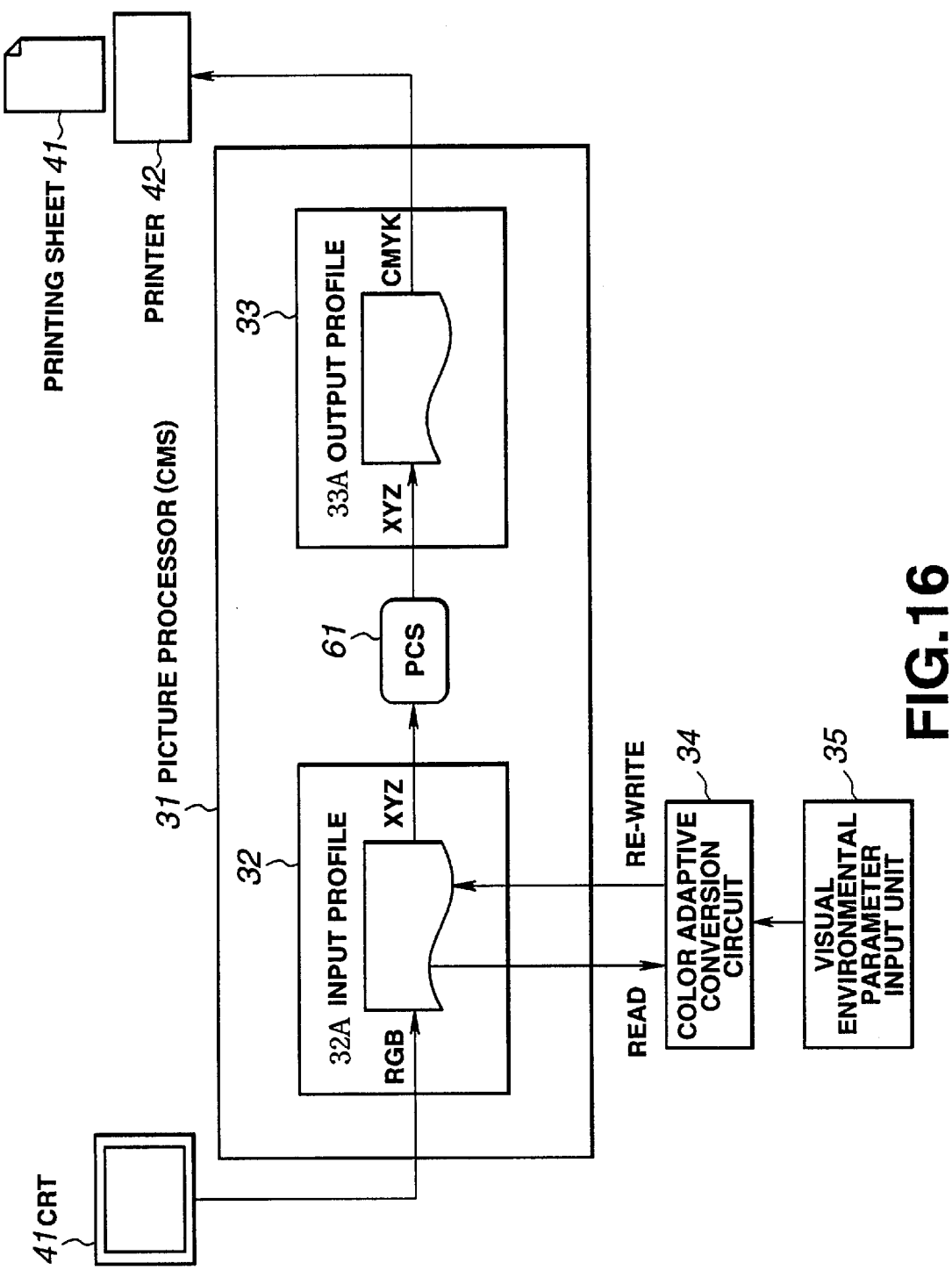
FIG. 16 again is a block diagram showing an illustrative structure of a picture processing system embodying the present invention.

FIG. 16 shows a detailed illustrative structure of the picture processing unit 31. In the present illustrative structure, the input profile 32A converts RGB data as DDC data entered from the CRT 41 into XYZ data as DIC data to output the XYZ data to a profile connection space (PCS) 61 which is adapted to output the input XYZ data to the converter 33. The output profile 33A of the converter 33 converts the input XYZ data into CMY(K) data as DDC data which is outputted to the printer 42 and printed on a printing paper sheet so as to be outputted as hard copy picture.

Figure 17:
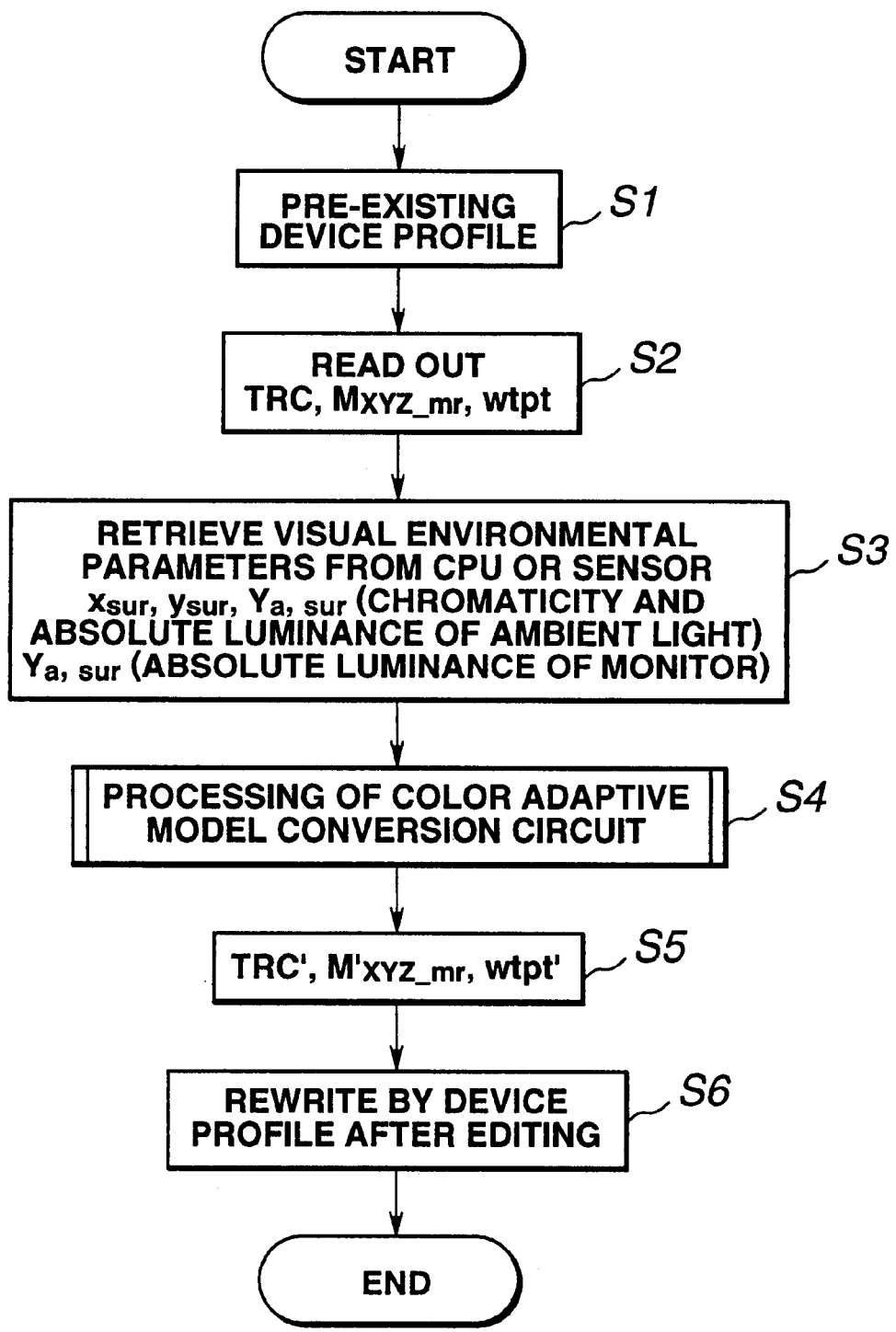
FIG. 17 is a flowchart for illustrating the processing of the illustrative structure of FIG. 16.

Referring to the flowchart of FIG. 17, the operation of furnishing the soft copy picture displayed on the CRT 41 via the picture processing unit 31 to the printer 42 for printing on the printing paper sheet is explained.

First, at step S1, the color adaptation model conversion circuit 34 executes processing of reading out the input profile 32A of the converter 32. Then, at step S2, the color adaptation model conversion circuit 34 executes the processing of reading out TRC (rTRC, gTRC, bTRC), $M_{xyz\_mr}$ from the read input profile 32A.

Meanwhile, TRC is the generic appellation of rTRC, gTRC and bTRC which are functions or conversion table data for linearizing pre-set data. For example, $r_{TRC[A]}$ means data A linearized with rTRC.

$M_{xyz\_mr}$ means a matrix represented by the following equation (31):

$$M_{XYZ\_mr} = \begin{bmatrix} X_{mr,red} & X_{mr,green} & X_{mr,blue} \\ Y_{mr,red} & Y_{mr,green} & Y_{mr,blue} \\ Z_{mr,red} & Z_{mr,green} & Z_{mr,blue} \end{bmatrix} \quad (31)$$

In this equation (31), $(X_{mr,red}, Y_{mr,red}, Z_{mr,red})$ denotes a relative tristimulus values (rXYZ) of an R-phosphor as a medium of the CRT 41. Similarly, $(X_{mr,green}, Y_{mr,green}, Z_{mr,green})$ denotes a relative tristimulus values (gXYZ) of a G-phosphor and $(X_{mr,blue}, Y_{mr,blue}, Z_{mr,blue})$ denotes a relative tristimulus values (bXYZ) of a B-phosphor.

In addition, wtpt denotes a relative tristimulus values $(X_{r,mv}, Y_{r,mv}$ and $Z_{r,mv})$ of the white point of the CRT 41.

In the present specification, $(X_r, Y_r, Z_r)$ denote relative tristimulus values, and the subscript mr means 'media relative' used for specifying the relative value of the media.

Figure 18:
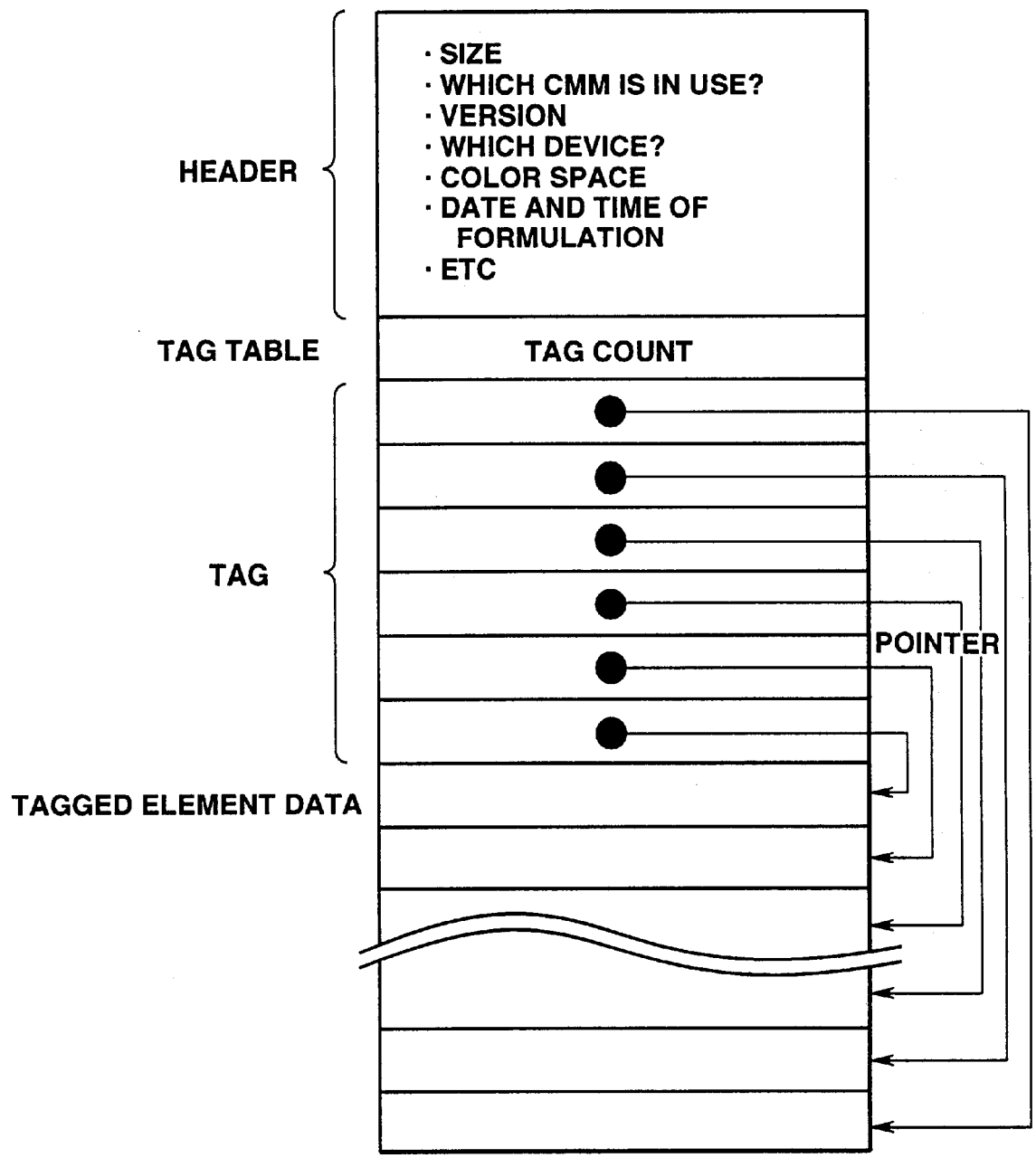
FIG. 18 illustrates the ICC profile format.

The input profile 32A and the output profile 33A are pre-formulated on the basis of ICC Profile Format Specification which is available on accessing the ICC home page (whose URL is http://www.color.org) over the Internet. In this format, there is placed at the leading end a header stating the format size, color management module (CMM; a software performing color conversion processing) in use, version, device in use, color space and time and date of formulation, as shown in FIG. 18. In the tag table, next following the header, there are arrayed a tag count specifying the number of bytes of the tag itself and a pointer tag specifying the arraying position of data (tag element data).

FIG. 19 shows a display example in which the contents of the profile of this ICC Profile Format are displayed on the CRT 41 using an application software usable for viewing the profile. As shown therein, this profile includes TRC, $m_{xyz\_mr}$ and wtpt.

Next, processing transfers to step S3 of FIG. 17 where the color adaptation model conversion circuit 34 retrieves the viewing condition parameters from the viewing condition parameter input unit 35. These viewing condition parameters can retrieve the chromaticity $(x_{sur}, y_{sur})$ and absolute luminance $Y_{a,sur}$ of the surrounding light $L_1$ of the CRT 41 and the absolute luminance $Y_{a,mon}$ of the CRT 41. In the present specification, the subscript 'a' means absolute and signifies that the symbol carrying the subscript denotes an absolute value.

On the other hand, the subscript 'sur' means that the symbol carrying the subscript denotes data of the surrounding light, while the subscript 'mon' means that the symbol carrying the subscript denotes data means data concerning a monitor (CRT).

Figure 20:
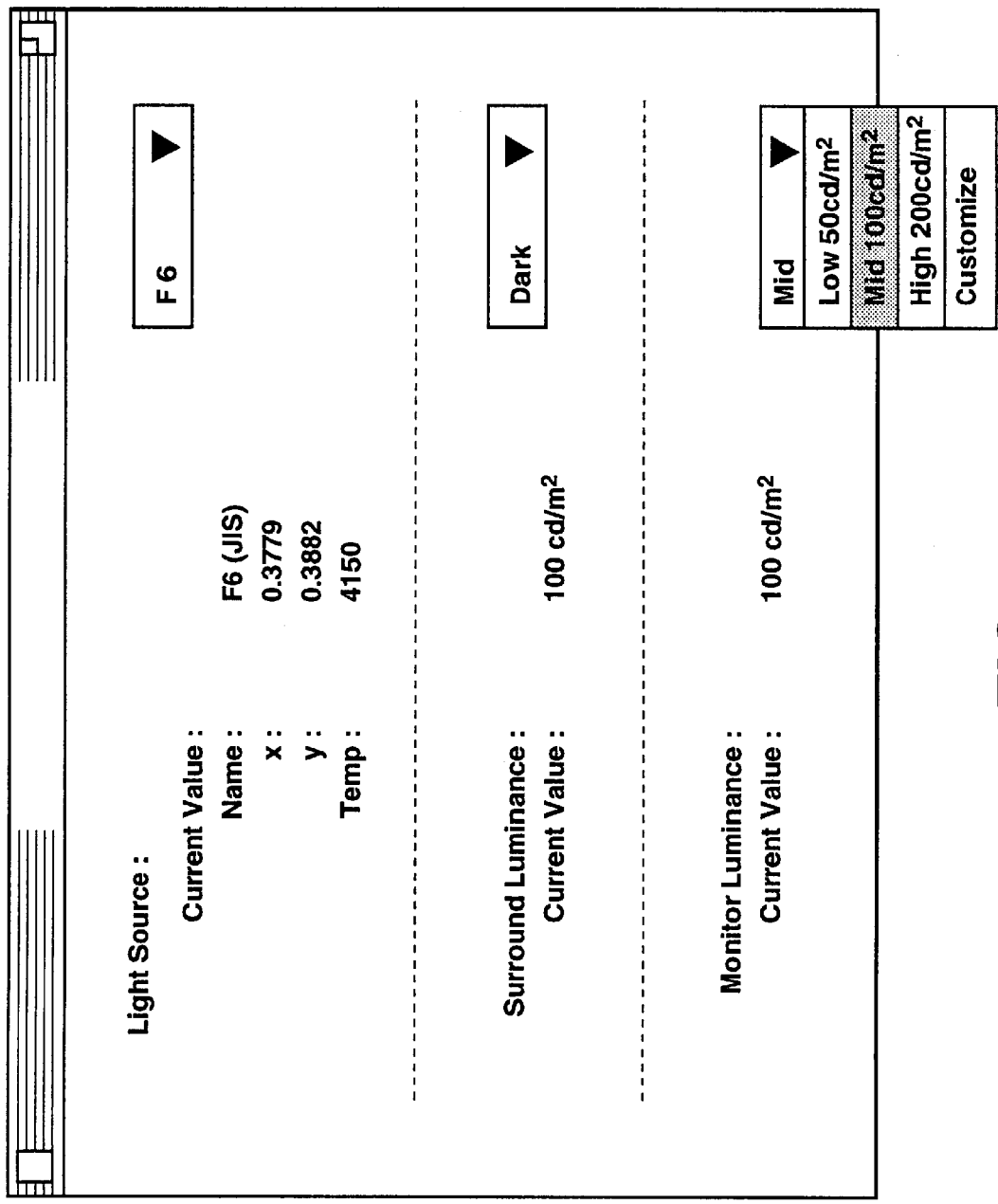
FIG. 20 illustrates an example of an input picture of visual condition parameter.

FIG. 20 denotes a display example of an input picture for entering viewing condition parameters for the CRT 41 (GUI). As shown therein, the user can suitably manipulate a keyboard, not shown, of the viewing condition parameter input unit 35 to enter the required viewing condition parameters as numerical figures.

Of course, these viewing condition parameters can be detected by a sensor to retrieve the detected results.

If the retrieval of the viewing condition parameters at step S3 of FIG. 17 comes to a close, processing transfers to step S4 in order to execute conversion processing by the color adaptation model conversion circuit 34. This conversion processing will be explained subsequently in detail by referring to the flowchart of FIG. 22.

By the processing in the color adaptation model conversion circuit 34, TRC', $M'_{xyz\_mr}$ and wtpt' are obtained at step S5 as data for re-writing in association with TRC, $M_{xyz\_mr}$ and wtpt read at step S2. By these data for rewriting, thus obtained, the input profile 32A is re-written at step S6.

When the writing of the input profile 32A has come to a close as described above, the RGB data, retrieved from the CRT 41, are converted into XYZ data, by having reference to this input profile 32A, and is supplied via PCS 61 to the output profile 33A, where the XYZ data is converted to CMY(K) data which is outputted to the printer for printing on the printing paper sheet.

Figure 21:
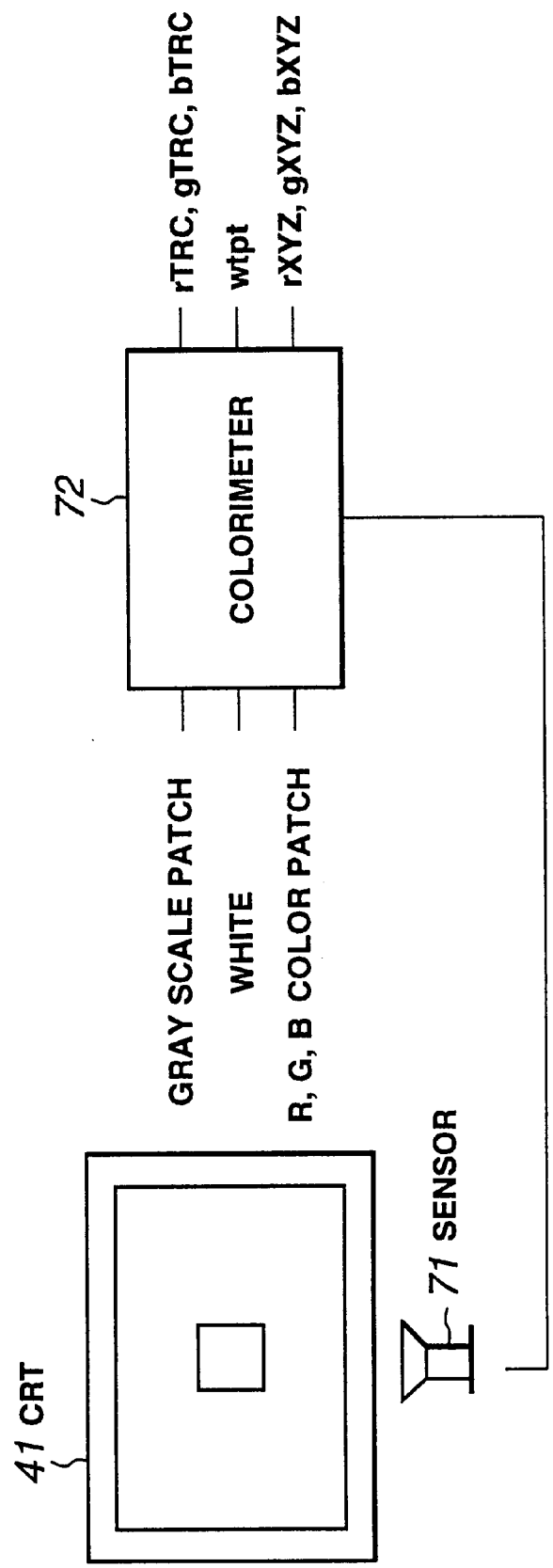
FIG. 21 illustrates the method for measuring a color patch.

In the illustrative processing, shown in FIG. 17, it is presupposed that the input profile 32A in the conversion circuit 32 has been pre-formulated. If this input profile 32A has not been formulated, it can be formulated newly. In this case, a gray scale patch, an RGB color patch and a white patch, for example, are displayed on the CRT 41, as shown in FIG. 21. The sensor 71 detects the patch data are detected and the detected results are sent to a colorimeter 72 where the detected results ate calculated in order to find TRC, $W_{xyz\_mr}$ and wtpt.

Meanwhile, the elements of $W_{xyz\_mr}$ can be found from the following equation (32):

$$X_{mr} = (X_{r,D50}/X_{a,mw})X_a = (X_{r,D50}/X_{r,mw})X_r$$
$$Y_{mr} = (Y_{r,D50}/Y_{a,mw})Y_a = (Y_{r,D50}/Y_{r,mw})Y_r$$
$$Z_{mr} = (Z_{r,D50}/Z_{a,mw})Z_a = (Z_{r,D50}/Z_{r,mw})Z_r \quad (32)$$

In the above equation (32), $(X_a, Y_a, Z_a)$ denote absolute tristimulus values, $(X_r, Y_r, Z_r)$ denote relative tristimulus values, ($X_{a,mv}$, $Y_{a,mv}$ and $Z_{a,mv}$) denotes absolute tristimulus values for white and ($X_{r,mv}$, $Y_{r,mv}$ and $Z_{r,mv}$) denotes relative tristimulus values for white. In addition, ($X_{r,D50}$, $Y_{r,D50}$ and $Z_{r,D50}$) denote relative tristimulus values of a light source D50, specifically (0.9642, 1.0000, 0.8249).

The conversion processing by the color adaptation model conversion circuit 34 at step S4 of FIG. 17 is explained with reference to the flowchart of FIG. 22. In the present embodiment, TRC, $M_{xyz\_mr}$ and wtpt are entered from the input profile 32A, while the chromaticity ($X_{sur}$, $Y_{sur}$) of the surrounding light $L_1$, the absolute luminance $Y_{a,sur\ of\ the\ surrounding\ light\ L_1}$ and absolute luminance $Y_{a,mon}$ of the CRT 41 are entered from the viewing condition parameter input unit 35, as shown in FIG. 17. It is the updated data TRC', $M'_{xyz\_mr}$ and wtpt' of the input profile 32A that are generated and outputted.

First, it is assumed that picture data (dr, dg and db) are pre-generated at step S11. These data (dr, dg, db) are obtained on normalizing the values of (R, G, B) outputted by the CRT 4 so that the maximum value will be equal to 1.

Then, at step S12, TRC read from the input profile 32A is applied to the data (dr, dg, db) generated at step S11, in order to calculate (r, g, b) in accordance with the following equation (33):

$$r = rTRC[dr]\ 0 \leq dr \leq 1\ 0 \leq r \leq 1$$

$$g = gTRC[dg]\ 0 \leq dg \leq 1\ 0 \leq g \leq 1$$

$$b = bTRC[db]\ 0 \leq db \leq 1\ 0 \leq b \leq 1 \quad (33)$$

This gives data (r, g, b) which has linearized the relation between the light volume and the RGB data outputted by the CRT 41.

Then, at step 14, next following step S13, data ($X'_a$, $Y'_a$, $Z'_a$) are calculated from data (r, g, b) of step S12.

Figure 33:
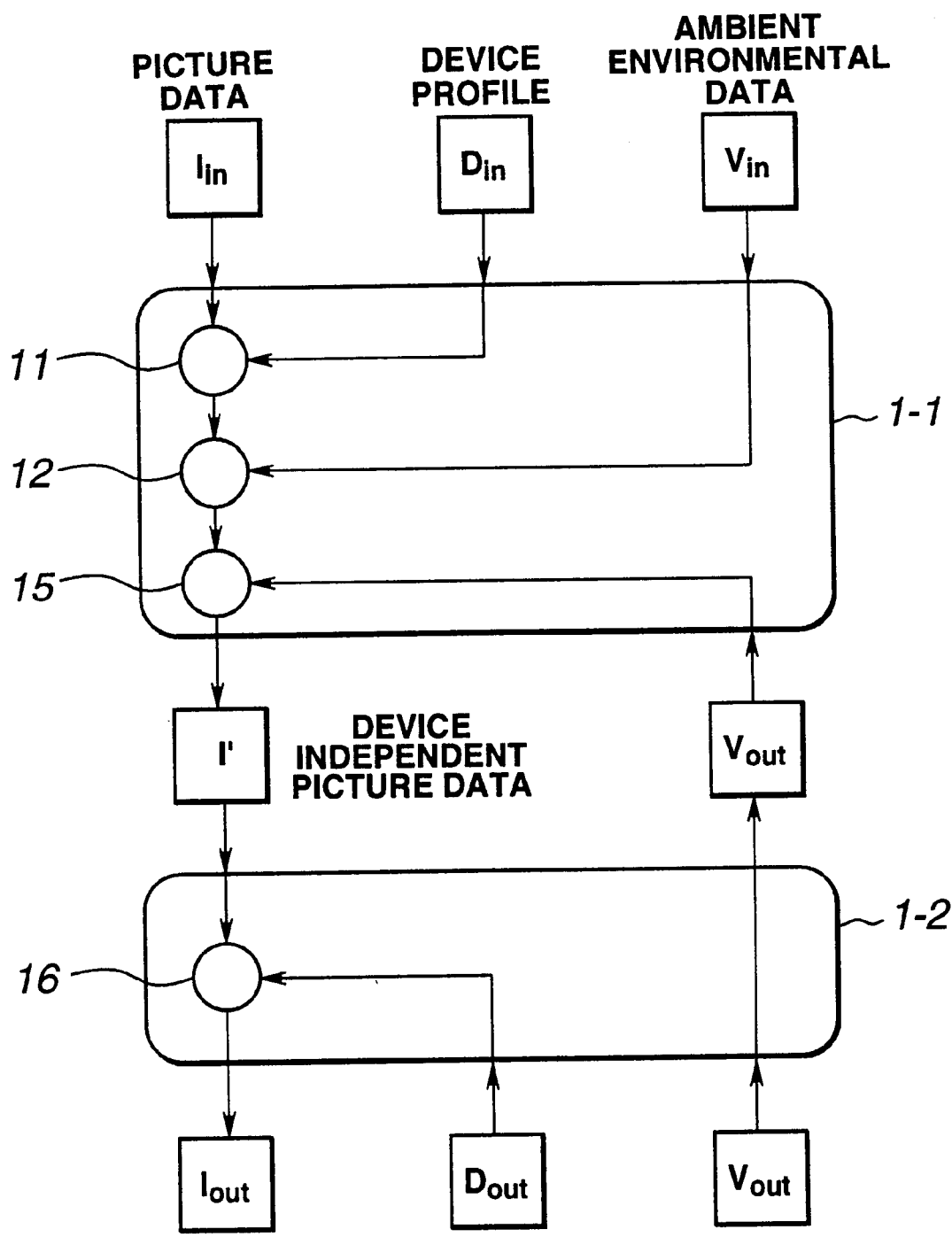
FIG. 33 similarly illustrates CMS data flow.

That is, in order to find data (X, Y, Z) from the linearized data of FIG. 33, the media relative tristimulus values of the RGB phosphors, represented by the following equation (34):

$$rXYZ: (X_{mr,red}, Y_{mr,red}, Z_{mr,red})$$

$$gXYZ: (X_{mr,green}, Y_{mr,green}, Z_{mr,green})$$

$$bXYZ: (X_{mr,blue}, Y_{mr,blue}, Z_{mr,blue}) \quad (34)$$

are read.

Moreover, the relative tristimulus values of the white point, required for conversion from the media relative tristimulus values to the absolute tristimulus values, represented by the following equation (35):

$$wtpt: (X_{r,mw}, Y_{r,mw}, Z_{r,mw}) \quad (35)$$

where wtpt is the white point of the CRT 41, are read. This equation (35) is set as in the following equation (36):

$$(X_{r,mon}, Y_{r,mon}(=1), Z_{r,mon}) \quad (36)$$

As a result, the absolute tristimulus values of the CRT 41 can be represented, using $Y_{a,mon}$, in accordance with the following equation (37):

$$X_{a,mon} = X_{r,mon} \cdot Y_{a,mon}$$

$$Y_{a,mon} = Y_{r,mon} \cdot Y_{a,mon} (=Y_{a,mon})$$

$$Z_{a,mon} = Z_{r,mon} \cdot Y_{a,mon} \quad (37)$$

From the above equations (32), (36) and (37), the following equation (38):

$$\begin{bmatrix} X_{mr} \\ Y_{mr} \\ Z_{mr} \end{bmatrix} = \begin{bmatrix} X_{mr,red} & X_{mr,green} & X_{mr,blue} \\ Y_{mr,red} & Y_{mr,green} & Y_{mr,blue} \\ Z_{mr,red} & Z_{mr,green} & Z_{mr,blue} \end{bmatrix} \begin{bmatrix} r \\ g \\ b \end{bmatrix} \quad (38)$$

$$= \begin{bmatrix} \frac{X_{r,D50}}{X_{a,mon}} X_{a,red} & \frac{X_{r,D50}}{X_{a,mon}} X_{a,green} & \frac{X_{r,D50}}{X_{a,mon}} X_{a,blue} \\ \frac{Y_{r,D50}}{Y_{a,mon}} Y_{a,red} & \frac{Y_{r,D50}}{Y_{a,mon}} Y_{a,green} & \frac{Y_{r,D50}}{Y_{a,mon}} Y_{a,blue} \\ \frac{Z_{r,D50}}{Z_{a,mon}} Z_{a,red} & \frac{Z_{r,D50}}{Z_{a,mon}} Z_{a,green} & \frac{Z_{r,D50}}{Z_{a,mon}} Z_{a,blue} \end{bmatrix} \begin{bmatrix} r \\ g \\ b \end{bmatrix}$$

is derived.

In this equation (38), ($X_{a,red}$, $Y_{a,red}$, $Z_{a,red}$), ($X_{a,green}$, $Y_{a,green}$, $Z_{a,green}$) and ($X_{a,blue}$, $Y_{a,blue}$, $Z_{a,blue}$) represent absolute tristimulus values of R, G and B phosphors, respectively.

Therefore, the matrix represented by the absolute tristimulus values is as the following equation (39):

$$\begin{bmatrix} X_{a,red} & X_{a,green} & X_{a,blue} \\ Y_{a,red} & Y_{a,green} & Y_{a,blue} \\ Z_{a,red} & Z_{a,green} & Z_{a,blue} \end{bmatrix} = \quad (39)$$

$$\begin{bmatrix} \frac{X_{a,mon}}{X_{r,D50}} X_{mr,red} & \frac{X_{a,mon}}{X_{r,D50}} X_{mr,green} & \frac{X_{a,mon}}{X_{r,D50}} X_{mr,blue} \\ \frac{Y_{a,mon}}{Y_{r,D50}} Y_{mr,red} & \frac{Y_{a,mon}}{Y_{r,D50}} Y_{mr,green} & \frac{Y_{a,mon}}{Y_{r,D50}} Y_{mr,blue} \\ \frac{Z_{a,mon}}{Z_{r,D50}} Z_{mr,red} & \frac{Z_{a,mon}}{Z_{r,D50}} Z_{mr,green} & \frac{Z_{a,mon}}{Z_{r,D50}} Z_{mr,blue} \end{bmatrix}$$

where the term of the right side of the equation (39) is $M_{XYZ\_a}$, as shown by the following equation (40):

$$M_{XYZ\_a} = \begin{bmatrix} \frac{X_{a,mon}}{X_{r,D50}} X_{mr,red} & \frac{X_{a,mon}}{X_{r,D50}} X_{mr,green} & \frac{X_{a,mon}}{X_{r,D50}} X_{mr,blue} \\ \frac{Y_{a,mon}}{Y_{r,D50}} Y_{mr,red} & \frac{Y_{a,mon}}{Y_{r,D50}} Y_{mr,green} & \frac{Y_{a,mon}}{Y_{r,D50}} Y_{mr,blue} \\ \frac{Z_{a,mon}}{Z_{r,D50}} Z_{mr,red} & \frac{Z_{a,mon}}{Z_{r,D50}} Z_{mr,green} & \frac{Z_{a,mon}}{Z_{r,D50}} Z_{mr,blue} \end{bmatrix} \quad (40)$$

Therefore, the absolute tristimulus values, outputted from the CRT 41, may be represented by the following equation (41):

$$\begin{bmatrix} X_{a,(CRT)} \\ Y_{a,(CRT)} \\ Z_{a,(CRT)} \end{bmatrix} = M_{XYZ\_a} \begin{bmatrix} r \\ g \\ b \end{bmatrix} \quad (41)$$

where $M_{xyz\_a}$ denotes a matrix for finding the absolute tristimulus values from (r,g,b) and ($X_{a,(CRT)}$, $Y_{a,(CRT)}$, $Z_{a,(CRT)}$) represent the absolute tristimulus values outputted by the CRT 41.

Meanwhile, a subscript (CRT) denotes outputting by the CRT 41 and ( ) denotes that the number in the parentheses is a variable. In the following description, any symbol not shown with ( ) represents a constant number.

If the luminance of the surrounding light $L_1$ is increased, the picture on the soft copy of the CRT 41 is lowered in contrast. The main reason is that the black becomes floated by reflection of the surrounding light $L_1$ on the tube surface of the CRT 41. Although an anti-reflection film is formed n the CRT 4, the black that can be reproduced on the CRT 41 cannot be rendered darker than its reflected light, as long as there is the surrounding light $L_1$. In order to take into account the reflected light, the reflecting component of the surrounding light $L_1$ is added as offset to the light emitted by the RGB phosphor, as shown by the following equation (42):

$$\begin{bmatrix} X'_{a,(CRT)} \\ Y'_{a,(CRT)} \\ Z'_{a,(CRT)} \end{bmatrix} = \begin{bmatrix} X_{a,(CRT)} \\ Y_{a,(CRT)} \\ Z_{a,(CRT)} \end{bmatrix} + \begin{bmatrix} R_{bk} \cdot X_{a,sur} \\ R_{bk} \cdot Y_{a,sur} \\ R_{bk} \cdot Z_{a,sur} \end{bmatrix} \quad (42)$$

where $R_{bk}$ is the reflectance on the tube surface of the CRT 41 and is usually of the order of 1 to 5%, while ($X_{a,sur}$, $Y_{a,sur}$, $Z_{a,sur}$) denotes the absolute tristimulus values of the surrounding light $L_1$ and ($X'_{a,(CRT)}$, $Y'_{a,(CRT)}$, $Z'_{a,(CRT)}$) denotes the absolute tristimulus values of the CRT 41 plus the reflected light.

The absolute tristimulus values of the surrounding light $L_1$ may be found from the viewing condition parameters entered from the viewing condition parameter input unit 35 in accordance with the following equation (43):

$$\begin{bmatrix} X_{a,sur} \\ Y_{a,sur} \\ Z_{a,sur} \end{bmatrix} = \begin{bmatrix} \frac{x_{sur}}{y_{sur}} Y_{a,sur} \\ Y_{a,sur} \\ \frac{1 - x_{sur} - y_{sur}}{y_{sur}} Y_{a,sur} \end{bmatrix} \quad (43)$$

where ($r_0$, $g_0$, $b_0$) is defined so that the following equation (44):

$$\begin{bmatrix} r_0 \\ g_0 \\ b_0 \end{bmatrix} = M_{XYZ\_a}^{-1} \begin{bmatrix} R_{bk} \cdot X_{a,sur} \\ R_{bk} \cdot Y_{a,sur} \\ R_{bk} \cdot Z_{a,sur} \end{bmatrix} \Leftrightarrow \begin{bmatrix} R_{bk} \cdot X_{a,sur} \\ R_{bk} \cdot Y_{a,sur} \\ R_{bk} \cdot Z_{a,sur} \end{bmatrix} = M_{XYZ\_a} \begin{bmatrix} r_0 \\ g_0 \\ b_0 \end{bmatrix} \quad (44)$$

holds.

The equation (42) can be modified from the equations (41), (44) to the following equation (45):

$$\begin{bmatrix} X'_{a,(CRT)} \\ Y'_{a,(CRT)} \\ Z'_{a,(CRT)} \end{bmatrix} = M_{XYZ\_a} \begin{bmatrix} r \\ g \\ b \end{bmatrix} + M_{XYZ\_a} \begin{bmatrix} r_0 \\ g_0 \\ b_0 \end{bmatrix} \quad (45)$$

$$= M_{XYZ\_a} \begin{bmatrix} r + r_0 \\ g + g_0 \\ b + b_0 \end{bmatrix}$$

Meanwhile, TRC needs to be represented in the ICC profile Format by a value ranging from 0 to 1. Thus, for normalization in which the maximum values of ($r+r_0$), ($g+g_0$) and ($b+b_0$) are equal to 1, ($r'$,$g'$,$b'$) is defined as in the following equation (46):

$$r' = (r+r_0)/(1+r_0)$$

$$g' = (g+g_0)/(1+g_0)$$

$$b' = (b+b_0)/(1+b_0) \quad (46)$$

From the equation (33), the following equation (47):

$$r' = (rTRC[dr]+r_0)/(1+r_0)$$

$$g' = (gTRC[dg]+g_0)/(1+g_0)$$

$$b' = (bTRC[db]+b_0)/(1+b_0) \quad (47)$$

Then, TRC' is defined as shown in the following equation (48):

$$rTRC'[dr] = (rTRC[dr]+r_0)/(1+r_0)$$

$$gTRC'[dg] = (gTRC[dg]+g_0)/(1+g_0)$$

$$bTRC'[db] = (bTRC[db]+b_0)/(1+b_0) \quad (48)$$

As a result, the following equation (49):

$$r' = rTRC'[dr] \; 0 \leq dr \leq 1 \; 0 \leq r' \leq 1$$

$$g' = gTRC'[dg] \; 0 \leq dg \leq 1 \; 0 \leq g' \leq 1$$

$$b' = bTRC'[db] \; 0 \leq db \leq 1 \; 0 \leq b' < 1 \quad (49)$$

holds to satisfy the format ICC Profile Format.

From the above equation (46), the following equation (50):

$$r + r_0 = (1+r_0) \cdot r'$$

$$g + g_0 = (1+g_0) \cdot g'$$

$$b + b_0 = (1+b_0) \cdot b' \quad (50)$$

holds.

Also, $M_{TRC\_n}$ is defined as shown in the following equation (51):

$$M_{TRC\_n} = \begin{bmatrix} 1+r_0 & 0 & 0 \\ 0 & 1+g_0 & 0 \\ 0 & 0 & 1+b_0 \end{bmatrix} \quad (51)$$

From the equations (50) and (51), the above equation (45) is represented as in the following equation (52):

$$\begin{bmatrix} X'_{a,(CRT)} \\ Y'_{a,(CRT)} \\ Z'_{a,(CRT)} \end{bmatrix} = M_{XYZ\_a} \cdot M_{TRC\_n} \begin{bmatrix} r' \\ g' \\ b' \end{bmatrix} \quad (52)$$

Figure 22:
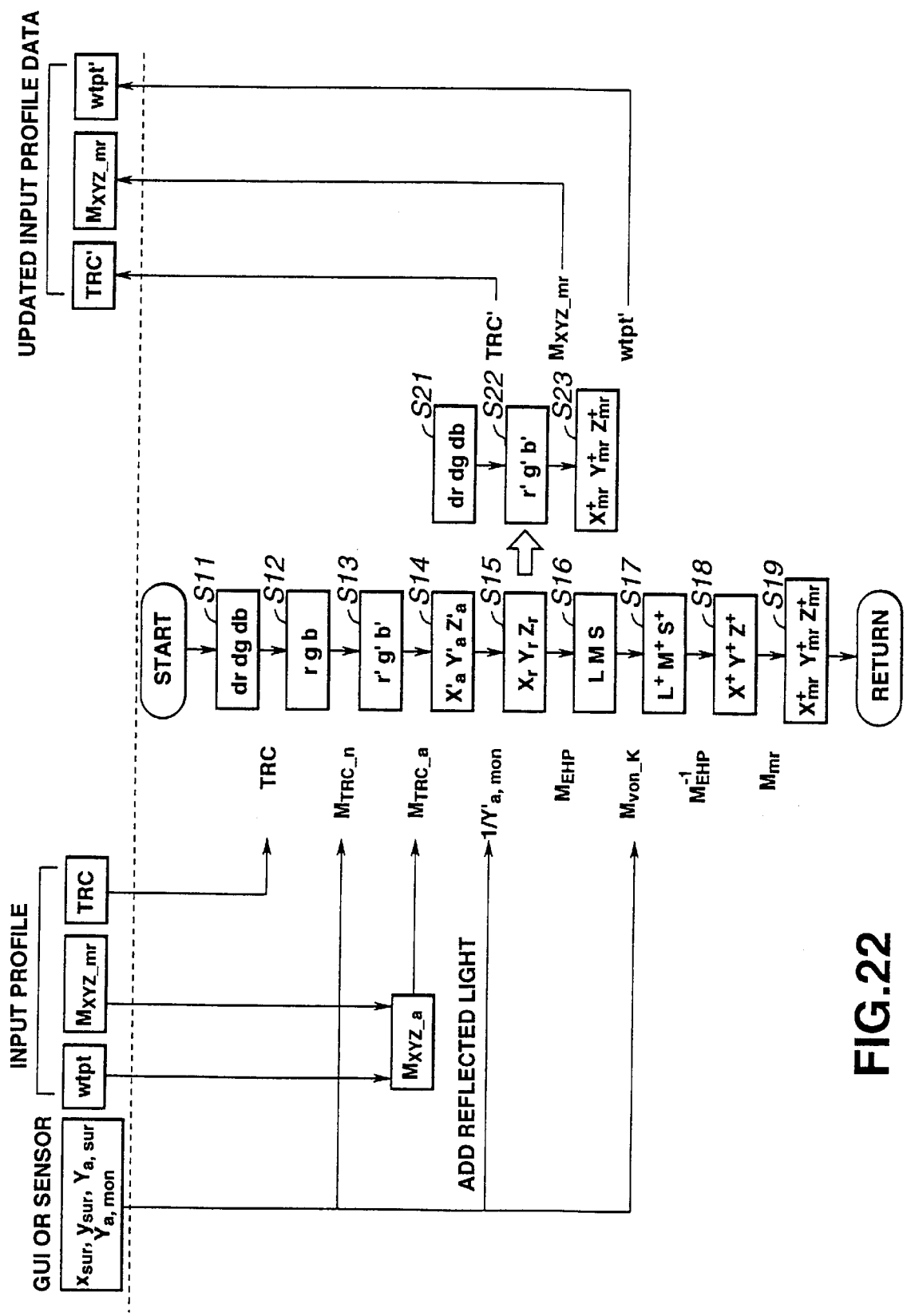
FIG. 22 is a flowchart for illustrating detailed processing of the step S4 of FIG. 14.

This equation (52) gives the results of calculations at step S4 of FIG. 22.

Then, the normalizing processing is carried out to set the maximum value of $Y'_{a,(CRT)}$ to 1. Since this value means an absolute tristimulus values for $r'=g'=b'=1$ in the equation (52), the following equation (53):

$$\begin{bmatrix} X'_{a,mon} \\ Y'_{a,mon} \\ Z'_{a,mon} \end{bmatrix} = M_{XYZ\_a} \cdot M_{TRC\_n} \begin{bmatrix} 1 \\ 1 \\ 1 \end{bmatrix} \quad (53)$$

holds from the equation (52).

From this equation (53), $Y'_{a,mon}$ is found, so that, at step S15 of FIG. 22, the following equation (54):

$$X_{r,(CRT)} = \frac{X'_{a,(CRT)}}{Y'_{a,mon}}$$

$$Y_{r,(CRT)} = \frac{Y'_{a,(CRT)}}{Y'_{a,mon}}$$

$$Z_{r,(CRT)} = \frac{Z'_{a,(CRT)}}{Y'_{a,mon}} \quad (54)$$

can be calculated.

Then, using the equation (52) (Hunt-Pointer-Esteves transform), transform from the tristimulus values to the cone signal is performed. That is, at step S16, the following equation (55):

$$\begin{bmatrix} L_{(CRT)} \\ M_{(CRT)} \\ S_{(CRT)} \end{bmatrix} = \begin{bmatrix} 0.38971 & 0.68898 & -0.07868 \\ -0.22981 & 1.18340 & 0.04641 \\ 0.0 & 0.0 & 1.0 \end{bmatrix} \begin{bmatrix} X_{r,(CRT)} \\ Y_{r,(CRT)} \\ Z_{r,(CRT)} \end{bmatrix} \quad (55)$$

is calculated.

Meanwhile, $M_{EHP}$ is defined as shown in the following equation (56):

$$M_{EHP} = \begin{bmatrix} 0.38971 & 0.68898 & -0.07868 \\ -0.22981 & 1.18340 & 0.04641 \\ 0.0 & 0.0 & 1.0 \end{bmatrix} \quad (56)$$

Meanwhile, the human visual system normalizes the cone signals at the white point value so that the light source will be white. In the model of the present embodiment, the adaptation rule by von Kries is basically used. However, the white point, to which the human visual system is thought to adapt itself, is found from incomplete adaptation and partial adaptation, without directly using the chromaticity of the light source, as now explained.

First, the incomplete adaptation is explained. In observing a picture on the CRT 41, the human visual system endeavors to adapt itself to the white point on the CRT 41. However, if the white point is significantly apart from the D65, the human visual system cannot completely adapt itself to the white point on the CRT 41 even if the CRT 41 is observed in a dark room. The further the chromaticity of the white point apart from the D65 (or E) light source, and the lower the luminance of the adaptation point, the more incomplete is the adaptation. The white point of incomplete adaptation $(L'_n, M'_n, S'_n)$, to which the human visual system adapts itself, is found by the following equation (57):

$$L'_n = L_n / P_L$$

$$M'_n = M_n / P_M$$

$$S'_n = S_n / P_S \quad (57)$$

It should be noted that $p_L$, $p_M$ and $p_S$ in the equation (57) are color adaptation coefficients as found with the Hunt's model, and may be found from the following equation (58):

$$P_L = (1 + Y'^{1/3}_{a,mon} + l_E)/(1 + Y'^{1/3}_{a,mon} + 1/l_E)$$

$$P_M = (1 + Y'^{1/3}_{a,mon} + m_E)/(1 + Y'^{1/3}_{a,mon} + 1/m_E)$$

$$P_S = (1 + Y'^{1/3}_{a,mon} + s_E)/(1 + Y'^{1/3}_{a,mon} + 1/s_E) \quad (58)$$

where $Y'_{a,mon}$ represents the absolute luminance (cd/m$^2$) including the reflected light of the white point of the CRT 41.

Also, $l_E$, $m_E$, $s_E$ in the equation (58) may be found from the following equation (59):

$$l_E = 3 \cdot L_n / (L_n + M_n + S_n)$$

$$m_E = 3 \cdot M_n / (L_n + M_n + S_n)$$

$$s_E = 3 \cdot S_n / (L_n + M_n + S_n) \quad (59)$$

Meanwhile, $(L_n, M_n, S_n)$ may be found by the following equation (60):

$$\begin{bmatrix} L_n \\ M_n \\ S_n \end{bmatrix} = M_{EHP} \begin{bmatrix} X_{r,mon} \\ Y_{r,mon} \\ Z_{r,mon} \end{bmatrix} \quad (60)$$

by transforming the relative tristimulus values $(X_{r,mon}, Y_{r,mon}, Z_{r,mon})$ into cone signals, using $M_{EHP}$, wherein the relative tristimulus values $(X_{r,mon}, Y_{r,mon}, Z_{r,mon})$ is that for the white point of the CRT 41, that is for r'=g'=b'=1 in the equations (52), (54).

Turning to mixed adaptation, when viewing a picture on the CRT 41, it is hardly viewed in a dark room, but it is viewed in a usual office under a fluorescent lamp having a color temperature (CCT) of approximately 4150K. On the other hand, the CCT of the white point of the customary CG monitor is approximately 9300K. If the white point of the CRT 41 differs significantly from the ambient color temperature, the human visual system is thought to be partially adapting itself to both and, in actuality, the white point to which the human visual system adapts itself is intermediate between the two. Thus, with the ratio $R_{adp}$, with which the human visual system adapts itself to the white point of the CRT 41 (adaptation ratio), the white point $(L''_n, M''_n, S''_n)$ of actual adaptation is defined by the following equation (61):

$$L''_n = R_{adp} \cdot \left(\frac{Y'_{a,mon}}{Y_{adp}}\right)^{1/3} \cdot L'_n + (1 - R_{adp}) \cdot \left(\frac{Y_{a,sur}}{Y_{adp}}\right)^{1/3} \cdot L_{sur} \quad (61)$$

$$M''_n = R_{adp} \cdot \left(\frac{Y'_{a,mon}}{Y_{adp}}\right)^{1/3} \cdot M'_n + (1 - R_{adp}) \cdot \left(\frac{Y_{a,sur}}{Y_{adp}}\right)^{1/3} \cdot M_{sur}$$

$$S''_n = R_{adp} \cdot \left(\frac{Y'_{a,mon}}{Y_{adp}}\right)^{1/3} \cdot S'_n + (1 - R_{adp}) \cdot \left(\frac{Y_{a,sur}}{Y_{adp}}\right)^{1/3} \cdot S_{sur}$$

where $Y_{adp} = \{R_{adp} \cdot Y'^{1/3}_{a,mon} + (1 - R_{adp}) \cdot Y^{1/3}_{a,sur}\}^3$ If the absolute tristimulus values of the surrounding light is converted to the relative tristimulus values from the equation (43), $(L_{sur}, M_{sur}, S_{sur})$ is as shown by the following equation (62):

$$X_{r,sur} = X_{a,sur} / Y_{a,sur}$$

$$Y_{r,sur} = Y_{a,sur} / Y_{a,sur} (=1)$$

$$Z_{r,sur} = Z_{a,sur} / Y_{a,sur} \quad (62)$$

If the results obtained in the equation (62) are converted at step S16 to cone signals, using $M_{EHP}$, the following equation (63):

$$\begin{bmatrix} L_{sur} \\ M_{sur} \\ S_{sur} \end{bmatrix} = M_{EHP} \begin{bmatrix} X_{r,sur} \\ Y_{r,sur} \\ Z_{r,sur} \end{bmatrix} \quad (63)$$

is obtained.

Meanwhile, an experiment on the visual sense indicated that the optimum results can be obtained for the adaptation ratio $R_{adp}$ ranging between 0.4 and 0.7, in particular for $R_{adp}$ equal to 0.6.

By substituting the adaptation white point found at the above-mentioned two steps into the von Kries adaptation rule, the following equation (64):

$$\begin{bmatrix} L^+_{(CRT)} \\ M^+_{(CRT)} \\ S^+_{(CRT)} \end{bmatrix} = \begin{bmatrix} 1/L''_n & 0 & 0 \\ 0 & 1/M''_n & 0 \\ 0 & 0 & 1/S''_n \end{bmatrix} \begin{bmatrix} L_{(CRT)} \\ M_{(CRT)} \\ S_{(CRT)} \end{bmatrix} \quad (64)$$

where $L^+_{(CRT)}$, $L^+_{(CRT)}$, $L^+_{(CRT)}$, are cone signals obtained after von Kries adaptation rule conversion.

From this equation (64), calculations of step S17 is performed.

It is noted that $M_{von-k}$ is defined as shown in the following equation (65):

$$M_{von-K} = \begin{bmatrix} 1/L''_n & 0 & 0 \\ 0 & 1/M''_n & 0 \\ 0 & 0 & 1/S''_n \end{bmatrix} \quad (65)$$

At step S18 of FIG. 22, conversion from cone signals to the tristimulus values is performed, using the Hunt-Pointer-Esteves inverse matrix transform, in accordance with the following equation (66):

$$\begin{bmatrix} X^+_{(CRT)} \\ Y^+_{(CRT)} \\ Z^+_{(CRT)} \end{bmatrix} = \begin{bmatrix} 1.91019 & -1.11214 & 0.20195 \\ 0.37095 & 0.62905 & 0.0 \\ 0.0 & 0.0 & 1.0 \end{bmatrix} \begin{bmatrix} L^+_{(CRT)} \\ M^+_{(CRT)} \\ S^+_{(CRT)} \end{bmatrix} \quad (66)$$

where $X^+_{(CRT)}$, $X^+_{(CRT)}$ and $X^+_{(CRT)}$ are tristimulus values after conversion by the von Kries adaptation rule. The following equation (67) is defined:

$$M^{-1}_{EHP} = \begin{bmatrix} 1.91019 & -1.11214 & 0.20195 \\ 0.37095 & 0.62905 & 0.0 \\ 0.0 & 0.0 & 1.0 \end{bmatrix} \quad (67)$$

Then, conversion processing to media relative tristimulus values is performed in accordance with the above equation (32). First, by substituting the adaptive white point (L"n, M"n, S"n) into the equation (64), we obtain the following equation (68):

$$\begin{bmatrix} L^+_n \\ M^+_n \\ S^+_n \end{bmatrix} = M_{von-K} \begin{bmatrix} L''_n \\ M''_n \\ S''_n \end{bmatrix} = \begin{bmatrix} 1 \\ 1 \\ 1 \end{bmatrix} \quad (68)$$

Then, by converting this into the tristimulus value, we obtain the following equation (69):

$$\begin{bmatrix} X^+_n \\ Y^+_n \\ Z^+_n \end{bmatrix} = M^{-1}_{EHP} \begin{bmatrix} L^+_n \\ M^+_n \\ S^+_n \end{bmatrix} = \begin{bmatrix} 1 \\ 1 \\ 1 \end{bmatrix} \quad (69)$$

Therefore, the following equation (70):

$$\begin{bmatrix} X^+_{mr(CRT)} \\ Y^+_{mr(CRT)} \\ Z^+_{mr(CRT)} \end{bmatrix} = \begin{bmatrix} \frac{X_{r,DSO}}{X^+_n} & 0 & 0 \\ 0 & \frac{Y_{r,DSO}}{Y^+_n} & 0 \\ 0 & 0 & \frac{Z_{r,DSO}}{Z^+_n} \end{bmatrix} \begin{bmatrix} X^+_{(CRT)} \\ Y^+_{(CRT)} \\ Z^+_{(CRT)} \end{bmatrix}$$

$$= \begin{bmatrix} X_{r,DSO} & 0 & 0 \\ 0 & Y_{r,DSO} & 0 \\ 0 & 0 & Z_{r,DSO} \end{bmatrix} \begin{bmatrix} X^+_{(CRT)} \\ Y^+_{(CRT)} \\ Z^+_{(CRT)} \end{bmatrix} \quad (70)$$

holds.

The following equation (71):

$$M_{mr} = \begin{bmatrix} X_{r,DSO} & 0 & 0 \\ 0 & Y_{r,DSO} & 0 \\ 0 & 0 & Z_{r,DSO} \end{bmatrix} \quad (71)$$

is defined.

The processing according to the equation (70) is carried out at step S19 of FIG. 22.

Summarizing the processing of steps $S_{11}$ to $S_{19}$, profile rewriting not resorting to picture data (dr, dg, db) becomes possible, so that processing is performed in accordance with steps $S_{21}$ to $S_{23}$.

Specifically, new rTRC', gTRC' and bTRC' can be found from the equation (48), as functions or conversion tables, in accordance with the following equation (72):

$$rTRC'[dr]=(rTRC[dr]+r_0)/(1+r_0)$$

$$gTRC'[dg]=(gTRC[dg]+g_0)/(1+g_0)$$

$$bTRC'[db]=(bTRC[db]+b_0)/(1+b_0) \quad (72)$$

It is noted that $r_0$, $g_0$ and $b_0$ are represented from the equations (43), (44) in accordance with the following equation (73):

$$\begin{bmatrix} r_0 \\ g_0 \\ b_0 \end{bmatrix} = M^{-1}_{XYZ\_a} \begin{bmatrix} R_{bk} \cdot \frac{x_{sur}}{y_{sur}} \cdot Y_{a,sur} \\ R_{bk} \cdot Y_{a,sur} \\ R_{bk} \cdot \frac{1 - x_{sur} - y_{sur}}{y_{sur}} \cdot Y_{a,sur} \end{bmatrix} \quad (73)$$

The value represented by this equation (72) is the updated data TRC' for the TRC of the input profile 32A.

The conversion from the output (r', g', b') from TRC to media relative tristimulus values is achieved, using a color adaptation model, in accordance with the following equation (74):

$$\begin{bmatrix} X^+_{mr(CRT)} \\ Y^+_{mr(CRT)} \\ Z^+_{mr(CRT)} \end{bmatrix} = \quad (74)$$

$$M_{mr} \cdot M^{-1}_{EHP} \cdot M_{von-K} \cdot M_{EHP} \cdot \left(\frac{1}{Y'_{a,mon}}\right) \cdot M_{XYZ\_a} \cdot M_{TRC\_n} \begin{bmatrix} r' \\ g' \\ b' \end{bmatrix} =$$

-continued $$\left(\frac{1}{Y'_{a,mon}}\right) \cdot M_{mr} \cdot M_{EHP}^{-1} \cdot M_{von-K} \cdot M_{EHP} \cdot M_{XYZ\_a} \cdot M_{TRC\_n} \begin{bmatrix} r' \\ g' \\ b' \end{bmatrix}$$

From this equation (74), the following equation (75):

$$M'_{XYZ\_mr} = \left(\frac{1}{Y'_{a,mon}}\right) \cdot M_{mr} \cdot M_{EHP}^{-1} \cdot M_{von\_K} \cdot M_{EHP} \cdot M_{XYZ\_a} \cdot M_{TRC\_n} \quad (75)$$

Also, from the equation (75), the following equation (76):

$$M'_{XYZ\_mr} = \frac{1}{Y'_{a,mon}} \cdot M_{mr} \cdot M_{EHP}^{-1} \cdot M_{von\_K} \cdot M_{EHP} \cdot M_{XYZ\_a} \cdot M_{TRC\_n} \quad (76)$$

$$= \begin{bmatrix} X'_{mr,red} & X'_{mr,green} & X'_{mr,blue} \\ Y'_{mr,red} & Y'_{mr,green} & Y'_{mr,blue} \\ Z'_{mr,red} & Z'_{mr,green} & Z'_{mr,blue} \end{bmatrix}$$

$M'_{xyz\_mr}$ shown in this equation (76) is updated data of data $M_{xyz\_mr}$ of the input profile 32A.

At this time, the media relative tristimulus values of the RGB phosphors are represented by:

$rXYZ'$: $(X'_{mr,red}, Y'_{mr,red}, Z'_{mr,red})$ $gXYZ'$: $(X'_{mr,green}, Y'_{mr,green}, Z'_{mr,green})$ $bXYZ'$: $(X'_{mr,blue}, Y'_{mr,blue}, Z'_{mr,blue})$ (77)

From the equation (69), the absolute tristimulus values (relative tristimulus value) in the ICC Profile Format of the new white point are obtained by the following equation (78):

$$X^+_{r,n} = \frac{X^+_n}{Y^+_n} = 1 \quad (78)$$

$$Y^+_{r,n} = \frac{Y^+_n}{Y^+_n} = 1$$

$$Z^+_{r,n} = \frac{Z^+_n}{Y^+_n} = 1$$

This value is to be updated data wtpt' of wtpt of the input profile 32A.

The input profile 32A of the converter 32 in the picture processing unit 31 of FIG. 16 is updated in the manner described above.

Figure 23:
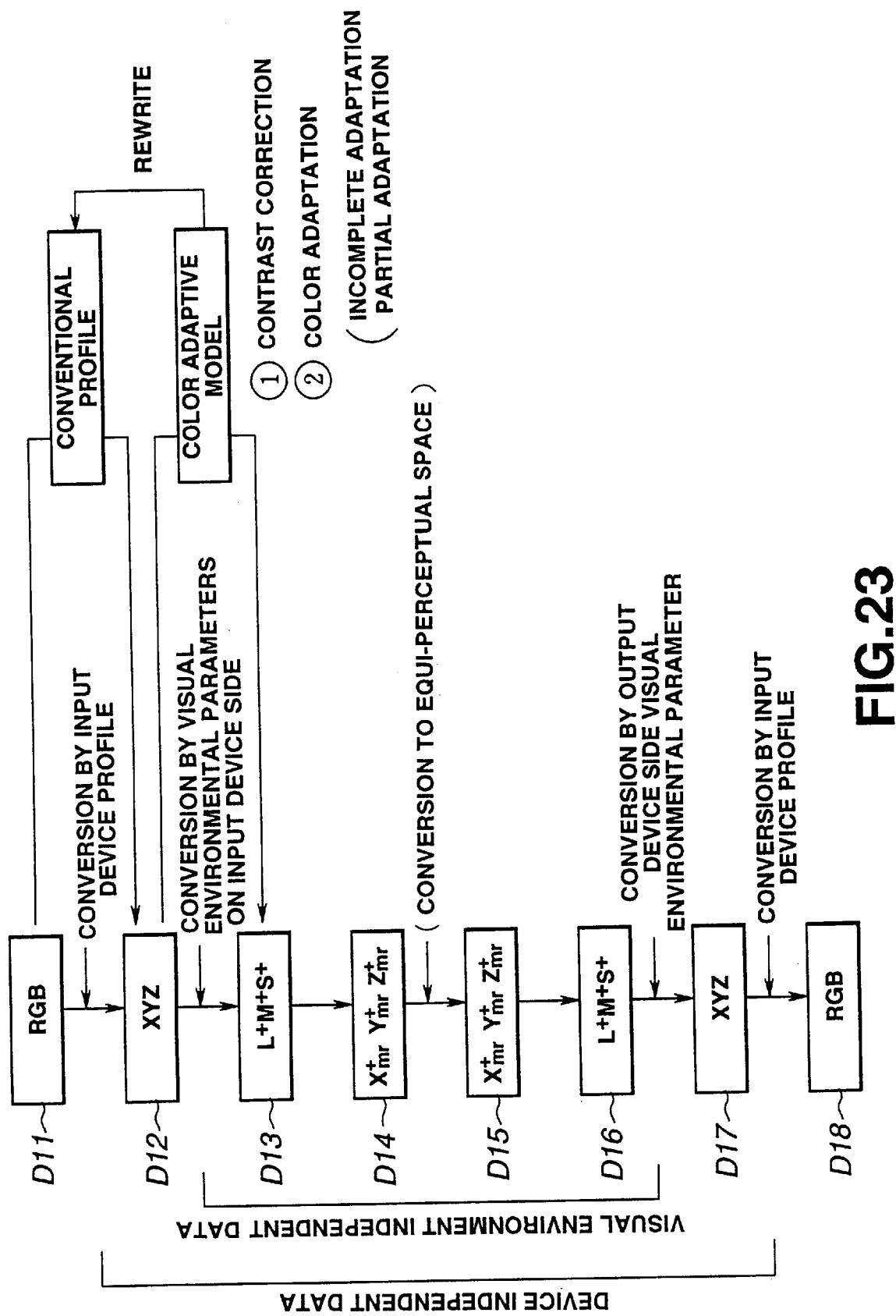
FIG. 23 illustrates data processing in the system of FIG. 23.

FIG. 23 shows the flow of data varied as a result of processing by the picture processing unit 31. That is, RGB data D11 from the CRT 41 is converted into XYZ data D12 in accordance with the input profile 32A of the converter 32, as shown in FIG. 23. This data corresponds to data generated at step 14 of FIG. 22. This XYZ data D13 is converted into L⁺M⁺S⁺ data based on the viewing condition parameters. This data corresponds to the data generated at step S17 of FIG. 22. This data is converted further to $X^+_{mr}Y^+_{mr}Z_{+mr}$ D14 corresponding to data generated at step securing spring 19 in FIG. 22. This data is transmitted to the converter 33 via profile Connection Space PCS 61 of FIG. 16.

The converter 33 receives this data as data d15 to convert this data to L⁺M⁺S⁺ data D16. This data is further converted to XYZ data D17 in meeting with the viewing condition parameters on the side of the printer 42. The converted data is further converted to RGB data D18 in meeting with the output profile 33A.

The converters 32, 33 shown in FIGS. 15, 16 are substantially constituted by a computer shown in FIG. 14.

Figure 24:
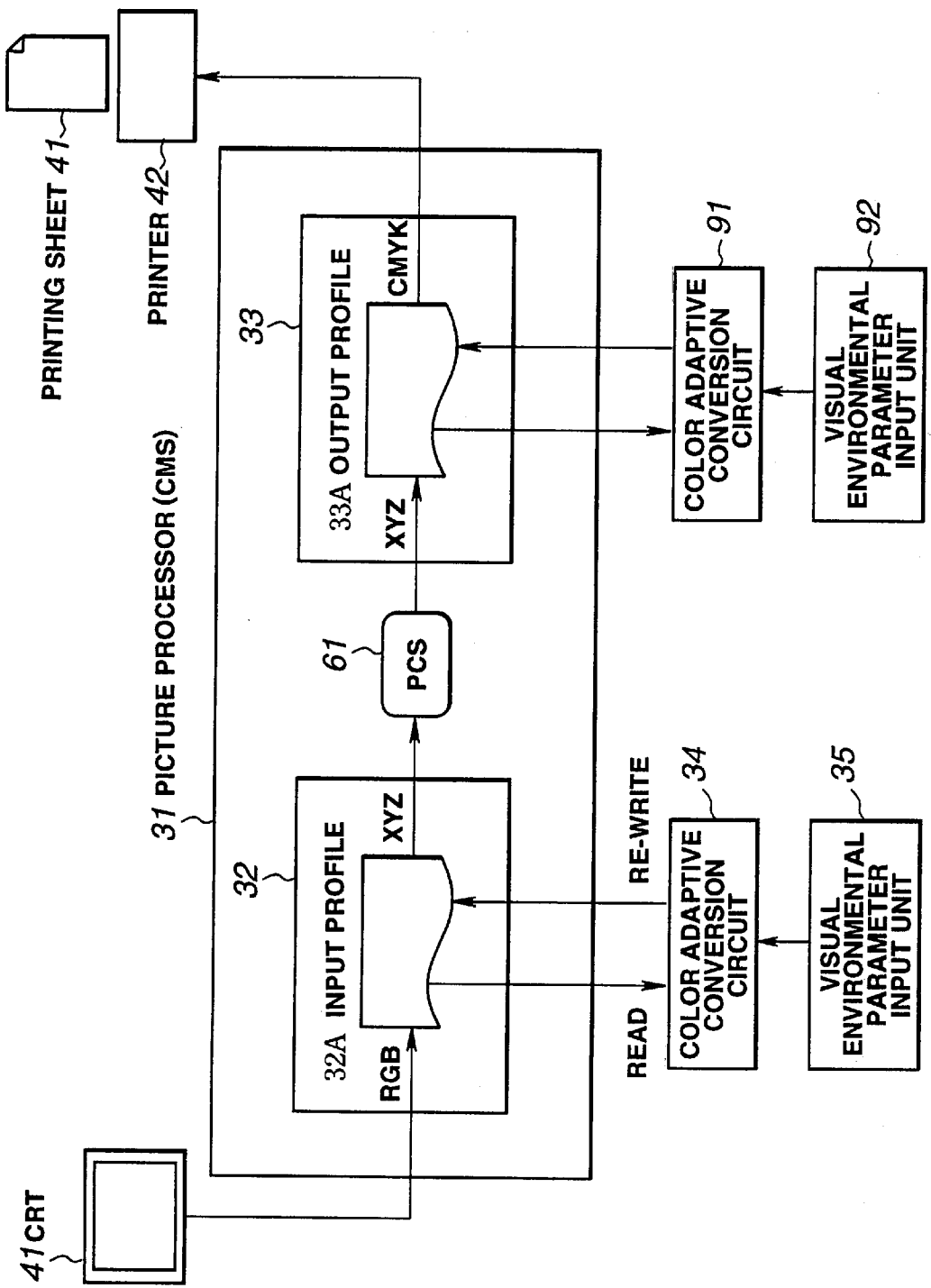
FIG. 24 is a block diagram showing another illustrative structure of a picture processing system embodying the present invention.

In the above-described picture processing system of FIGS. 15 and 16, it is the input profile 32A of the converter 32 that is re-written. However, it may be the output profile 33A of the converter 33 that is re-written. FIG. 24 shows an illustrative structure in this case.

That is, in the illustrative structure of FIG. 24, not only a color adaptation model conversion circuit 34 and a viewing condition parameter input unit 35 are provided for re-writing the input profile 32A but also a color adaptation model conversion circuit 91 and a viewing condition parameter input unit 92 are provided for re-writing the input profile 33A. The viewing condition parameter input unit 92 operates similarly to the viewing condition parameter input unit 35 while the color adaptation model conversion circuit 91 operates similarly to the color adaptation model conversion circuit 34. This enables the output profile 33A to be updated similarly to the input profile 32A.

FIGS. 25 to 29 show the data flow in the above-described embodiment. FIGS. 25, 26, 27, 28 and 29 correspond to the embodiments of FIGS. 2, 9, 10, 11 and 12, respectively.

Figure 25:
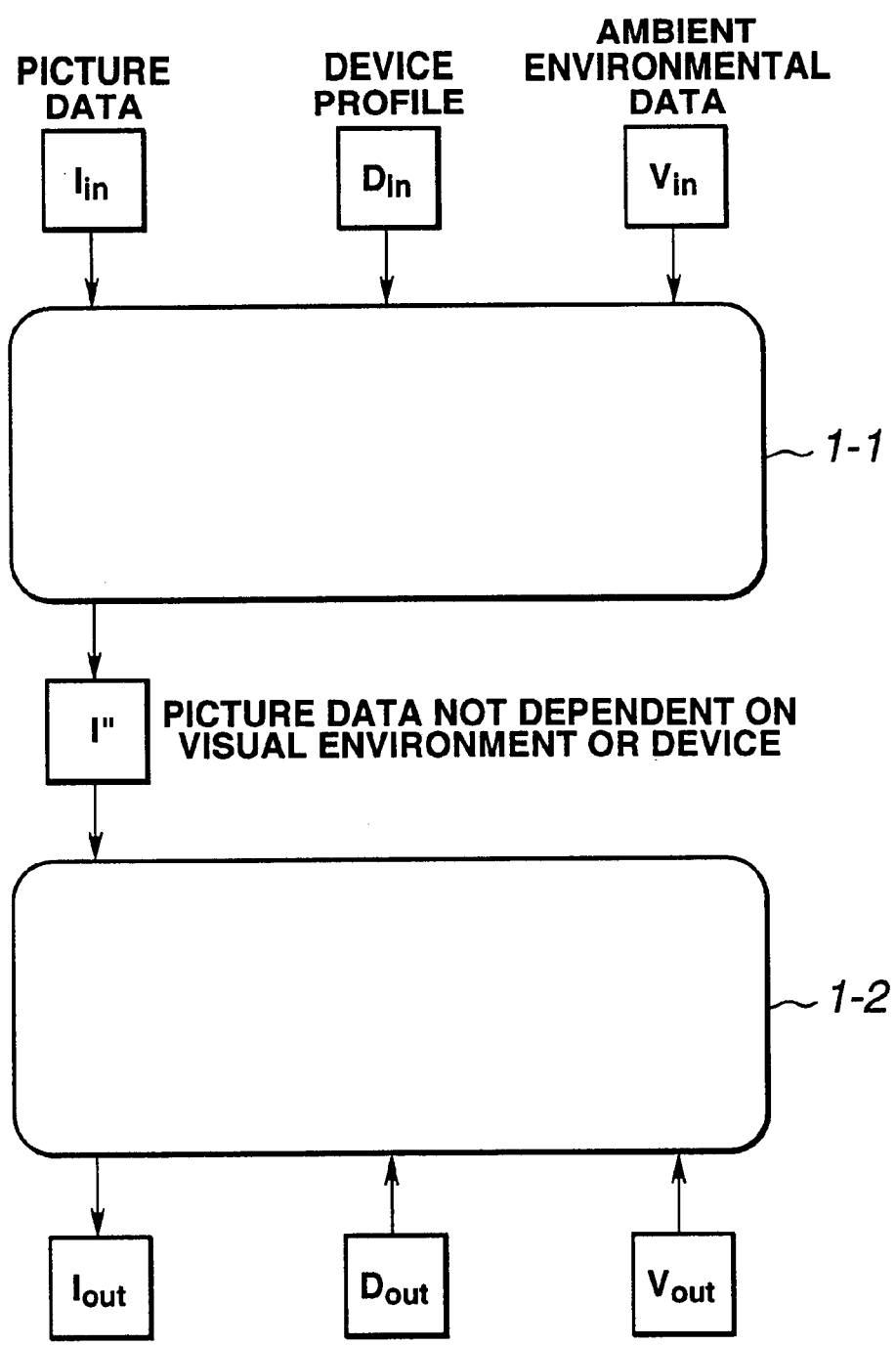
FIG. 25 illustrates CMS data flow.

Specifically, in the system of FIG. 25, the picture processing unit 1-1 is fed with picture data $I_{in}$, device profile data $D_{in}$ and viewing condition parameter data (surrounding parameter data) $V_{in}$. Based on these data, the picture processing unit 1-1 generates picture data I" not dependent on the viewing condition or the device to output the generated data to the picture processing unit 1-2.

The picture processing unit 1-2, fed with the device profile data $D_{out}$ and surrounding environmental data $V_{out}$, uses these data to process the picture data I" to generate and output picture data $I_{out}$.

Figure 26:
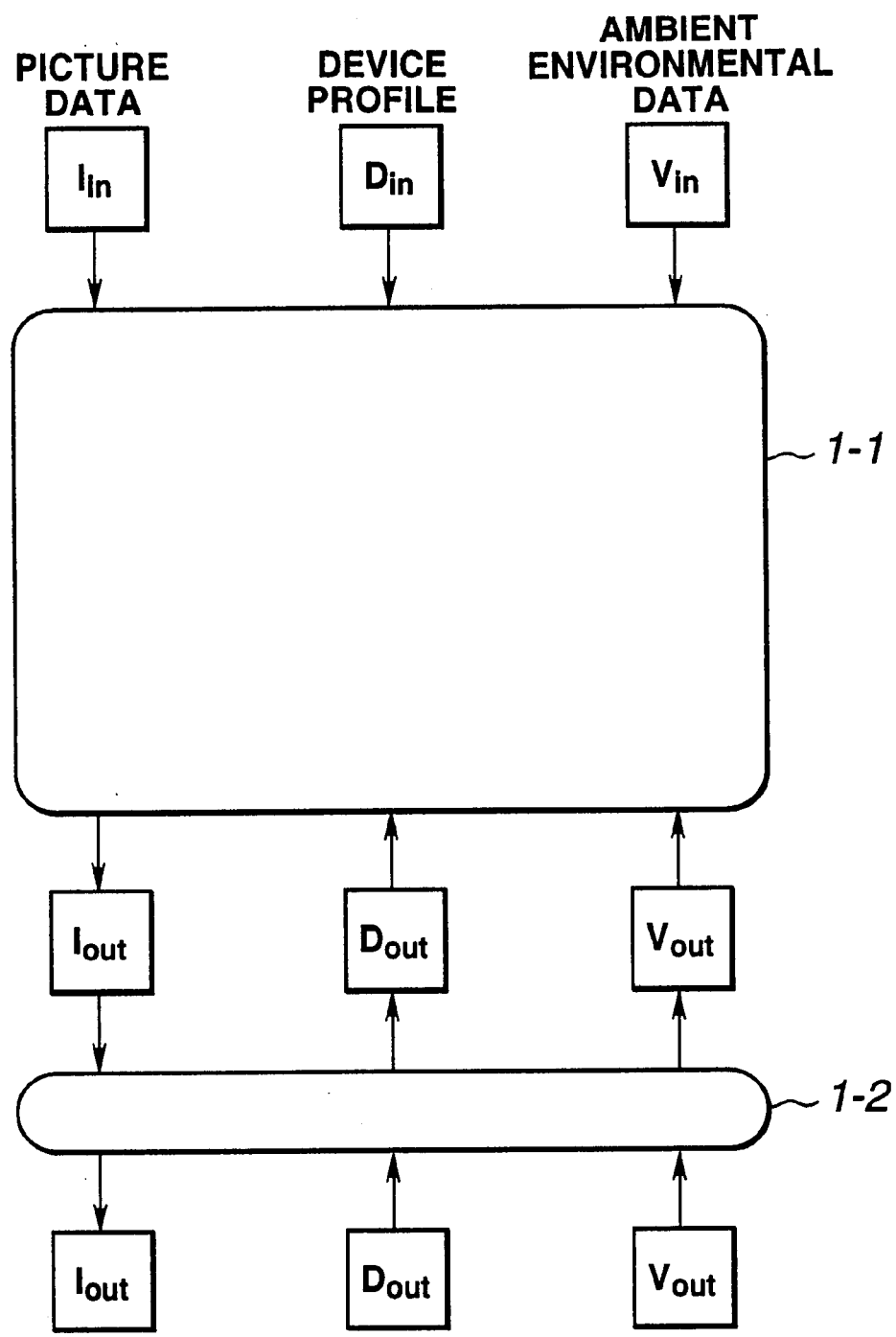
FIG. 26 similarly illustrates CMS data flow.

In the system of FIG. 26, the picture processing unit 1-1 is fed with the picture data $I_{in}$, device profile data $D_{in}$ and surrounding environmental data $V_{in}$. The picture processing unit 1-1 is also fed with device profile data $D_{out}$ and surrounding environmental data $V_{out}$. The picture processing unit 1-1 utilizes the device profile data $D_{in}$, surrounding environmental data $V_{in}$, device profile data $D_{out}$ and the surrounding environmental data $V_{out}$ to process the picture data $I_{in}$ to generate picture data $I_{out}$ which is outputted to the picture processing unit 1-2. The picture processing unit 1-2 sends the picture data $I_{out}$ to an output device.

Figure 27:
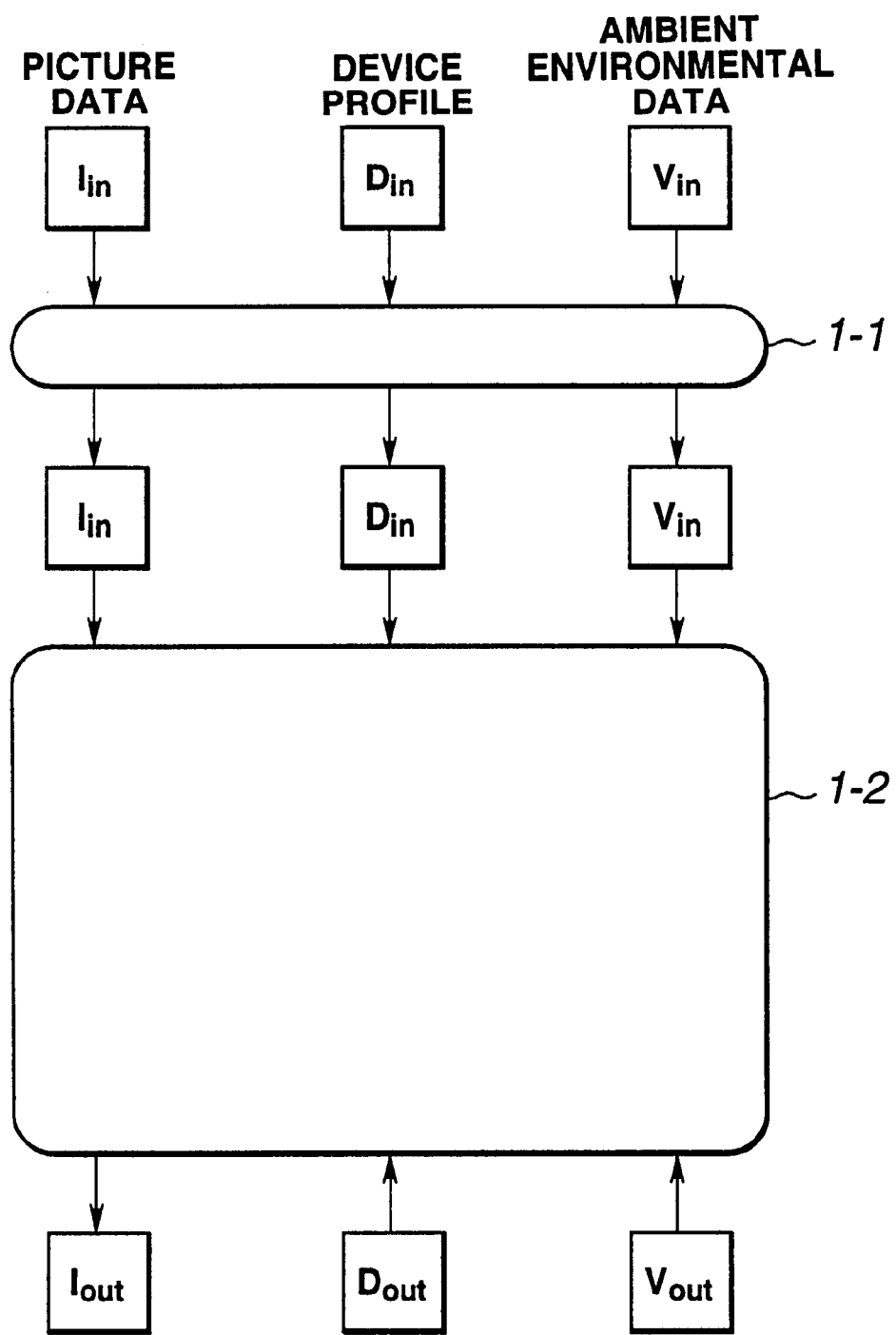
FIG. 27 similarly illustrates CMS data flow.

In the system of FIG. 27, the picture processing unit 1-1 directly outputs the input picture data $I_{in}$, device profile data $D_{in}$ and the surrounding environmental data $V_{in}$ to the picture processing unit 1-2.

The picture processing unit 1-2 is also fed with the device profile data $D_{out}$ and the surrounding environmental data $V_{out}$. The picture processing unit 1-2 utilizes the device profile data $D_{in}$, surrounding environmental data $V_{in}$, device profile data $D_{out}$ and the surrounding environmental data $V_{out}$ to process the picture data $I_{in}$ to generate picture data $I_{out}$.

Figure 28:
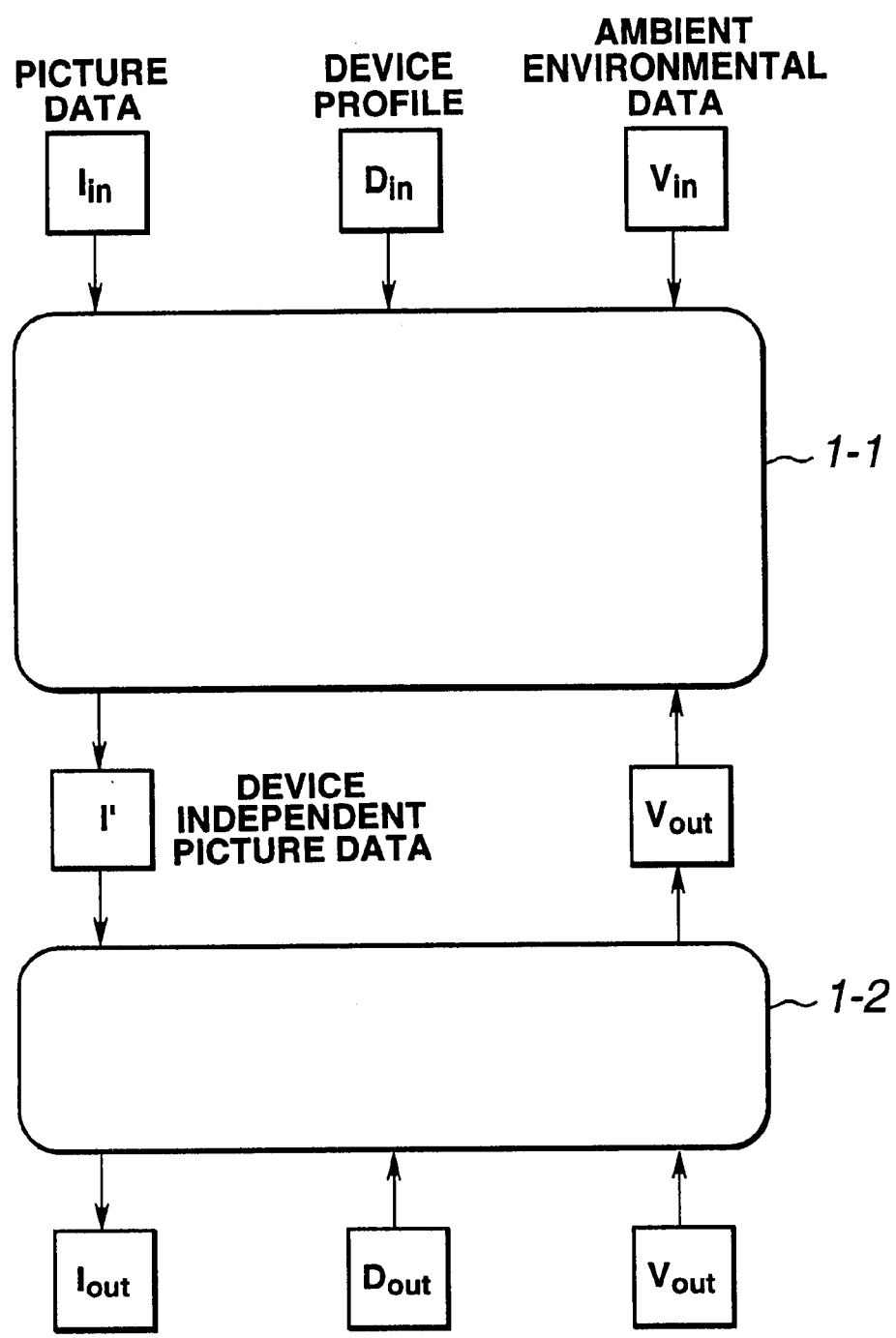
FIG. 28 similarly illustrates CMS data flow.

In the picture processing unit 1-1 of the system of FIG. 28, the picture processing unit 1-1 is fed with the picture data $I_{in}$, device profile data $D_{in}$ and the surrounding environmental data $V_{in}$. The picture processing unit 1-2 directly outputs the input surrounding environmental data $V_{out}$ to the picture processing unit 1-1. The picture processing unit 1-1 utilizes the device profile data Din, surrounding environmental data Vin and the surrounding environmental data $V_{out}$ to process picture data $I_{in}$ f to generate device independent picture data I' which is outputted to the picture processing unit 1-2.

The picture processing unit 1-2 utilizes the input device profile data $D_{out}$ to convert the input picture data I' to picture data $I_{out}$ which is outputted.

Figure 29:
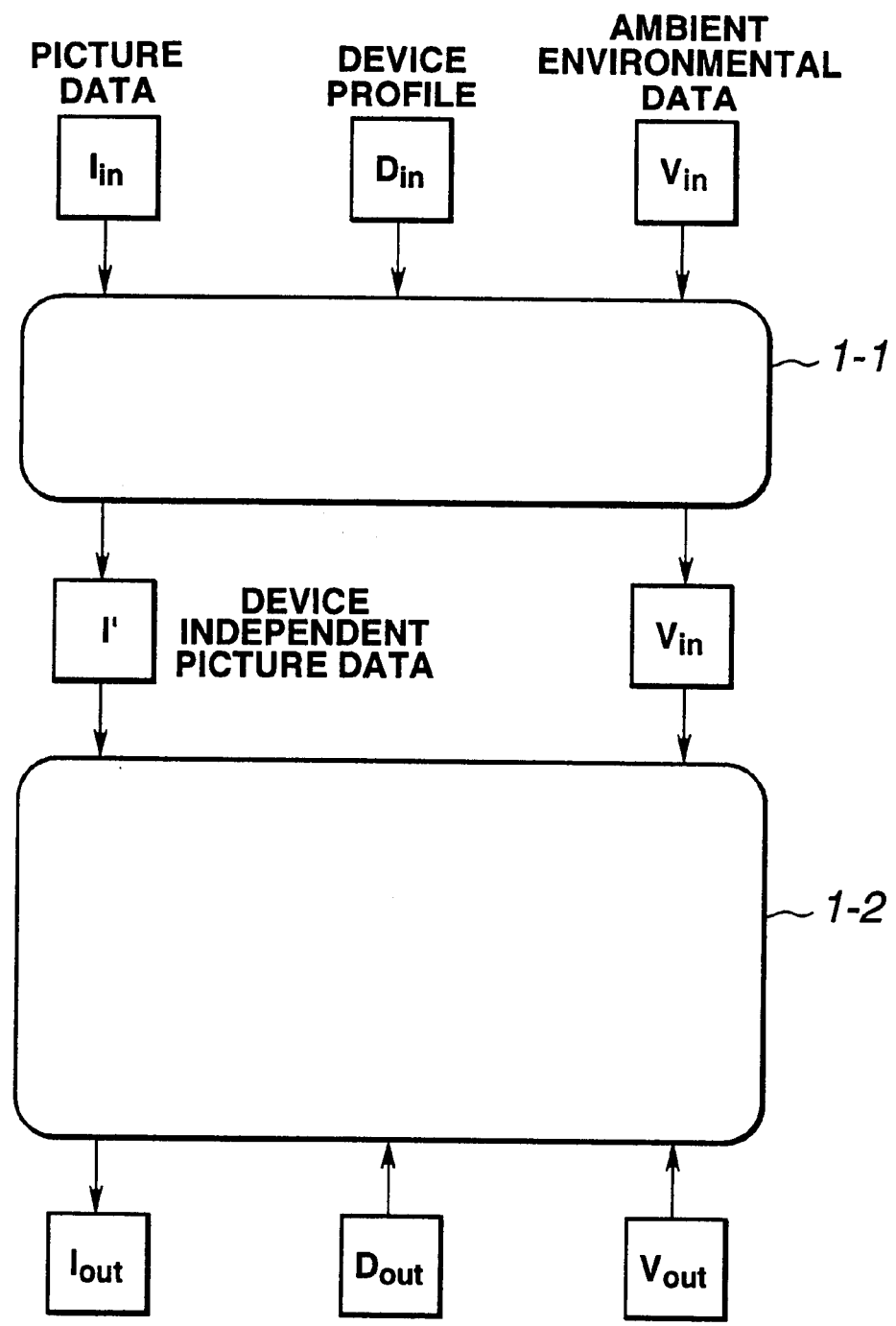
FIG. 29 similarly illustrates CMS data flow.

In the system of FIG. 29, the picture processing unit 1-1 is fed with picture data $I_{in}$, device profile data $D_{in}$ and the surrounding environmental data $V_{in}$, and utilizes the device profile data $D_{in}$ to generate device independent picture data I' from the picture data $I_{in}$. The generated device independent picture data I' is outputted to the picture processing unit 1-2. The picture processing unit 1-1 also directly outputs the surrounding environmental data $V_{in}$ to the picture processing unit 1-2.

The picture processing unit 1-2 utilizes the surrounding environmental data $V_{in}$, device profile data $D_{out}$ and the surrounding environmental data $V_{out}$ to process the picture data I' to generate and output picture data $I_{out}$.

In the picture processing units 1-1 and 1-2, it is arbitrary which data should be applied to which input data, that is which data combination should be used. However, in the embodiments of FIGS. 9 to 12, the combination shown in FIGS. 30 to 34 is used.

Figure 30:
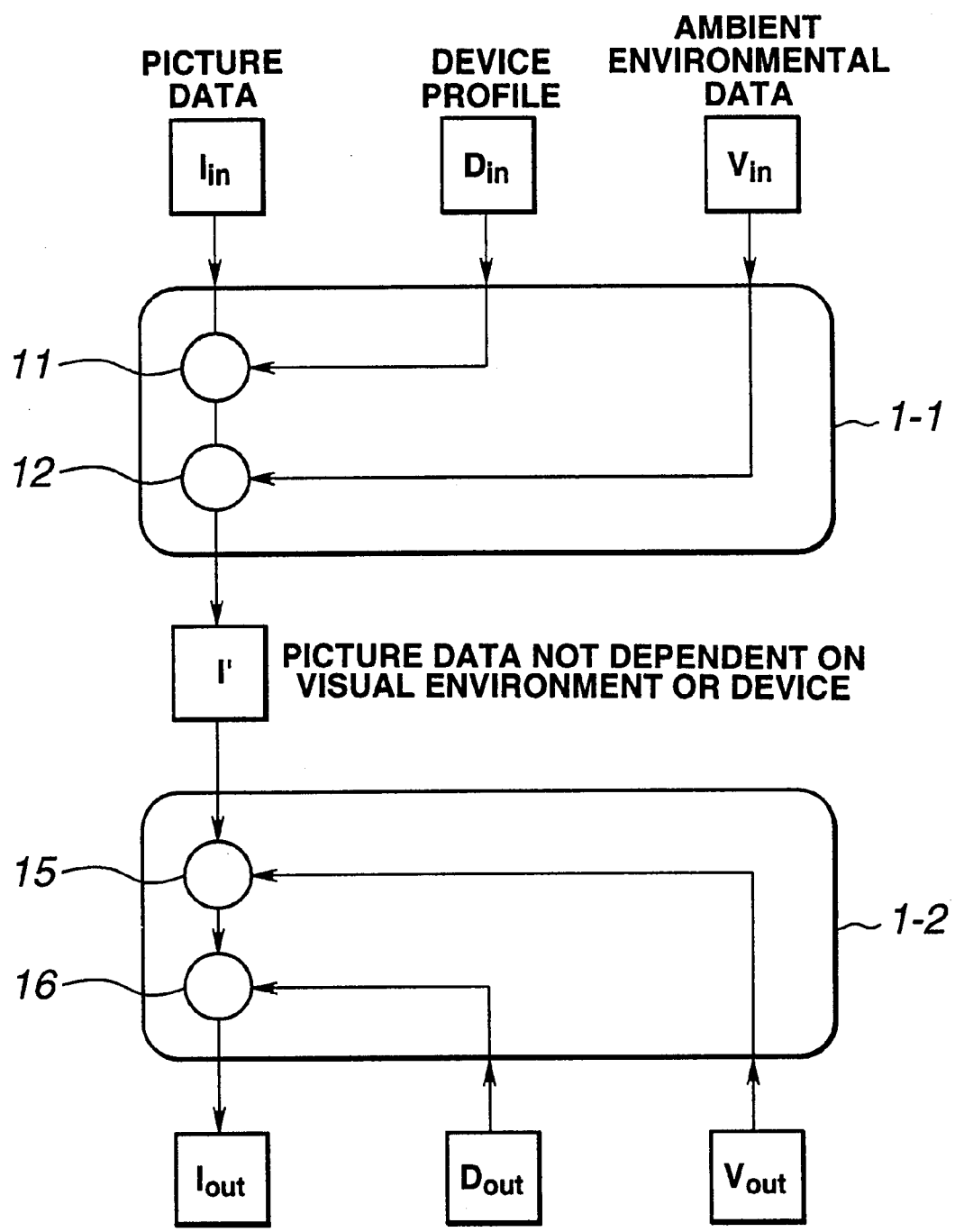
FIG. 30 similarly illustrates CMS data flow.

That is, in the system of FIG. 30 (corresponding to FIGS. 2 and 25), picture data generated by applying the device profile data $D_{in}$ to the picture data $I_{in}$ in the converter 11 is converted into picture data I" not dependent on the viewing conditions or device, by having reference to the surrounding environmental data Vin in the viewing environment conversion circuit 12.

Also, in the viewing condition conversion circuit 15 of the picture processing unit 1-2, the picture data generated by applying the surrounding environmental data $V_{out}$ to the picture data I" is converted into picture data $I_{out}$ by applying the device profile data $D_{out}$ in the converter 16.

Figure 31:
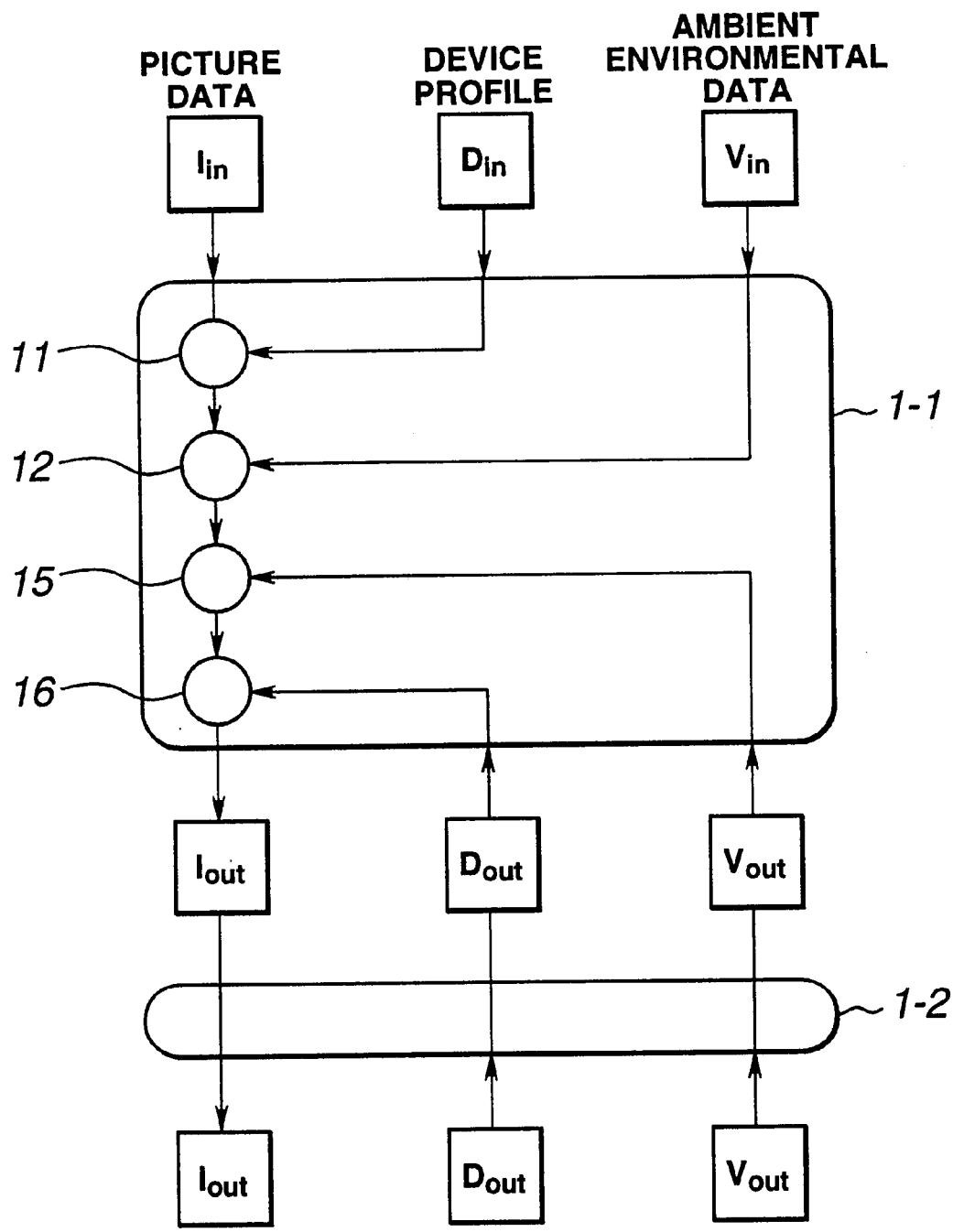
FIG. 31 similarly illustrates CMS data flow.

Also, in the system of FIG. 31 (corresponding to FIGS. 9 and 26), the converter 11 of the picture processing unit 1-1 applies the device profile data $D_{in}$ to the picture data $I_{in}$ to generate picture data. To this picture data is applied the surrounding environmental data $V_{in}$ in the viewing environment conversion circuit 12. Further, in the viewing condition conversion circuit 15, the picture data generated by applying the surrounding environmental data $V_{out}$ to the output of the viewing environment conversion circuit 12 is converted in the converter 16 into picture data $I_{out}$ by applying the surrounding environmental data $D_{out}$ Therefore, in this case, the picture processing unit 1-2 simply outputs the input picture data $I_{out}$, device profile data $D_{out}$ and the surrounding environmental data $V_{out}$.

Figure 32:
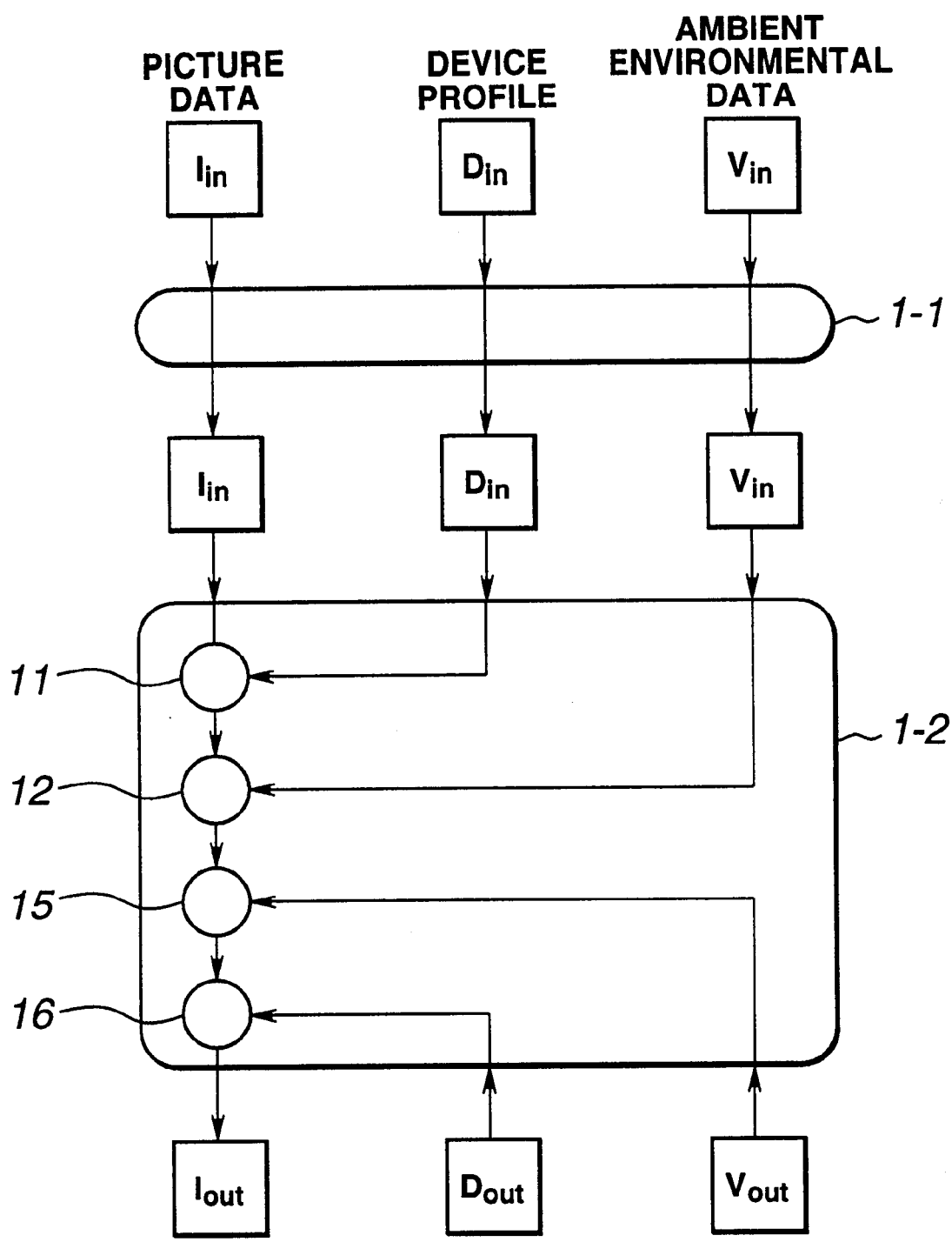
FIG. 32 similarly illustrates CMS data flow.

In the system of FIG. 32 (corresponding to FIGS. 10 and 27), the picture processing unit 1-1 directly outputs the input picture data $I_{in}$, device profile data $D_{in}$ and the surrounding environmental data $V_{in}$ to the picture processing unit 1-2. In the picture processing unit 1-2, the converter 12 applies the device profile data $D_{in}$ to the picture data $I_{in}$ to output the resulting output to the viewing environment conversion circuit 12. The viewing environment conversion circuit 12 sends to the viewing condition conversion circuit 15 picture data generated on applying the surrounding environmental data $V_{in}$ to the picture data from the converter 11. The viewing condition conversion circuit 15 outputs to the converter 16 picture data generated on applying the surrounding environmental data $V_{out}$ to the input picture data. The converter 16 applies the device profile data $D_{out}$ to the input picture data to generate picture data $I_{out}$.

In the picture processing unit 1-1 of the system of FIG. 33 (corresponding to FIGS. 11 and 28), the picture data generated by applying the device profile data $D_{in}$ to the picture data $I_{in}$ by the converter 11 is outputted to the viewing environment conversion circuit 12. The viewing environment conversion circuit applies the surrounding environmental data $V_{out}$ to the input picture data to generate device independent picture data I' which is outputted the picture processing unit 1-2.

The picture processing unit 1-2, the converter 16 applies the device profile data $D_{out}$ to the input picture data I' to generate picture data $I_{out}$.

Figure 34:
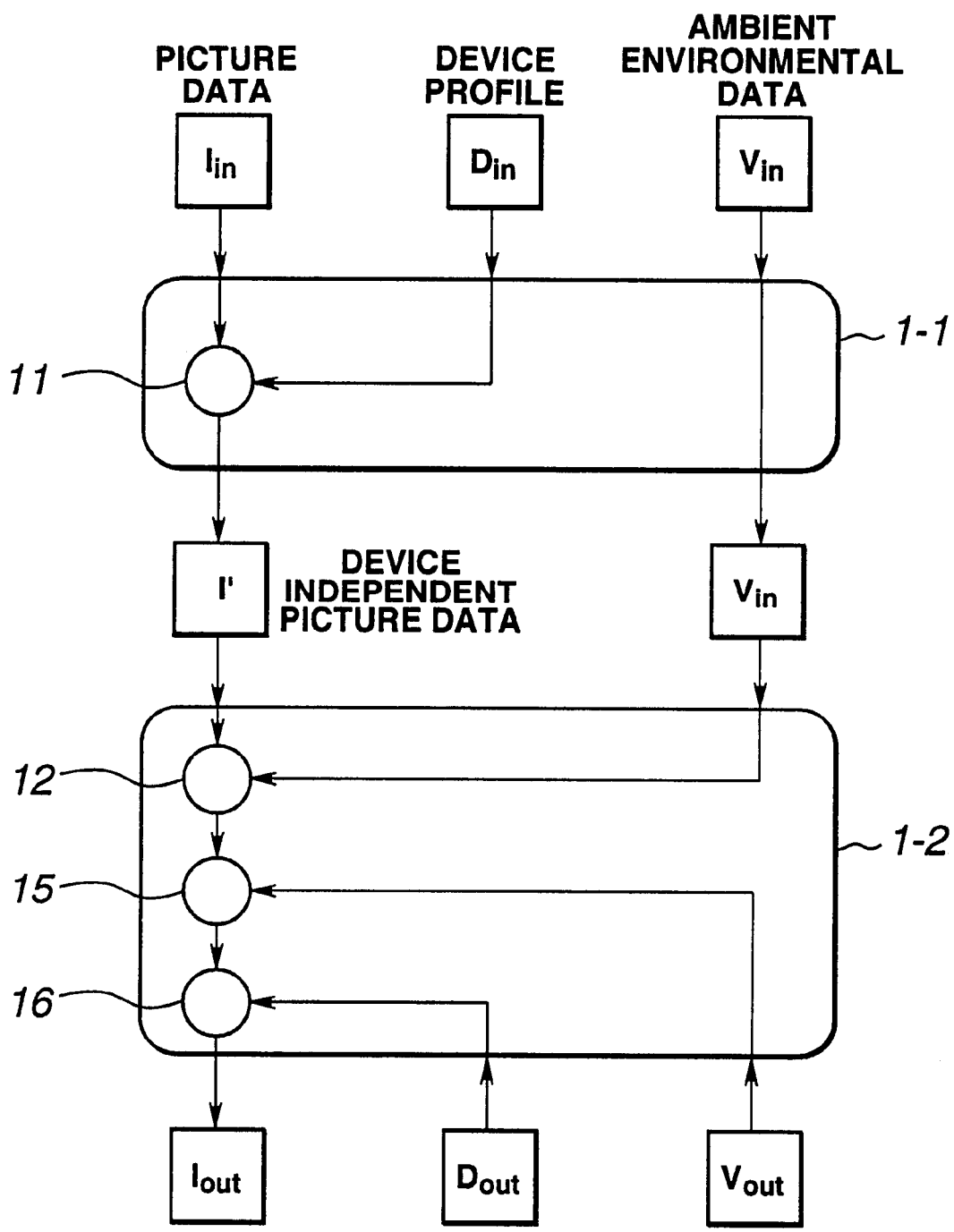
FIG. 34 similarly illustrates CMS data flow.

In the system of FIG. 34 (corresponding to FIGS. 12 and 29), the converter 11 in the picture processing unit 1-1 applies the device profile data $D_{in}$ to the picture data $I_{in}$ to generate device independent picture data I'. The picture data I' is converted in the viewing environment conversion circuit 12 of the picture processing unit 1-2 into picture data which takes into account the surrounding environmental data. The resulting data is entered to the viewing condition conversion circuit 15. The viewing condition conversion circuit 15 applies the surrounding environmental data $V_{out}$ to the input picture data to generate new picture data which is outputted to the converter 16. The converter 16 applies the device profile data $D_{out}$ to the input picture data to generate picture data $I_{out}$.

However, any suitable optional combination of processing operations in the picture processing units 1-1, 1-2 may be used.

For example, the system of FIG. 30 applies the surrounding environmental data $V_{in}$ to picture data generated by applying the device profile data $D_{in}$ to the picture data $I_{in}$ in the picture processing unit 1-1. Alternatively, the device profile data $D_{in}$ and the surrounding environmental data Vin may be assembled previously in one data which is applied to the picture data $I_{in}$. Still alternatively, the surrounding environmental data $V_{in}$ may be applied to the picture data $I_{in}$ and subsequently the device profile data $D_{in}$ may be applied.

However, if, as in the system shown in FIGS. 15, 16 and 24, the surrounding environmental data $V_{in}$ may be applied to the profile data to re-write the profile into a profile not dependent on the surrounding environment to realize the system assuring color appearance coincidence by utilizing the CMS of pre-existing the ICC. This embodiment is shown in FIGS. 35 to 37.

Figure 35:
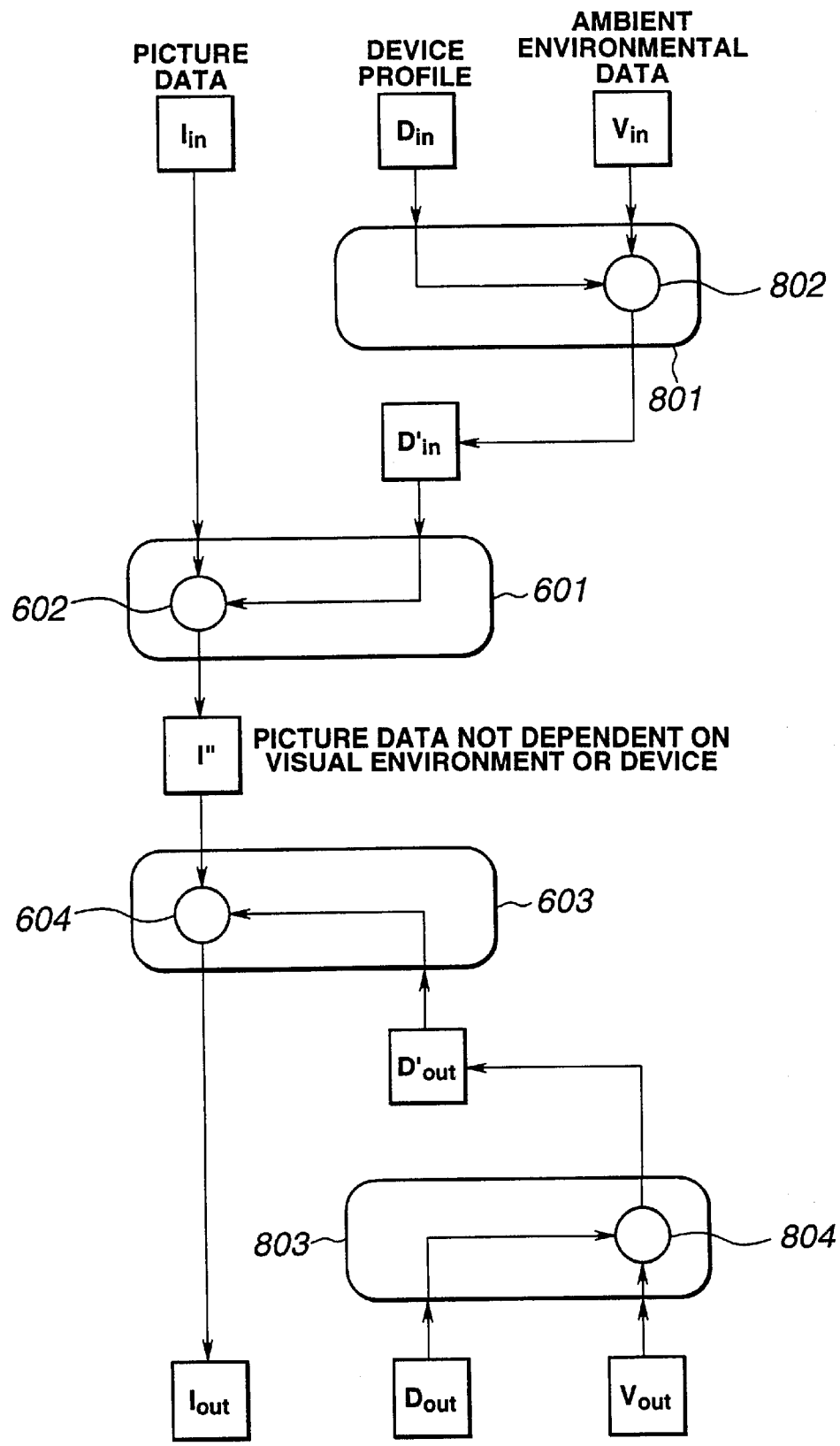
FIG. 35 similarly illustrates CMS data flow.
Figure 43:
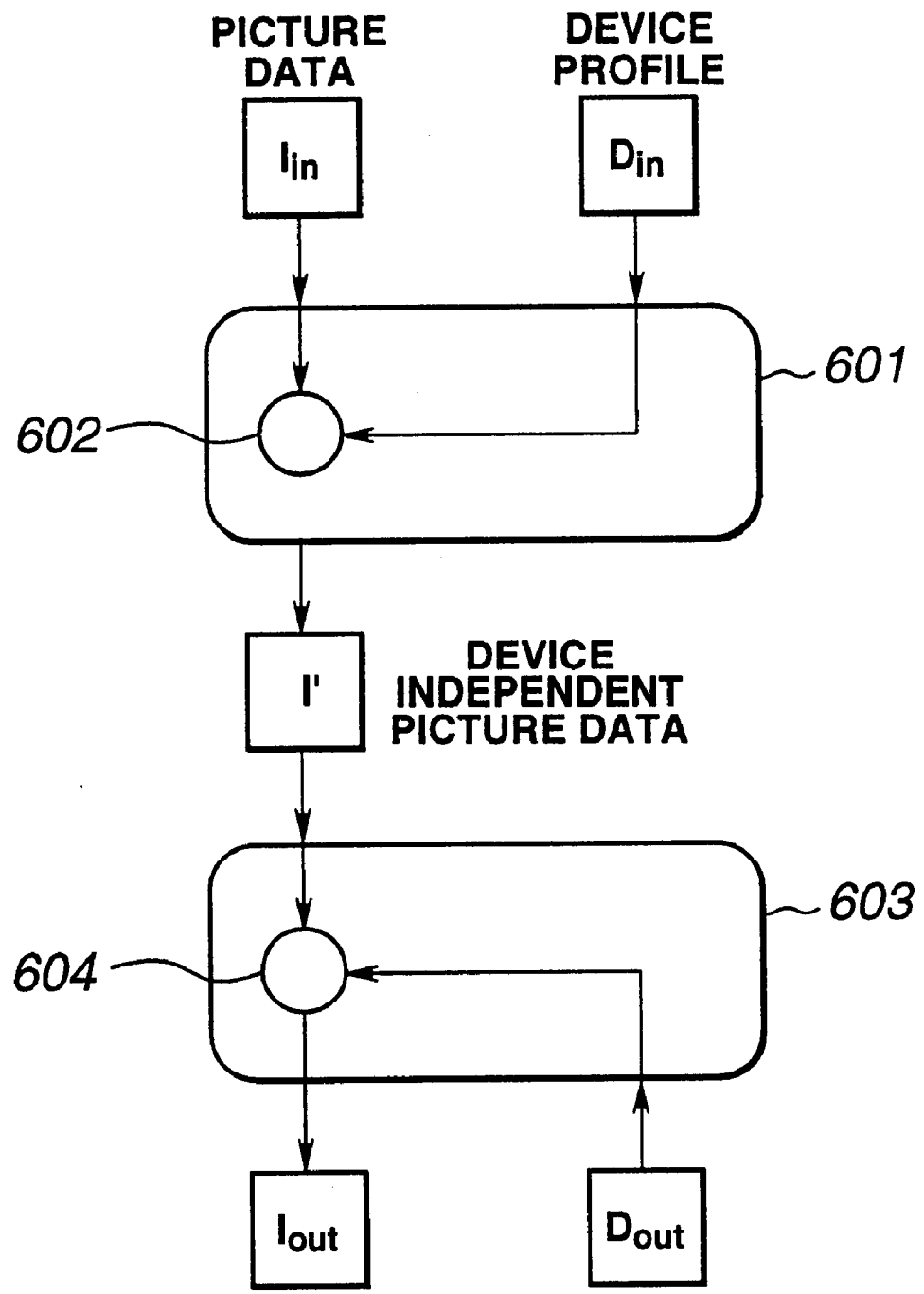
FIG. 43 illustrates data flow in the conventional picture processing system.

FIG. 35 shows an example of utilizing a pre-existing system. In the system of FIG. 35, a color adaptation model conversion circuit 802 of a picture processing unit 801 applies the surrounding environmental data $V_{in}$, to the device profile data $D_{in}$ for re-writing to device profile data $D'_{in}$ which takes surrounding environmental data into account. This device profile data $D'_{in}$ is sent to the picture processing unit 601 along with the picture data $I_{in}$. As explained with reference to FIG. 43, there exists a CMS in which picture data $I_{in}$ and the device profile data $D_{in}$ are supplied to the converter 602 of the picture processing unit 601 to generate device-independent picture data I'. Thus, by supplying to the picture processing unit 601 the device profile data $D'_{in}$ instead of the device profile data $D_{in}$ to the converter 602 of the picture processing unit 601, picture data I" not dependent on the viewing condition or the device may be generated and outputted by the converter 602.

Similarly, the color adaptation model conversion circuit 804 in the picture processing unit 803 re-writes the device profile data $D_{out}$ taking into account the surrounding environmental data $V_{out}$ to generate new device profile data $D'_{out}$. This device profile data $D'_{out}$ is supplied in place of the device profile data $D_{out}$ to the picture processing unit 603 of FIG. 43 so that the converter 604 of the picture processing unit 603 applies the device profile data $D'_{out}$ to the picture data I" to generate and output picture data $I_{out}$.

Figure 36:
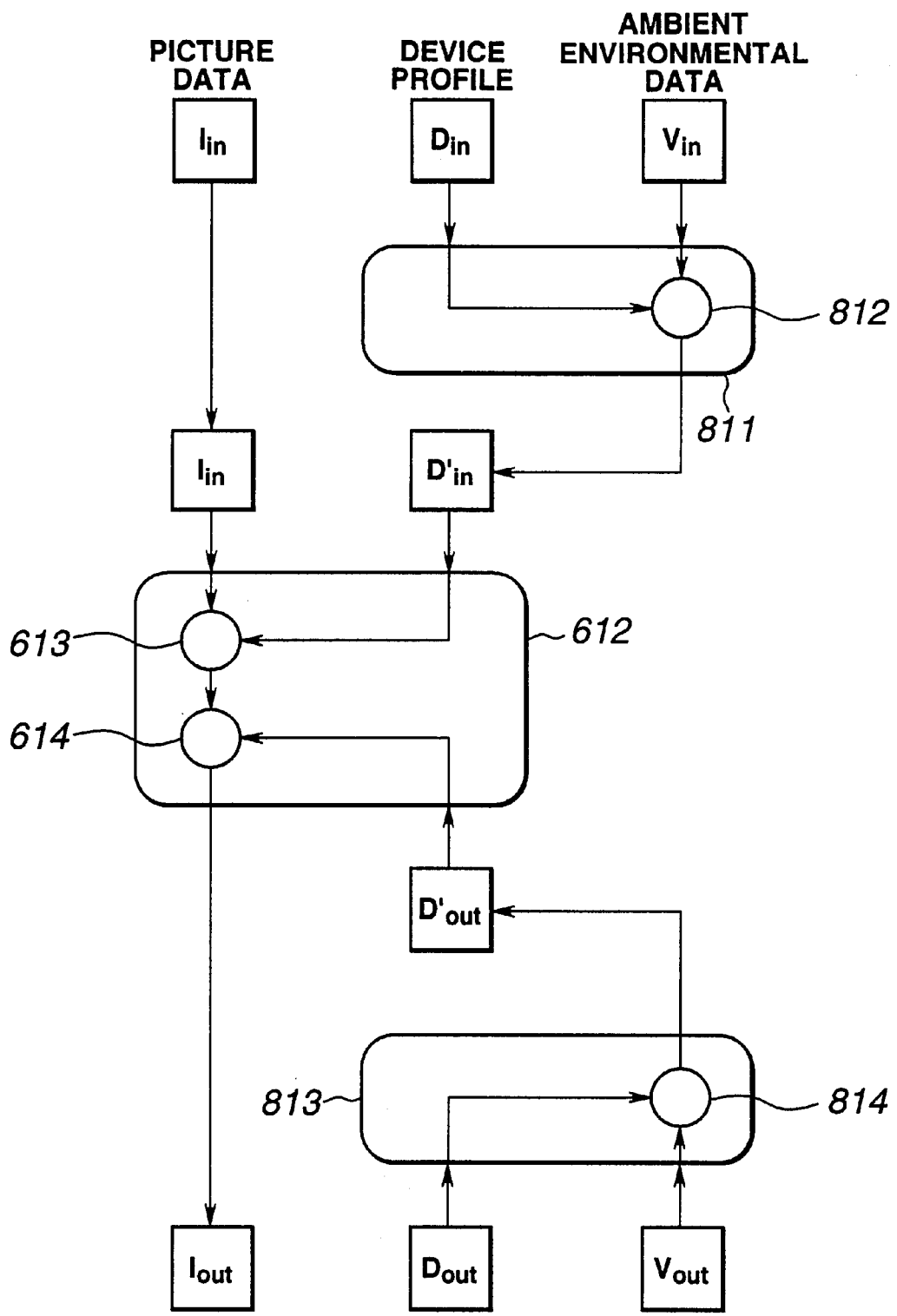
FIG. 36 similarly illustrates CMS data flow.
Figure 37:
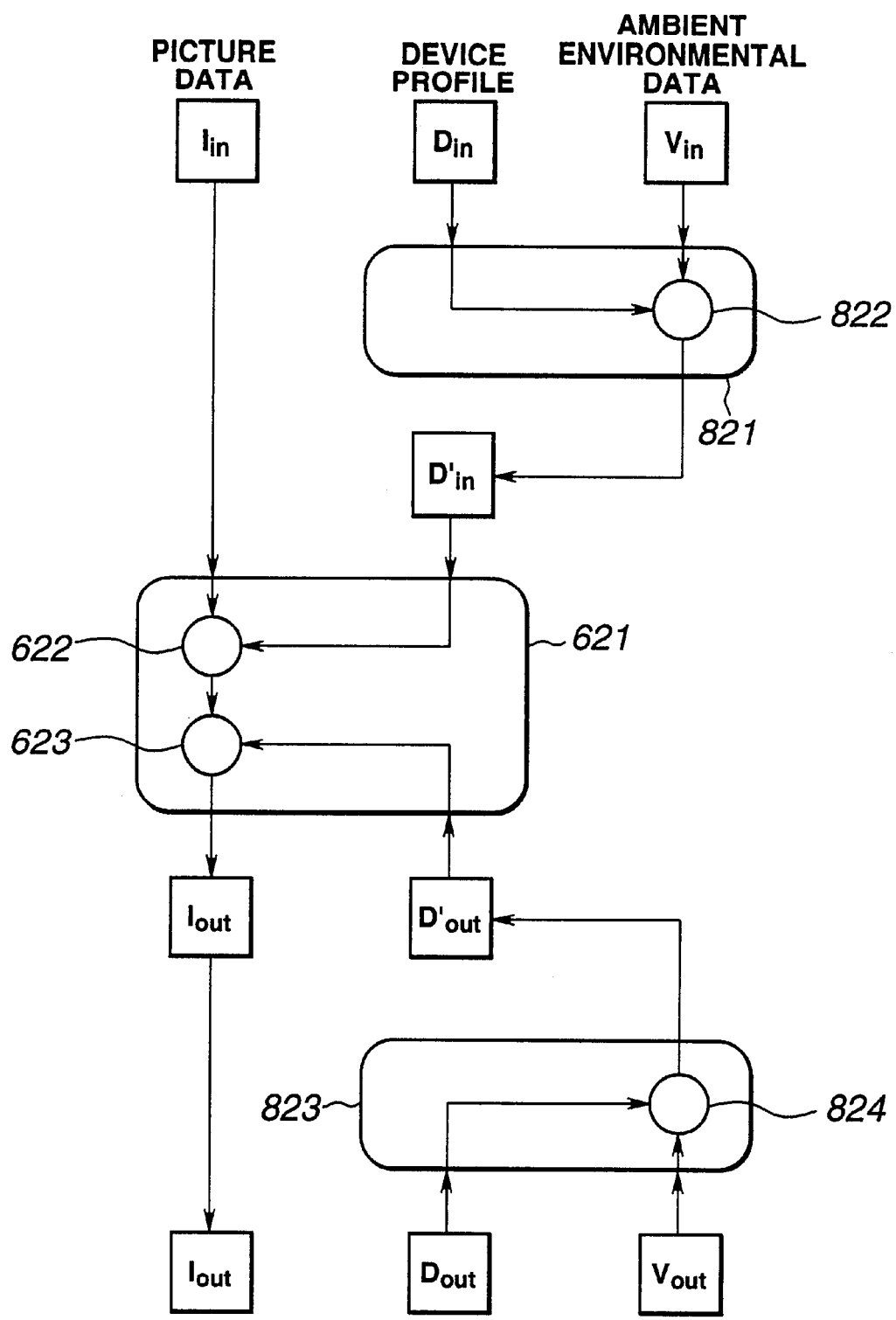
FIG. 37 similarly illustrates CMS data flow.
Figure 38:
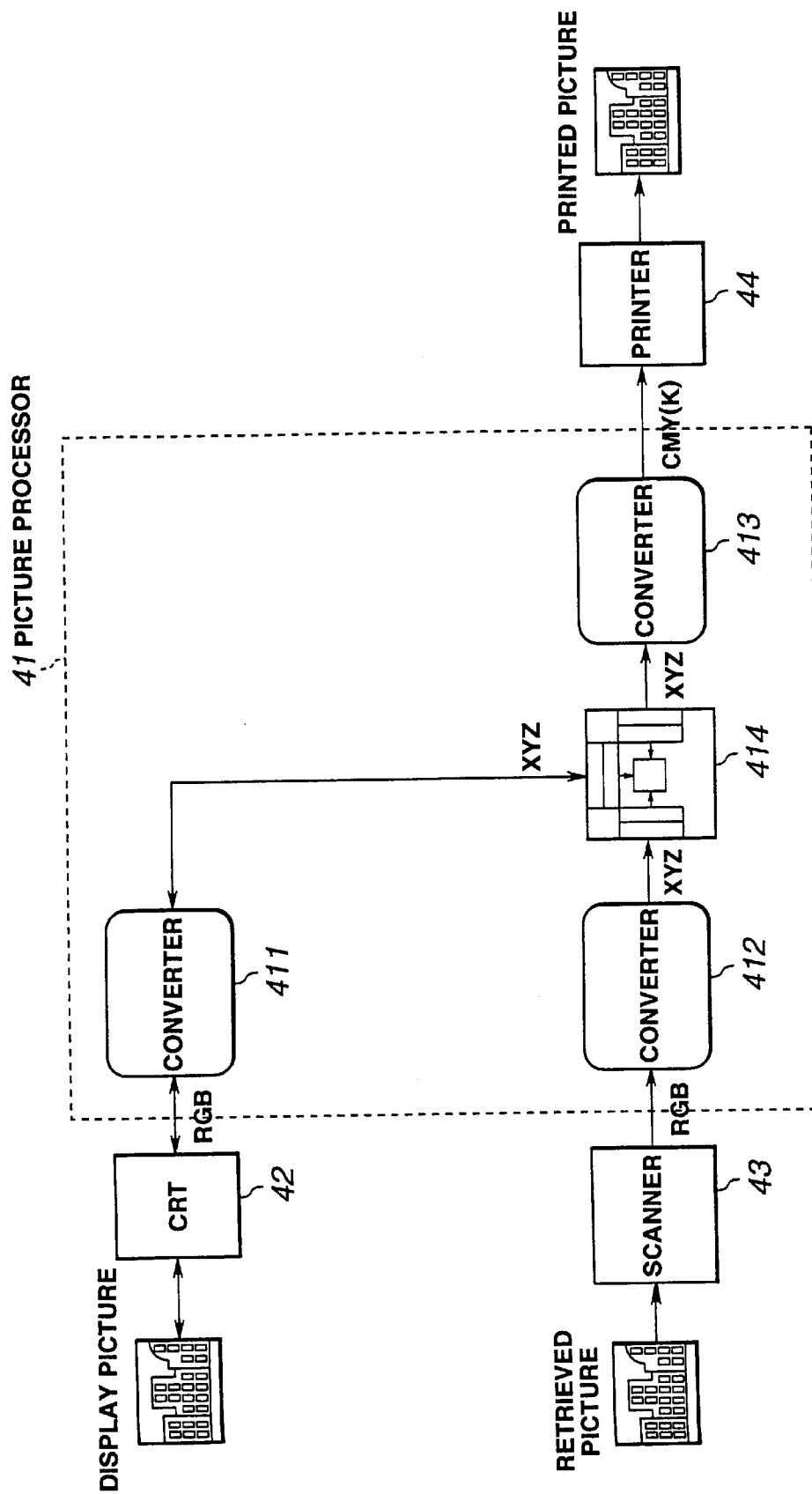
FIG. 38 shows an illustrative structure of a conventional picture processing system.
Figure 39:
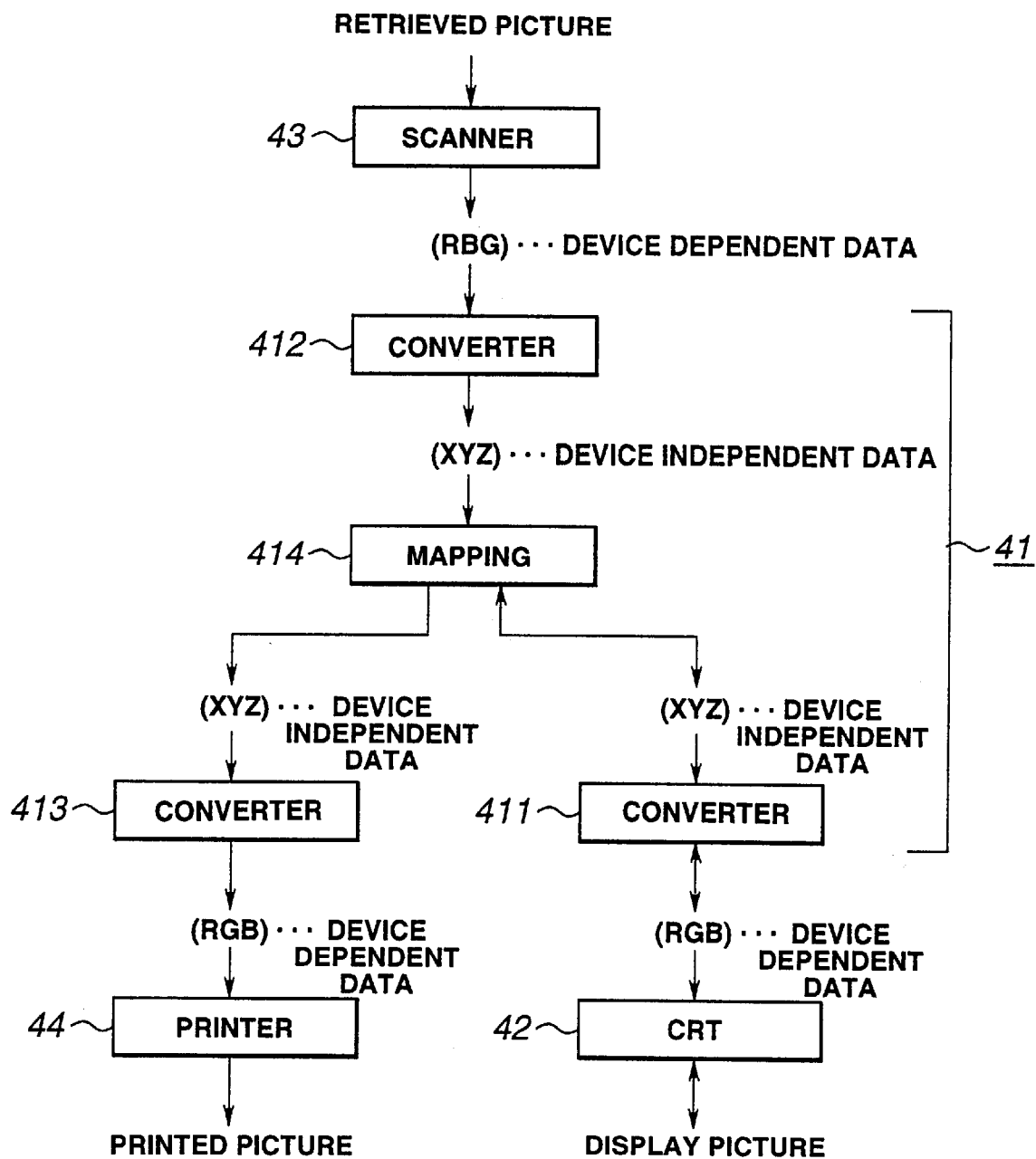
FIG. 39 illustrates the flow of picture data in the picture processing system shown in FIG. 38.
Figure 40:
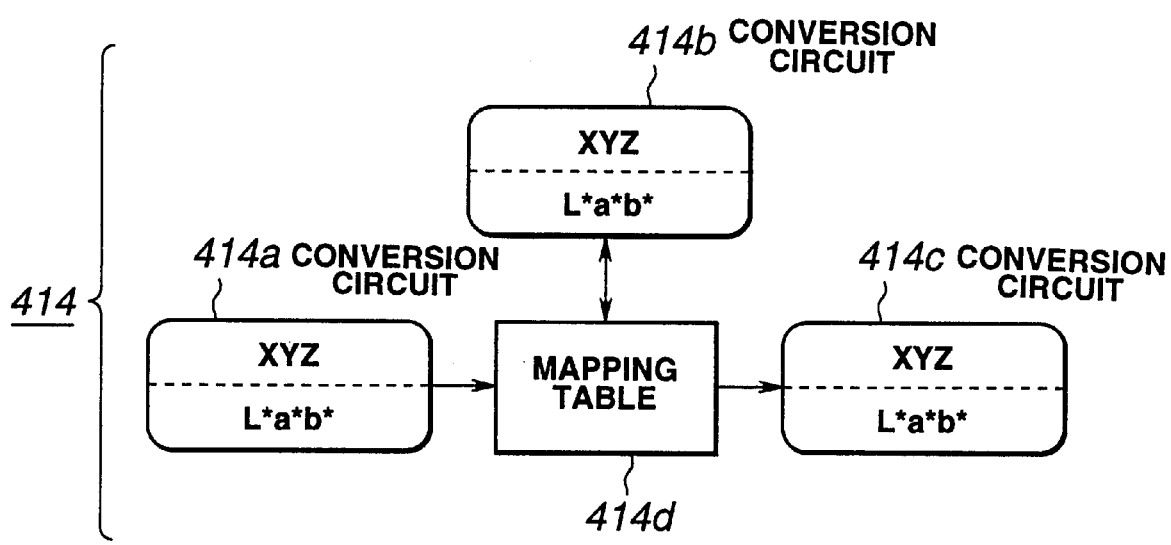
FIG. 40 shows an illustrative structure of a mapping unit shown in FIG. 38.
Figure 41:
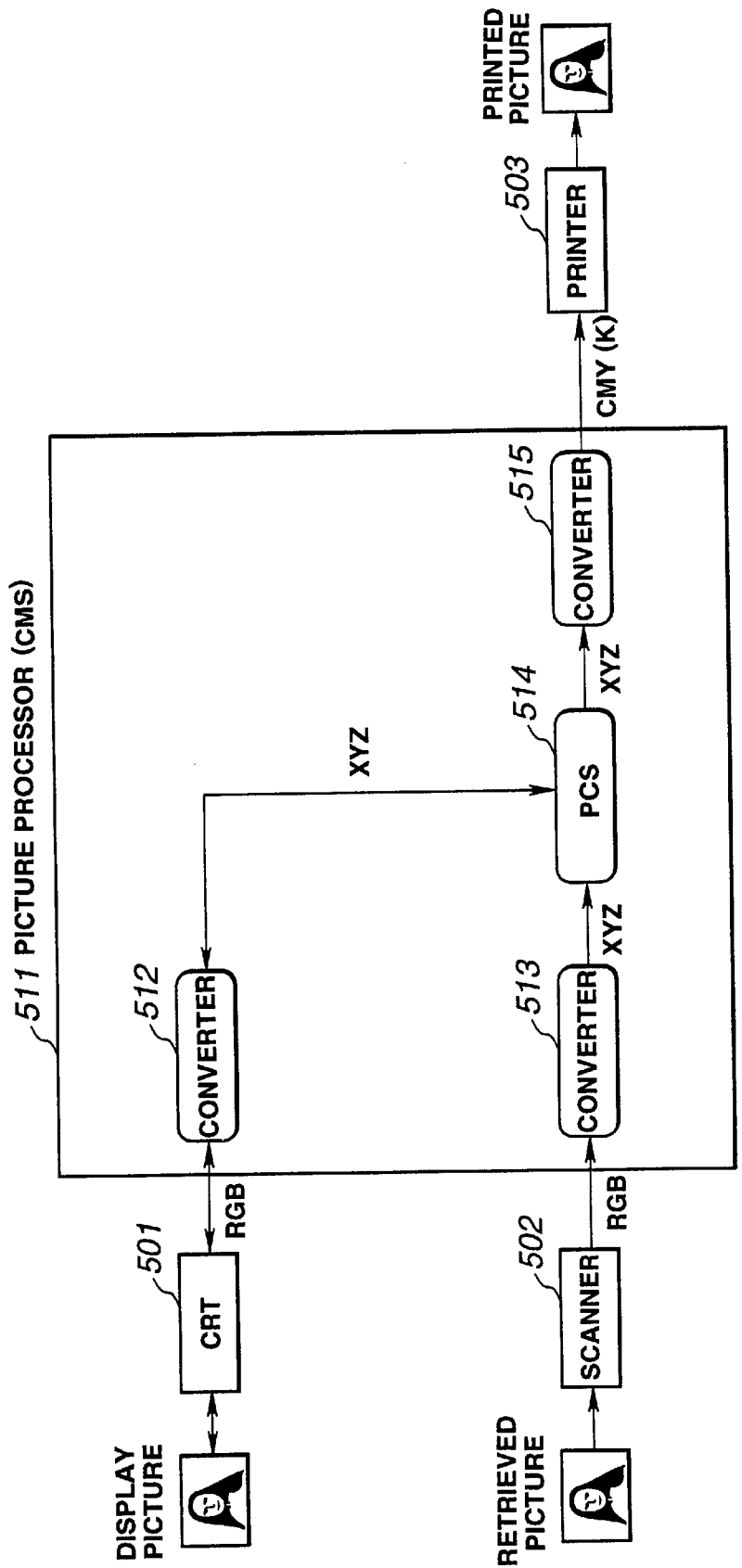
FIG. 41 is a block diagram showing another illustrative structure of a conventional picture processing system.
Figure 42:
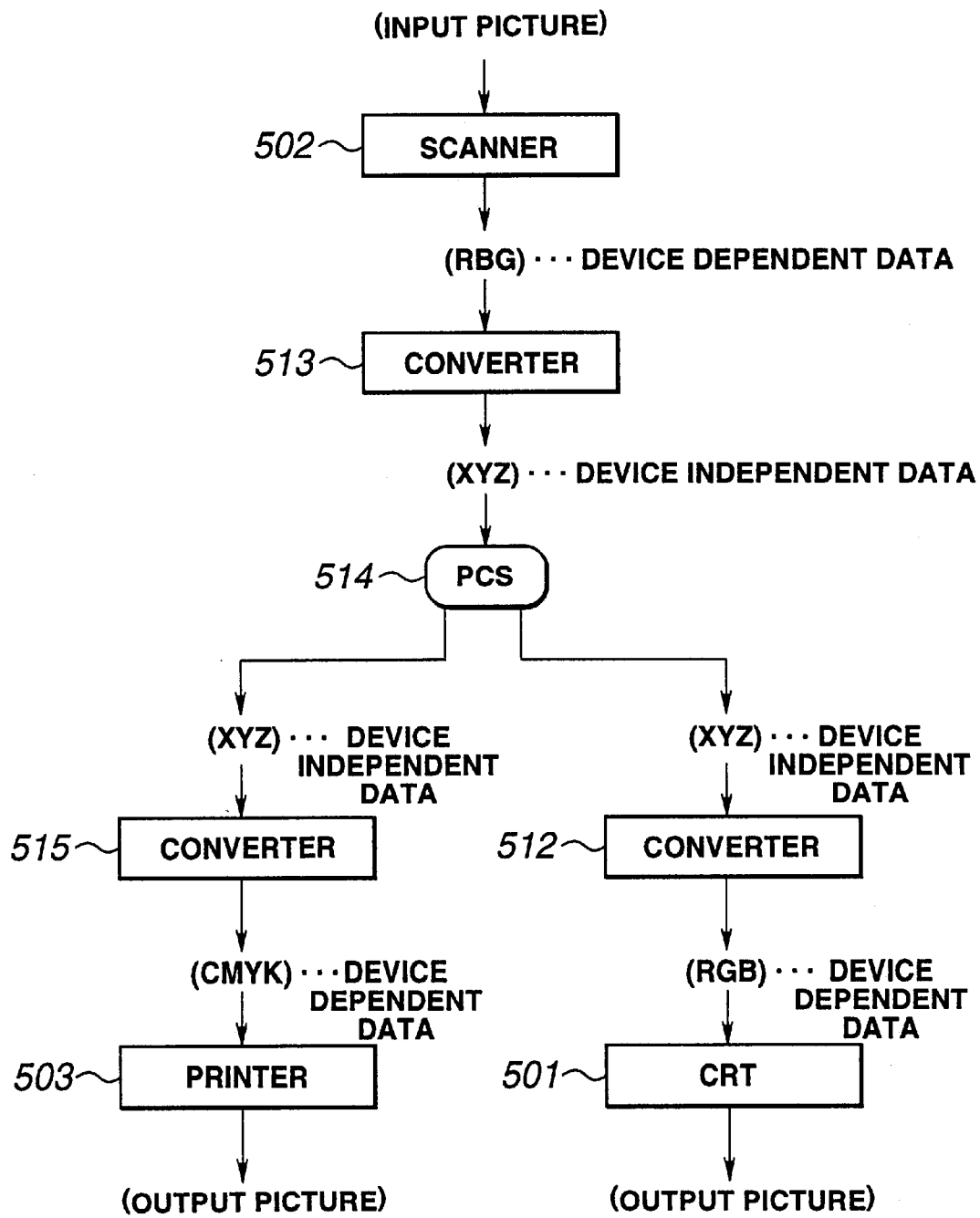
FIG. 42 illustrates the operation of the structure of FIG. 41.
Figure 44:
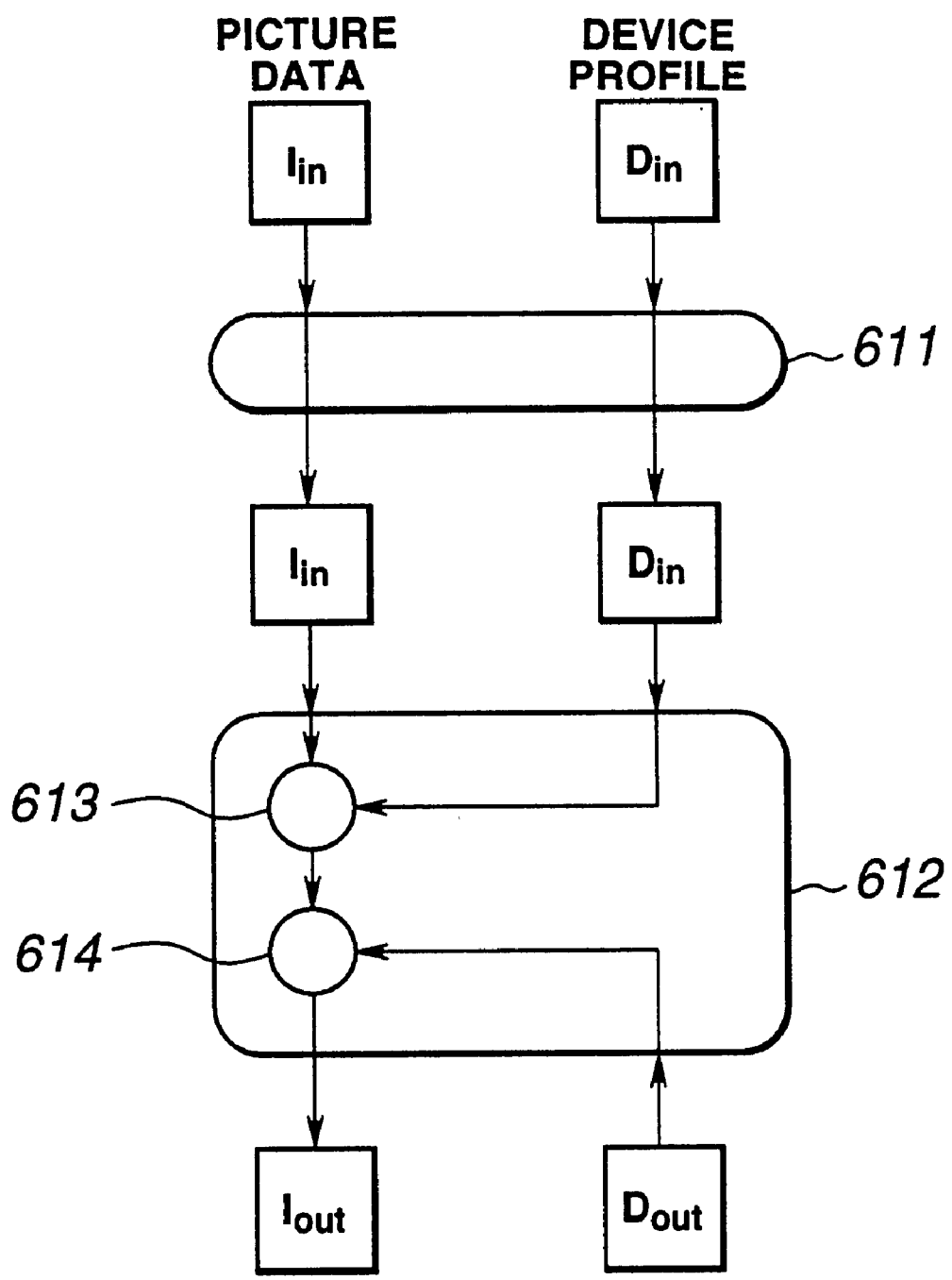
FIG. 44 similarly illustrates data flow in the conventional picture processing system.

FIG. 36 shows an embodiment of utilizing the pre-existing system of FIG. 44. In the system of FIG. 36, a color adaptation model conversion circuit 812 of a picture processing unit 811 rewrites the device profile data $D_{in}$ based on the surrounding environmental data Vin to generate surrounding environmental data independent device profile data $D'_{in}$. If this device profile data $D'_{in}$ is sent along with the picture data $I_{in}$ in place of the device profile data $D_{in}$, the processing similar to that shown in FIG. 44 is carried out in the pre-existing picture processing unit 612.

That is, the picture data generated by the converter 613 applying the device profile data $D'_{in}$ to the picture data I' in is sent to the converter 614 which is fed by the color adaptation model conversion circuit 814 of the picture processing unit 813 with device profile data $D'_{out}$ corresponding to the device profile data $D_{out}$ rewritten based on the surrounding environmental data $V_{out}$. The converter 614 applies this device profile data $D'_{out}$ to picture data entered from the converter 613 to generate and output picture data $I_{out}$.

Figure 45:
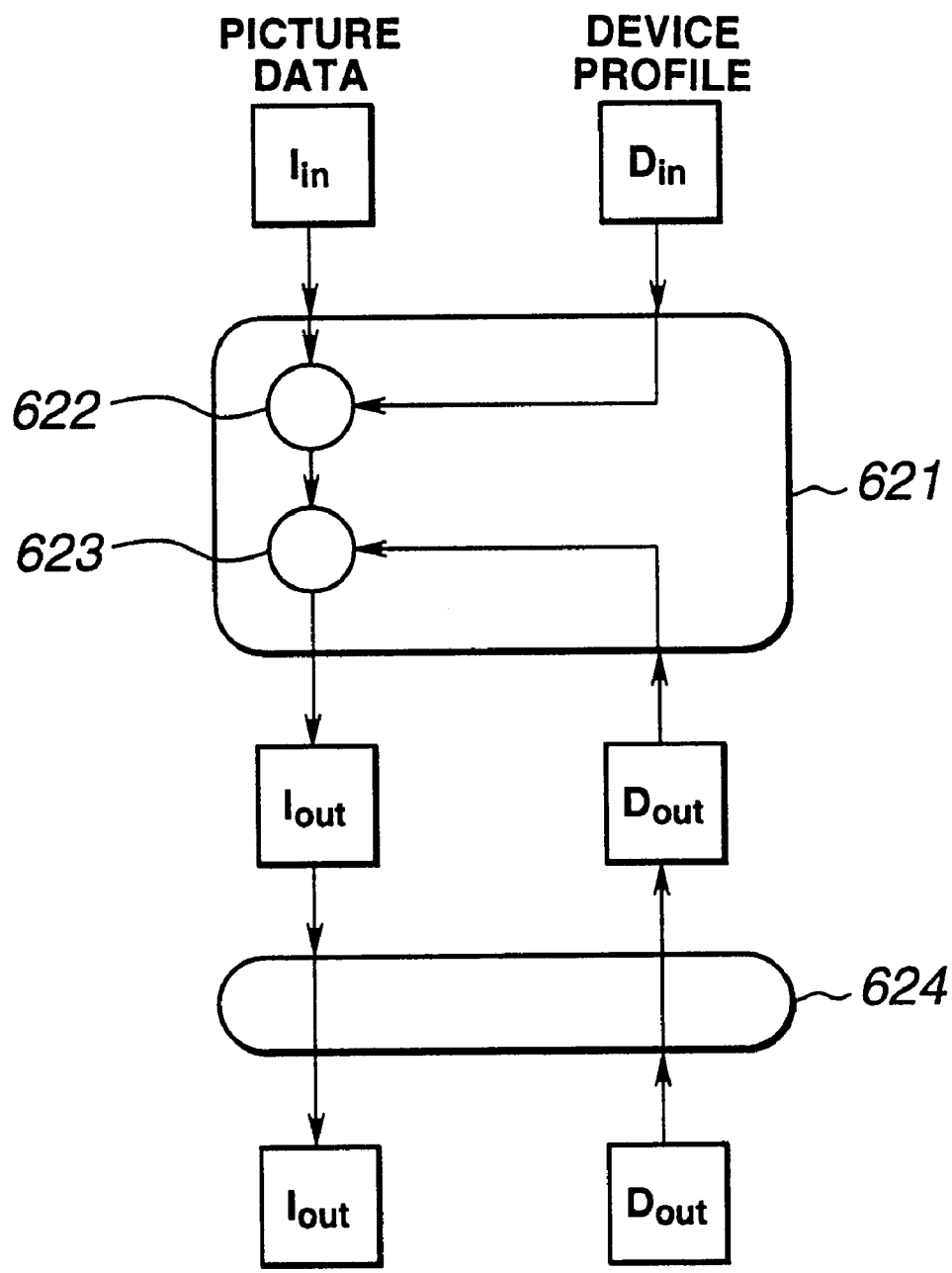
FIG. 45 similarly illustrates data flow in the conventional picture processing system.
Figure 46:
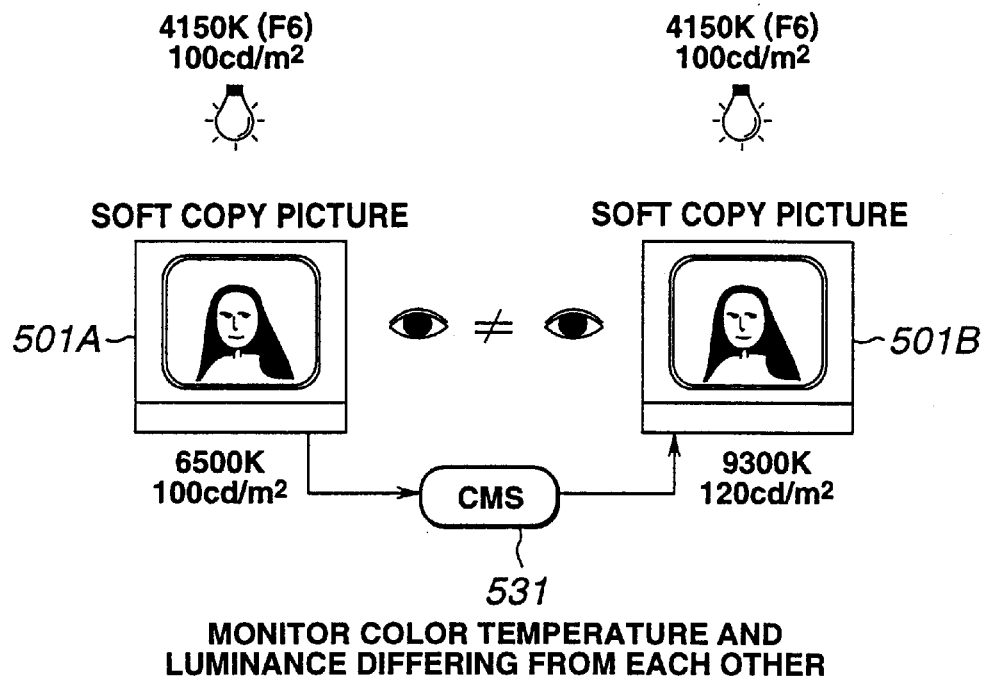
FIG. 46 illustrates pictures between conventional different apparatus.
Figure 47:
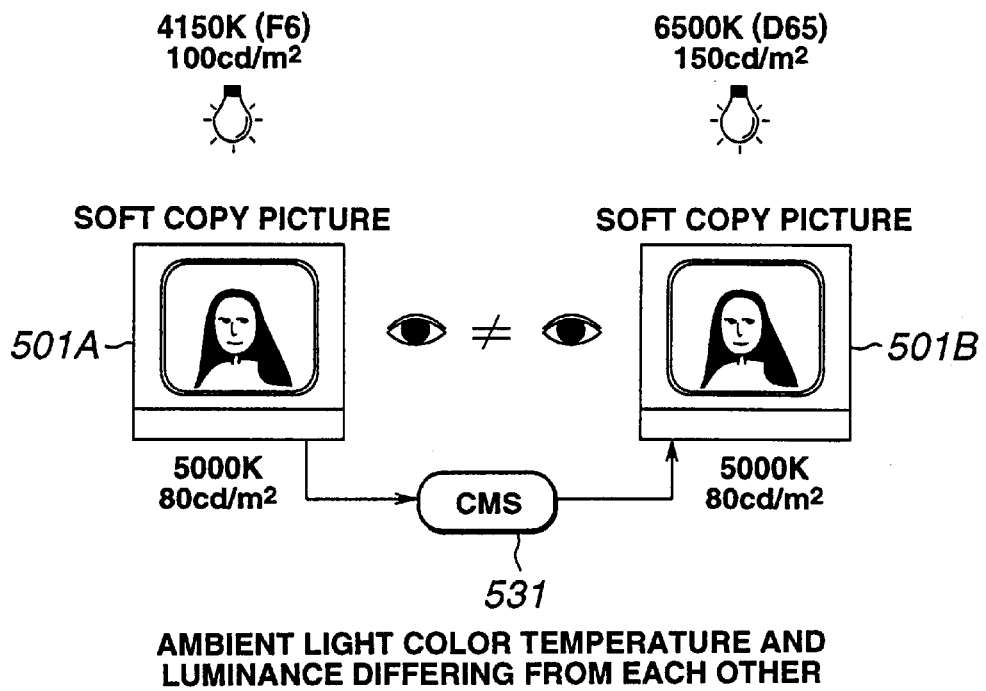
FIG. 47 similarly illustrates pictures between conventional different apparatus.
Figure 48:
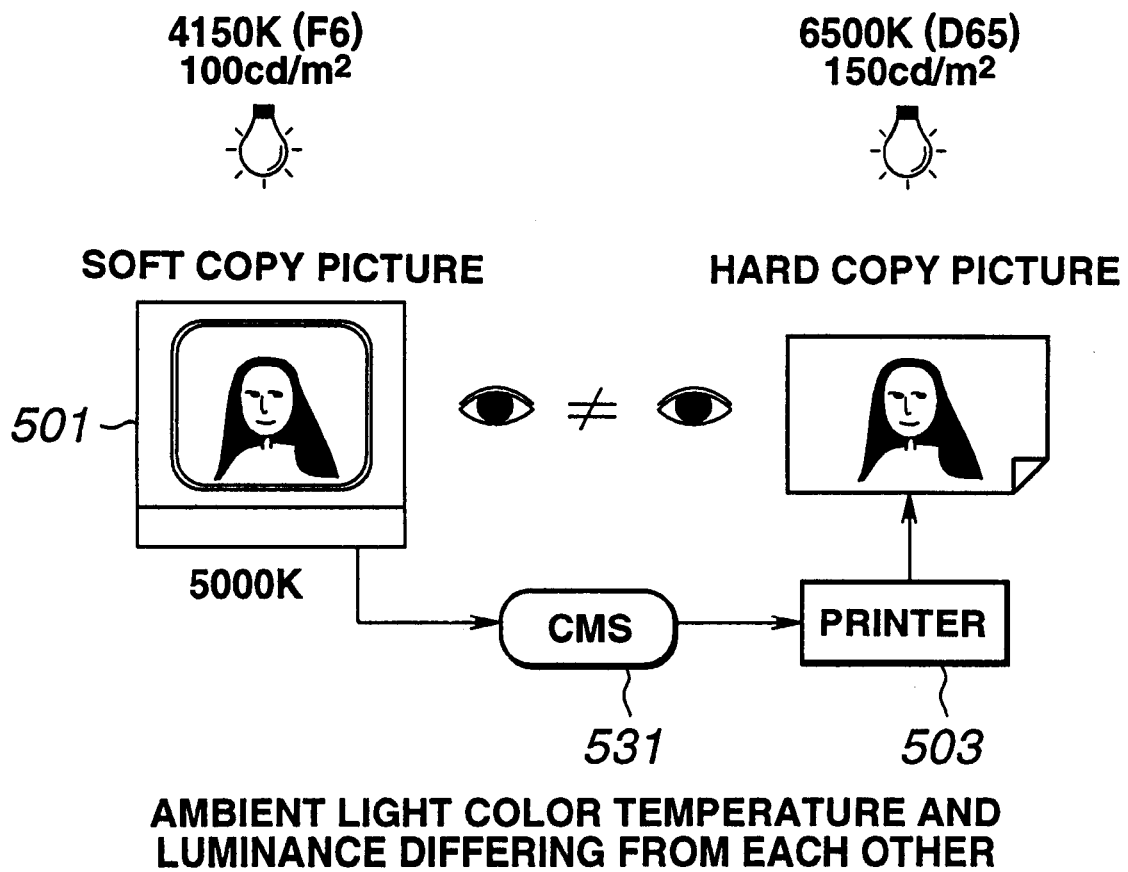
FIG. 48 similarly illustrates pictures between conventional different apparatus.

FIG. 37 shows an example of utilizing the pre-existing system of FIG. 45. In the system of FIG. 37, a color adaptation model conversion circuit 822 of a picture processing unit 821 applies the surrounding environmental data $V_{in}$ to the device profile data Din to generate device profile data $D'_{in}$. This device profile data $D'_{in}$ is sent along with the picture data $I_{in}$ in place of the device profile data D into the picture processing unit 621 shown in FIG. 45. Also, the device profile data $D_{out}$ is rewritten based on the surrounding environmental data $V_{out}$ by a color adaptation model conversion circuit 824 of a picture processing unit 823 to generate device profile data $D'_{out}$. These device profile data $D'_{in}$ and $D'_{out}$ are sent to the picture processing unit 621 shown in FIG. 45. The result is that the converter 622 of a picture processing unit 612 applies the device profile $D'_{in}$ to the picture data $I_{in}$ to output the resulting data to the converter 623 which then applies the device profile data $D'_{out}$ to the input picture data to generate picture data $I_{out}$.

If, in the systems of FIGS. 35 to 37, the picture processing units 601, 603, 612 and 621 are constituted by, for example, personal computers, the picture processing units 801, 804, 811, 813, 821 and 823 can be constructed by a scanner, a video camera or a printer.

In the foregoing, the present invention has been explained as being applied to a CMS of the ICC. However, the present invention can be applied to the CMS other than ICC.

As a furnishing medium used for furnishing the computer program adapted for performing the above processing, a communication medium, such as a network or a satellite, may be used in addition to a magnetic disc, a CD-ROM or a solid memory.

Industrial Applicability

In the transmission apparatus, transmission method and the furnishing medium, according to the present invention, picture data entered by the input device is converted, responsive to the parameters of the viewing conditions under which a picture entered from an input device is viewed, into color appearance index data under the viewing conditions, and the resulting appearance index data is transmitted over the transmission medium, so that it becomes possible to transmit picture data corrected responsive to the viewing condition on the transmitting side to the reception side.

In the transmission apparatus, transmission method and the furnishing medium, according to the present invention, picture data entered by the input device is converted, responsive to the parameters of the viewing conditions under which a picture entered from an input device is viewed, into color appearance index data under the viewing conditions, the color appearance index data is converted, responsive to the viewing condition parameters on the reception side, so that the color appearance of a picture outputted by the reception side output device will be coincident with that of the picture entered by the input device. Thus, there is no necessity of making corrections for the viewing conditions on the reception side, as a result of which information processing on the reception side can be simplified.

In the transmission apparatus, transmission method and the furnishing medium, according to the present invention, the picture entered from the input device and the input viewing condition parameters are transmitted, so that there is no necessity of making corrections for the viewing conditions on the transmission side, thus simplifying information processing on the transmission side.

In the transmission apparatus, transmission method and the furnishing medium, according to the present invention, the received picture data is converted so that the color appearance of a picture outputted by the reception side output device will be coincident with that of the picture entered by the input device and the picture data so converted is outputted to the output device. Thus, the picture data can be corrected responsive to the viewing conditions on the reception side, as a result of which a picture of the same color appearance can be displayed on the reception side as that on the transmission side.

In the reception apparatus, reception method and the furnishing medium, according to the present invention, the parameters of the viewing conditions, under which a picture displayed and outputted on an output device is observed, are sent to the transmission side, the picture transmitted from the transmitting side is received and the received picture data is outputted to the output device, so that the viewing condition parameters on the transmission side can be transmitted to the reception side along with the picture data. Thus, it becomes possible to display on an output device on the reception side a picture of the same color appearance as that of the picture displayed on the input device on the transmission side.

In the reception apparatus, reception method and the furnishing medium, according to the present invention, the picture data transmitted from the transmitting side and the viewing condition parameters on the transmission side are received, the picture data are converted responsive to the received viewing condition parameters to appearance index data corresponding to color appearance under the viewing conditions and the index data are converted so that the color appearance of an output picture of the output device will be coincident with that of a picture entered from a transmitting side input device, with the resulting picture data being outputted to an output device. Since there is no necessity of executing corrections responsive to the viewing conditions on the transmitting side, it becomes possible to simplify information processing on the transmission side.

In picture processing system, reception method and the furnishing medium, according to the present invention, the transmitting side converts picture data entered by the input device into color appearance index data corresponding to color appearance under the viewing conditions, responsive to parameters of the viewing condition under which a picture entered by an input device is viewed, and transmits the resulting appearance index data via the transmission medium. The reception side receives the index data transmitted over the transmission medium, converts the received index data, responsive to parameters of the viewing condition under which a picture displayed and outputted on the output device is viewed and outputs the converted picture data to the output device, thus enabling reduction in the difference between color appearance of a picture entered from the transmitting side input device and that of a picture outputted by an output device on the reception side.

In picture processing system, picture processing method and the furnishing medium, according to the present invention, the transmitting side converts picture data entered by the input device into color appearance index data corresponding to color appearance under the viewing conditions, responsive to parameters of the viewing condition under which a picture entered by an input device is viewed. The transmission side also converts the received index data, responsive to parameters of the viewing condition, under which a picture displayed and outputted on the output device is viewed, in order to output the converted picture data to the output device. The reception side receives data transmitted over the transmission medium, outputs the received data to the output device and transmits to the transmitting side the parameters of the viewing conditions under which is viewed the picture displayed and outputted on the output device. Thus, it becomes possible to reduce the difference in color appearance between color appearance of a picture entered from the transmitting side input device and that of a picture outputted by an output device on the reception side.

In picture processing system, picture processing method and the furnishing medium, according to the present invention, the transmitting side sends a picture entered by an input device and input viewing condition parameters, while the reception side receives the picture data sent from the transmitting side and the viewing condition parameters of the transmitting side and converts the picture data responsive to the received viewing condition parameters to color appearance data corresponding to color appearance under the viewing condition. The reception side also converts the index data, responsive to the parameters of the viewing condition under which is viewed the picture displayed and outputted on the output device, so that the color appearance of the output picture on the output device will be coincident with the color appearance of the input picture entered from the transmitting side input device. The reception side outputs the resulting picture data to the output device. Thus, a picture corrected depending on the viewing conditions on the transmitting and reception sides is displayed on the reception side, so that it becomes possible to reduce the difference in color appearance between the picture entered from the transmitting side input device and that outputted from the output device on the reception side.

In picture processing system, picture processing method and the furnishing medium, according to the present invention, since the profile for converting the DDC picture data to DIC picture data or the profile for converting the DIC picture data to DDC picture data is rewritten in association with the retrieved viewing condition parameters, color matching between different pictures can be achieved by directly using the conventional picture processing system.

What is claimed is:

1. A picture processing system comprising:
   a transmitting apparatus and a reception apparatus,
   said transmitting apparatus including an input device, input means, an input converter, an input visual environment conversion circuit, and an input editing processing circuit,
   said reception apparatus including an output device, output means, an output editing processing circuit, an output visual environment conversion circuit and an output converter;
   said input device generating data suited to said input device, said data suited to said input device depicting an input display of an image;
   said input means using input parameters to generate input means data, said input parameters being an input viewing condition under which said input display is viewed;
   said input converter using a profile of said input device to convert said data suited to said input device into input device XYZ data;
   said input visual environment conversion circuit processing said input device XYZ data and said input means data to generate input $L^+M^+S^+$ data, said input $L^+M^+S^+$ data being input appearance index data corresponding to color appearance under said input viewing condition;
   said input editing processing circuit connected to a network, another transmitting apparatus being connected to said network, said input editing processing circuit performing input picture editing processing on said input $L^+M^+S^+$ data to generate input picture data, said input picture editing processing including at least one of gamut compression and image editing,
   said input picture data being sent over said network to said reception apparatus;
   said output means using said output parameters to generate output means data, said output parameters being an output viewing condition under which an output display of an image is viewed;
   said output editing processing circuit connected to a network, input picture data being received from a transmission apparatus over said network, another transmitting apparatus being connected to said network, said output editing processing circuit performing output picture editing processing on said input picture data to generate output $L^+M^+S^+$ data;
   said output visual environment conversion circuit processing said output $L^+M^+S^+$ data and said output means data to generate output device XYZ data;
   said output converter using a profile of said output device to convert said output device XYZ data into data suited to said output device;
   said output device using said data suited to said output device to generate said output display.

2. A furnishing medium for furnishing a computer program used for a picture processing system, said computer program comprising:
   a step for generating data suited to an input device, said data suited to said input device depicting an input display of an image;
   a step for using input parameters to generate input means data, said input parameters being an input viewing condition under which said input display is viewed;
   a step for using a profile to convert said data suited to said input device into input device XYZ data;
   a step for processing said input device XYZ data and said input means data to generate input $L^+M^+S^+$ data, said input $L^+M^+S^+$ data being input appearance index data corresponding to color appearance under said input viewing condition;
   a step for performing input picture editing processing on said input $L^+M^+S^+$ data to generate input picture data, said input picture editing processing including at least one of gamut compression and image editing;
   a step for sending said input picture data over a network to a reception apparatus, another transmitting apparatus being connected to said network;
   a step for using said output parameters to generate output means data, said output parameters being an output viewing condition under which an output display of an image is viewed;

a step for receiving input picture data from said network;

a step for performing output picture editing processing on said input picture data to generate output $L^+M^+S^+$ data;

a step for processing said output $L^+M^+S^+$ data and said output means data to generate output device XYZ data;

a step for using a profile of said output device to convert said output device XYZ data into data suited to said output device;

a step for using said data suited to said output device to generate said output display.

3. A picture processing method comprising:

generating data suited to an input device, said data suited to said input device depicting an input display of an image;

using input parameters to generate input means data, said input parameters being an input viewing condition under which said input display is viewed;

using a profile to convert said data suited to said input device into input device XYZ data;

processing said input device XYZ data and said input means data to generate input $L^+M^+S^+$ data, said input $L^+M^+S^+$ data being input appearance index data corresponding to color appearance under said input viewing condition;

performing input picture editing processing on said input $L^+M^+S^+$ data to generate input picture data, said input picture editing processing including at least one of gamut compression and image editing;

sending said input picture data over a network to a reception apparatus, another transmitting apparatus being connected to said network;

using said output parameters to generate output means data, said output parameters being an output viewing condition under which an output display of an image is viewed;

receiving input picture data from said network;

performing output picture editing processing on said input picture data to generate output $L^+M^+S^+$ data;

processing said output $L^+M^+S^+$ data and said output means data to generate output device XYZ data;

using a profile of said output device to convert said output device XYZ data into data suited to said output device;

using said data suited to said output device to generate said output display.

4. A reception apparatus comprising:

an input converter connected to a network, data suited to said input device depicting an input display of an image, said data suited to an input device being sent from a transmission apparatus over said network, another transmitting apparatus being connected to said network, said input converter using a profile of said input device to convert said data suited to said input device into input device XYZ data;

an input visual environment conversion circuit, said input visual environment conversion circuit processing said input device XYZ data and input means data to generate input $L^+M^+S^+$ data, said input means data being received from said transmission apparatus, said input $L^+M^+S^+$ data being input appearance index data corresponding to color appearance under said input viewing condition;

a picture editing processing circuit, said picture editing processing circuit performing picture editing processing on said input $L^+M^+S^+$ data to generate to generate output $L^+M^+S^+$ data;

output means, said output means using output parameters to generate output means data, said output parameters being an output viewing condition under which an output display of an image is viewed;

an output visual environment conversion circuit, said output visual environment conversion circuit processing said output $L^+M^+S^+$ data and said output means data to generate output device XYZ data;

an output converter, said output converter using a profile of an output device to convert said output device XYZ data into data suited to said output device, said output device using said data suited to said output device to generate said output display.

5. A picture processing system comprising:

an input device, said input device generating data suited to said input device, said data suited to said input device depicting an input display of an image, said data suited to said input device being sent over a network to a reception apparatus, another transmitting apparatus being connected to said network;

input means, said input means using input parameters to generate input means data, said input parameters being an input viewing condition under which said input display is viewed;

said input means data being transmitted to said reception apparatus, said reception apparatus using said input means data to process said data suited to said input device;

an input converter connected to a network, data suited to said input device depicting an input display of an image, said data suited to an input device being sent from a transmission apparatus over said network, said input converter using a profile of said input device to convert said data suited to said input device into input device XYZ data;

an input visual environment conversion circuit, said input visual environment conversion circuit processing said input device XYZ data and input means data to generate input $L^+M^+S^+$ data, said input means data being received from said transmission apparatus, said input $L^+M^+S^+$ data being input appearance index data corresponding to color appearance under said input viewing condition;

a picture editing processing circuit, said picture editing processing circuit performing picture editing processing on said input $L^+M^+S^+$ data to generate to generate output $L^+M^+S^+$ data;

output means, said output means using output parameters to generate said output means data, said output parameters being an output viewing condition under which an output display of an image is viewed;

an output visual environment conversion circuit, said output visual environment conversion circuit processing said output $L^+M^+S^+$ data and said output means data to generate output device XYZ data;

an output converter, said output converter using a profile of an output device to convert said output device XYZ data into data suited to said output device, said output device using said data suited to said output device to generate said output display.

6. A furnishing medium for furnishing a computer program used for a reception apparatus, said computer program comprising:

a step for sending said data suited to an input device from a transmission apparatus over a network, another transmitting apparatus being connected to said network, data suited to said input device depicting an input display of an image;

a step for using a profile of an input device to convert said data suited to said input device into input device XYZ data;

a step for processing said input device XYZ data and input means data to generate input $L^+M^+S^+$ data, said input means data being received from said transmission apparatus, said input $L^+M^+S^+$ data being input appearance index data corresponding to color appearance under said input viewing condition;

a step for performing picture editing processing on said input $L^+M^+S^+$ data to generate to generate output $L^+M^+S^+$ data;

a step for using output parameters to generate output means data, said output parameters being an output viewing condition under which an output display of an image is viewed;

a step for processing said output $L^+M^+S^+$ data and said output means data to generate output device XYZ data;

a step for using a profile of an output device to convert said output device XYZ data into data suited to said output device;

a step for using said data suited to said output device to generate said output display.

7. A furnishing medium for furnishing a computer program used for a picture processing system, said computer program comprising:

a step for generating data suited to an input device, said data suited to said input device depicting an input display of an image, a step for sending said data suited to said input device over a network to a reception apparatus, another transmitting apparatus being connected to said network;

a step for means using input parameters to generate input means data, said input parameters being an input viewing condition under which said input display is viewed;

a step for transmitting said input means data transmitted to said reception apparatus, a reception apparatus using said input means data to process said data suited to said input device;

a step for sending said data suited to said input device from a transmission apparatus over said network, data suited to said input device depicting an input display of an image;

a step for using a profile of said input device to convert said data suited to said input device into input device XYZ data;

a step for processing said input device XYZ data and input means data to generate input $L^+M^+S^+$ data, said input means data being received from said transmission apparatus, said input $L^+M^+S^+$ data being input appearance index data corresponding to color appearance under said input viewing condition;

a step for performing picture editing processing on said input $L^+M^+S^+$ data to generate to generate output $L^+M^+S^+$ data;

a step for using output parameters to generate said output means data, said output parameters being an output viewing condition under which an output display of an image is viewed;

a step for processing said output $L^+M^+S^+$ data and said output means data to generate output device XYZ data;

a step for using a profile of an output device to convert said output device XYZ data into data suited to said output device;

a step for using said data suited to said output device to generate said output display.

8. A reception method comprising:

sending said data suited to an input device from a transmission apparatus over a network, another transmitting apparatus being connected to said network, data suited to said input device depicting an input display of an image;

using a profile of an input device to convert said data suited to said input device into input device XYZ data;

processing said input device XYZ data and input means data to generate input $L^+M^+S^+$ data, said input means data being received from said transmission apparatus, said input $L^+M^+S^+$ data being input appearance index data corresponding to color appearance under said input viewing condition;

performing picture editing processing on said input $L^+M^+S^+$ data to generate to generate output $L^+M^+S^+$ data;

using output parameters to generate output means data, said output parameters being an output viewing condition under which an output display of an image is viewed;

processing said output $L^+M^+S^+$ data and said output means data to generate output device XYZ data;

using a profile of an output device to convert said output device XYZ data into data suited to said output device;

using said data suited to said output device to generate said output display.

9. A picture processing method comprising:

generating data suited to an input device, said data suited to said input device depicting an input display of an image, sending said data suited to said input device over a network to a reception apparatus, another transmitting apparatus being connected to said network;

means using input parameters to generate input means data, said input parameters being an input viewing condition under which said input display is viewed;

transmitting said input means data transmitted to said reception apparatus, a reception apparatus using said input means data to process said data suited to said input device;

sending said data suited to said input device from a transmission apparatus over said network, data suited to said input device depicting an input display of an image;

using a profile of said input device to convert said data suited to said input device into input device XYZ data;

processing said input device XYZ data and input means data to generate input $L^+M^+S^+$ data, said input means data being received from said transmission apparatus, said input $L^+M^+S^+$ data being input appearance index data corresponding to color appearance under said input viewing condition;

performing picture editing processing on said input $L^+M^+S^+$ data to generate to generate output $L^+M^+S^+$ data;

using output parameters to generate said output means data, said output parameters being an output viewing condition under which an output display of an image is viewed;

processing said output L⁺M⁺S⁺ data and said output means data to generate output device XYZ data;

using a profile of an output device to convert said output device XYZ data into data suited to said output device;

using said data suited to said output device to generate said output display.

10. A transmitting apparatus comprising:

an input device, said input device generating data suited to said input device, said data suited to said input device depicting an input display of an image;

input means, said input means using input parameters to generate input means data, said input parameters being an input viewing condition under which said input display is viewed;

an input converter, said input converter using a profile of said input device to convert said data suited to said input device into input device XYZ data;

an input visual environment conversion circuit, said input visual environment conversion circuit processing said input device XYZ data and said input means data to generate input L⁺M⁺S⁺ data, said input L⁺M⁺S⁺ data being input appearance index data corresponding to color appearance under said input viewing condition;

a picture editing processing circuit, said picture editing processing circuit performing picture editing processing on said input L⁺M⁺S⁺ data to generate to generate output L⁺M⁺S⁺ data;

an output visual environment conversion circuit connected to a reception apparatus and connected to a network, another transmitting apparatus being connected to said network, output means data being received from said reception apparatus, said output visual environment conversion circuit processing said output L⁺M⁺S⁺ data and said output means data to generate output device XYZ data;

said output device XYZ data being sent over said network to a reception apparatus.

11. A picture processing system comprising:

an input device, said input device generating data suited to said input device, said data suited to said input device depicting an input display of an image;

input means, said input means using input parameters to generate input means data, said input parameters being an input viewing condition under which said input display is viewed;

an input converter, said input converter using a profile of said input device to convert said data suited to said input device into input device XYZ data;

an input visual environment conversion circuit, said input visual environment conversion circuit processing said input device XYZ data and said input means data to generate input L⁺M⁺S⁺ data, said input L⁺M⁺S⁺ data being input appearance index data corresponding to color appearance under said input viewing condition;

a picture editing processing circuit, said picture editing processing circuit performing picture editing processing on said input L⁺M⁺S⁺ data to generate to generate output L⁺M⁺S⁺ data;

an output visual environment conversion circuit connected to a reception apparatus and connected to a network, another transmitting apparatus being connected to said network, output means data being received from said reception apparatus, said output visual environment conversion circuit processing said output L⁺M⁺S⁺ data and said output means data to generate output device XYZ data;

said output device XYZ data being sent over said network to a reception apparatus;

output means connected to said transmission apparatus, said output means using output parameters to generate output means data, said output parameters being an output viewing condition under which an output display of an image is viewed, said output means data being transmitted to said transmission apparatus, said transmission apparatus using said output means data to generate output device XYZ data;

an output converter connected to a network, said output device XYZ data being received from a transmission apparatus over said network, another transmitting apparatus being connected to said network, said output converter using a profile of an output device to convert said output device XYZ data into data suited to said output device;

an output device, said output device using said data suited to said output device to generate said output display.

12. A furnishing medium for furnishing a computer program used for a transmitting apparatus system, said computer program comprising:

a step for generating data suited to said input device, said data suited to said input device depicting an input display of an image;

a step for using input parameters to generate input means data, said input parameters being an input viewing condition under which said input display is viewed;

a step for using a profile of said input device to convert said data suited to said input device into input device XYZ data;

a step for processing said input device XYZ data and said input means data to generate input L⁺M⁺S⁺ data, said input L⁺M⁺S⁺ data being input appearance index data corresponding to color appearance under said input viewing condition;

a step for performing picture editing processing on said input L⁺M⁺S⁺ data to generate to generate output L⁺M⁺S⁺ data;

a step for receiving output means data over a network from a reception apparatus, another transmitting apparatus being connected to said network;

a step for processing said output L⁺M⁺S⁺ data and said output means data to generate output device XYZ data;

a step for sending said output device XYZ data over said network to said reception apparatus.

13. A furnishing medium for furnishing a computer program used for a picture processing system, said computer program comprising:

a step for generating data suited to said input device, said data suited to said input device depicting an input display of an image;

a step for using input parameters to generate input means data, said input parameters being an input viewing condition under which said input display is viewed;

a step for using a profile of said input device to convert said data suited to said input device into input device XYZ data;

a step for processing said input device XYZ data and said input means data to generate input L⁺M⁺S⁺ data, said input L⁺M⁺S⁺ data being input appearance index data corresponding to color appearance under said input viewing condition;

a step for performing picture editing processing on said input L⁺M⁺S⁺ data to generate to generate output L⁺M⁺S⁺ data;

a step for receiving output means data over a network from a reception apparatus, another transmitting apparatus being connected to said network;

a step for processing said output L⁺M⁺S⁺ data and said output means data to generate output device XYZ data;

a step for sending said output device XYZ data over said network to a reception apparatus;

a step for using output parameters to generate output means data, said output parameters being an output viewing condition under which an output display of an image is viewed, said output means data being transmitted to said transmission apparatus;

a step for using said output means data to generate output device XYZ data;

a step for receiving said output device XYZ data over said network from a transmission apparatus over said network, another transmitting apparatus being connected to said network;

a step for using a profile of an output device to convert said output device XYZ data into data suited to said output device;

a step for using said data suited to said output device to generate said output display.

14. A transmitting method program comprising:

generating data suited to said input device, said data suited to said input device depicting an input display of an image;

using input parameters to generate input means data, said input parameters being an input viewing condition under which said input display is viewed;

using a profile of said input device to convert said data suited to said input device into input device XYZ data;

processing said input device XYZ data and said input means data to generate input L⁺M⁺S⁺ data, said input L⁺M⁺S⁺ data being input appearance index data corresponding to color appearance under said input viewing condition;

performing picture editing processing on said input L⁺M⁺S⁺ data to generate to generate output L⁺M⁺S⁺ data;

receiving output means data over a network from a reception apparatus, another transmitting apparatus being connected to said network;

processing said output L⁺M⁺S⁺ data and said output means data to generate output device XYZ data;

sending said output device XYZ data over said network to said reception apparatus.

15. A picture processing method comprising:

generating data suited to said input device, said data suited to said input device depicting an input display of an image;

using input parameters to generate input means data, said input parameters being an input viewing condition under which said input display is viewed;

using a profile of said input device to convert said data suited to said input device into input device XYZ data;

processing said input device XYZ data and said input means data to generate input L⁺M⁺S⁺ data, said input L⁺M⁺S⁺ data being input appearance index data corresponding to color appearance under said input viewing condition;

performing picture editing processing on said input L⁺M⁺S⁺ data to generate to generate output L⁺M⁺S⁺ data;

receiving output means data over network from a reception apparatus, another transmitting apparatus being connected to said network;

processing said output L⁺M⁺S⁺ data and said output means data to generate output device XYZ data;

sending said output device XYZ data over said network to a reception apparatus;

using output parameters to generate output means data, said output parameters being an output viewing condition under which an output display of an image is viewed, said output means data being transmitted to said transmission apparatus;

using said output means data to generate output device XYZ data;

receiving said output device XYZ data over said network from a transmission apparatus over said network, another transmitting apparatus being connected to said network;

using a profile of an output device to convert said output device XYZ data into data suited to said output device;

using said data suited to said output device to generate said output display.

16. A picture processing system comprising:

a transmitting apparatus and a reception apparatus, said transmitting apparatus including an input device, input means, an input converter, an input visual environment conversion circuit, a picture editing processing circuit, an output visual environment conversion circuit and an output converter, said reception apparatus including an output device, output means, and an output editing processing circuit;

said input device generating data suited to said input device, said data suited to said input device depicting an input display of an image;

said input means using input parameters to generate input means data, said input parameters being an input viewing condition under which said input display is viewed;

said input converter using a profile of said input device to convert said data suited to said input device into input device XYZ data;

said input visual environment conversion circuit processing said input device XYZ data and said input means data to generate input L⁺M⁺S⁺ data, said input L⁺M⁺S⁺ data being input appearance index data corresponding to color appearance under said input viewing condition;

said picture editing processing circuit performing picture editing processing on said input L⁺M⁺S⁺ data to generate to generate output L⁺M⁺S⁺ data;

said output visual environment conversion circuit connected to a reception apparatus, output means data being received from said reception apparatus, said output visual environment conversion circuit processing said output L⁺M⁺S⁺ data and said output means data to generate output device XYZ data;

said output converter connected to a network, another transmitting apparatus being connected to said network, said output converter using a profile of an output device to convert said output device XYZ data into data suited to said output device, said data suited to said output device being sent over said network to said reception apparatus;

said output device connected to said network, data suited to said output device being sent from a transmission apparatus over said network, said output device using said data suited to said output device to generate said output display;

said output means using output parameters to generate output means data, said output parameters being an output viewing condition under which an output display of an image is viewed, said output means data being transmitted to said transmission apparatus, said transmission apparatus using said output means data to generate said data suited to said output device.

* * * * *